(12) United States Patent
Takeshita et al.

(10) Patent No.: US 7,191,187 B2
(45) Date of Patent: Mar. 13, 2007

(54) INFORMATION PROCESSING APPARATUS AND INFORMATION PROCESSING PROGRAM

(75) Inventors: Syuji Takeshita, Tokyo (JP); Hiroyo Suzuki, Tokyo (JP)

(73) Assignee: Matsushita Electric Industrial Co, Kadoma (JP)

( * ) Notice: Subject to any disclaimer, the term of this patent is extended or adjusted under 35 U.S.C. 154(b) by 416 days.

(21) Appl. No.: 10/401,008

(22) Filed: Mar. 27, 2003

(65) Prior Publication Data

US 2004/0030567 A1    Feb. 12, 2004

(30) Foreign Application Priority Data

Mar. 28, 2002  (JP) ............................. 2002-090812
Mar. 28, 2002  (JP) ............................. 2002-092856
Mar. 24, 2003  (JP) ............................. 2003-080988

(51) Int. Cl.
*G06F 7/00*     (2006.01)
*G06F 15/16*    (2006.01)

(52) U.S. Cl. ............... 707/102; 709/203; 709/206; 709/207; 709/313; 709/329

(58) Field of Classification Search ............ 707/1, 707/6, 102; 709/203, 206, 207, 313, 329
See application file for complete search history.

(56) References Cited

U.S. PATENT DOCUMENTS

| 5,822,526 | A  | * | 10/1998 | Waskiewicz ............... 709/206 |
| 5,966,663 | A  | * | 10/1999 | Gleason .................... 455/466 |
| 6,272,532 | B1 | * | 8/2001  | Feinleib .................... 709/206 |
| 6,353,852 | B1 | * | 3/2002  | Nestoriak et al. .......... 709/206 |
| 6,427,164 | B1 | * | 7/2002  | Reilly ...................... 709/206 |

* cited by examiner

Primary Examiner—Tim Vo
Assistant Examiner—Cheyne D. Ly
(74) Attorney, Agent, or Firm—Day Pitney LLP

(57) ABSTRACT

In a system that corresponds content to a user and permits the user to browse particular content corresponding to the user, the system timely informs the user of a page to which update has been performed. A content update information obtaining section obtains content update information showing the update of content, and a notification mail generation section generates a notification mail having an e-mail, which is obtained based on browsing-permitted subject identification code administrated by a content administration section, as a destination. Further, when it is detected that the notification mail is non-deliverable, the system may prevent the user from browsing the particular content.

6 Claims, 86 Drawing Sheets

FIG. 4

| CONTENT IDENTIFIER | BROWSING-PERMITTED SUBJECT IDENTIFICATION CODE |
|---|---|
| A040167.html | u284729 |
| B70559029.html | u284729 |
| A040167.html | g223121 |
| C0362264.html | g223121 |
| D4914189.html | g223121 |
| ⋮ | ⋮ |

FIG. 6

From: xxx@abc.def.ghi
Date: 2002/3/1
To: foo@bar.com.xyz
Subject: NEWS FOR MARCH 2003

※□, ○△INC.
MS./MR. ※□ (foo@bar.com.xyz)

THANK YOU FOR YOUR PATRONAGE.
NEW ARRIVAL
 [Topics]
 ・INFORMATION OF NEW PRODUCT(2/25)
    http://www.foo.bar/topics-A.html
UPDATE
 [Catalogue]
 ・AC Adapter
    http://www.foo.bar/ac-adaptor-a347.html

WE APPRECIATE YOUR FURTHER SUPPORT.

▽△INC.
SALES DEPARTMENT,
    PERSON IN CHARGE◇◇
e-mail: pin012@mail.foo.bar
tel: +81.3.1234.5678
fax: +81.3.8765.4321

FIG. 9

```
From:    xxx@abc.def.ghi
To:      {mail_address}
Subject: {mail_subject}

{company}
MS./MR. {name}  ( {mail_address} )

{opening_greeting}

NEW ARRIVAL
  【 {renewal_genre} 】
  ・{renewal_title}
      {renewal_url}
UPDATE
  【 {update_genre} 】
  ・{renewal_url}
      {update_url}

{closing_greeting}

▽△INC.
                              SALES DEPARTMENT.
                              PERSON IN CHARGE {person}
                              e-mail: {person_email}
                              tel:    {person_phone}
                              fax:    {person_faximile}
```

FIG. 17

| CONTENT IDENTIFIER | BROWSING-PERMITTED SUBJECT IDENTIFICATION CODE | NOTIFICATION MAIL PREFERENCES PRESENCE INFORMATION |
|---|---|---|
| A040167.html | u284729 | YES |
| B70559029.html | u284729 | NO |
| A040167.html | g223121 | NO |
| C0362264.html | g223121 | YES |
| D4914189.html | g223121 | YES |
| ⋮ | ⋮ | ⋮ |

FIG. 18

| BROWSING-PERMITTED SUBJECT IDENTIFICATION CODE | NOTIFICATION MAIL PREFERENCES PRESENCE INFORMATION |
|---|---|
| u284729 | YES |
| g223121 | NO |
| f582102 | YES |
| ⋮ | ⋮ |

FIG. 20

| CONTENT IDENTIFIER | NOTIFICATION MAIL PREFERENCE | |
|---|---|---|
| | YES | NO |
| A040167.html | ● | ○ |
| B70559029.html | ○ | ● |
| ⋮ | ⋮ | ⋮ |

BROWSING-PERMITTED SUBJECT IDENTIFICATION CODE : u284729

2001
2002
2004
2003
2005
UPDATE

FIG. 32

| IDENTIFICATION CODE | IDENTIFICATION CODE VALIDITY INFORMATION | E-MAIL ADDRESS |
|---|---|---|
| u284729 | VALID | abc@def.ghi |
| g223121 | INVALID | xyz@uvw.opq |
| f582102 | VALID | hij@klm.stu |
| ⋮ | ⋮ | ⋮ |

FIG. 33

| IDENTIFICATION CODE | IDENTIFICATION CODE VALIDITY INFORMATION | E-MAIL ADDRESS |
|---|---|---|
| u284729 | INVALID | abc@def.ghi |
| g223121 | INVALID | xyz@uvw.opq |
| f582102 | VALID | hij@klm.stu |
| ⋮ | ⋮ | ⋮ |

FIG. 37

```
1   % nslookup
2   Default Server: ns.hij.klm.jpn
3   Address: a.b.c.d
4
5   > set type=mx
6   > def.ghi
7   Server: ns.hij.klm.jpn
8   Address: a.b.c.d
9
10  def.ghi   preference=20, mail exchanger=mx.def.ghi
11  def.ghi   preference=10, mail exchanger=mx2.def.ghi
     .   .
     .   .
     .   .
```

FIG. 38

```
1   % telnet   mx.def.ghi   smtp
2   Trying  x.y.z.u
3   Connected to mx.def.ghi.
4   Escape character is '^]'.
5   220 mx.def.ghi ESMTP Sendmail ready ...
6   HELO  hij.kl.jpn
7   250 mx.def.Hello hij, please to meet you
8   MAIL FROM:  newsletter@hij.kl.jpn
9   RCPT TO:  abc@def.ghi
10  250 abc@def.ghi... Recipient ok
    OR
10  550 abc@def.ghi.... User unknown
```

FIG. 41

From: POSTMASTER@mx.def.ghi
Subject: Undeliverable message
To: newsletter@hij.kl.jpn ------- Failure Reasons -------

User not listed in public Name & Address Book
abc@def.ghi

------- Returned Message -------

Received: from mail.hij.kl.jpn by mx.def.ghi
Message-ID: <3C3A9DA9.7948F113@hij.kl.jpn>
Date: Tue, 08 Jan 2002 16:20:09 +0900
From: newsletter@hij.kl.jpn
Subject: Newsletter (Jan. 2002)
Reply-To: order@hij.kl.jpn
To: abc@def.ghi
Content-Type: text/plain ; character=iso-2022-jp THANK YOU FOR YOUR PATRONAGE. WE ARE SENDING THE NEWSLETTER
OF JANUARY 2002.
 .
 .
 .

FIG. 42

| MESSAGE ID | E-MAIL ADDRESS |
|---|---|
| 3C5A9DA9.7948F113@hij.kl.jpn | abc@def.ghi |
| ⋮ | ⋮ |

INFORMATION PROCESSING APPARATUS AND INFORMATION PROCESSING PROGRAM

BACKGROUND OF THE INVENTION

1. Field of the Invention

The present invention relates to an apparatus and a computer program, which, when browsable content is detected for each user, sends notice via e-mail to the user who is capable of browsing the updated content.

Further, the present invention also relates to an apparatus and a computer program, which determines whether the transmission of e-mail to an e-mail address assigned to a user having authorization (authorization by which the user can browse the above-described content, for example) is undeliverable or not, and change the authorization.

2. Prior Art

The Internet has conventionally been used for sales activity. For example, e-mail is used for inquiries from customers and for responses thereto. A WEB server is used to provide information to the customers, such as merchandise information, price information, information of order reception and shipping status of merchandise, and the like. Further, inquiries from the customers have also been processed by a template provided by the WEB server.

In recent years, particularly, a system has been used which provides information only to particular customers according to business records of the customers. In such a system, specific content is provided to specific customers. For example, when a customer accesses to the system, specific content for the specific customer is displayed.

With such a system, only information that the customer needs is provided to him/her, and the customer can quickly access the information that he/she needs. Further, those who provide information to the customers can provide different information for each customer, and can quote different prices for a same product to different customers according to business records, credit rating and the like, for example.

As described, to present the information unique to the customer, authentication is performed by identification codes, passwords or the like, and thus particular details have been presented for a particular customer.

Specifically, when a person from a customer company who accesses to the WEB server of a sales company or the like, a screen for entering an ID and the password is displayed. When a correct identification code and password are entered, the particular information for the person in charge of the company is provided.

However, in such a system that provides specific information to specific customers, the system does not have means to inform the customers of updated content. If there is an update, the sales company has to wait for the customers to access the content after the content is updated, and there is a problem that the system cannot timely provide information for the customers.

Furthermore, in the above-described system, it is necessary to control disclosure of the content, which is to be disclosed only to the particular customer, in order to prevent it from being disclosed to other customers while updated information is timely informed to the customer. For example, it has frequently occurred that the person in charge of a company moves to other company without prior contact due to the changes of employment situation in recent years. For this reason, if the person remembers the identification code and the password, he/she can browse the information that should be presented only to the first company, for which he/she has worked, after having moved to the other company. Thus, there is another problem that the information that should be presented only to a particular company is leaked out to those who are employed by another company.

SUMMARY OF THE INVENTION

The object of the present invention is to inform and disclose information that content has been updated for a person who can browse the content by transmission of an e-mail or the like, and also, to prevent a person, to whom the transmission of e-mail has been non-deliverable due to a reason such as retirement, from browsing the content, and thus preventing the information from unauthorized disclosure.

In the present invention, an information processing apparatus is provided, which comprises a content administration section that administers content and browsing-permitted subject identification code by associating them, a content update information obtaining section that obtains information regarding update of the content, and a notification mail generation section that generates an e-mail, which has notification information update of the content as details, based on the information obtained by the content update information section, and has an e-mail address, which is obtained based on an updated content and an associated browsing-permitted subject identification code, as a destination.

With this, the user, who corresponds to the updated content and the associated browsing-permitted subject identification code, is informed of the update by e-mail. Information can be timely provided, and thus solving the problems.

Further, according to such an information processing apparatus, the notice of update by e-mail is made even when the update of content is caused by correction of apparent errors. Improvement has been made to this point, in which the apparatus does not send the notice to the user who does not want to receive the notice of update, or comprises notification determination result obtaining means that obtains a determination result whether the notice of update is sent or not.

With this, constant notice of update can be restricted, notice according to the level of update can be performed, thereby solving the problem.

To solve the problem that the information is disclosed without authorization, the identification code, information showing validity of the identification code, and the e-mail address are made to correspond with each other, in the present invention, it is determined whether the transmission of e-mail having an e-mail address as a destination is non-deliverable or not, and the information showing validity of the identification code is changed based on the determination result.

Accordingly, when it is detected that the e-mail address has become unreachable after a person in charge of a customer company moved to other company, the person in charge can no longer obtain information presented only for the company for which he/she worked before moving to the other company, thereby solving the problem.

BRIEF DESCRIPTION OF THE DRAWINGS

FIG. 4 is an exemplary view of a table by which control is performed in the content administration section.

FIG. 6 is an exemplary view of a notification mail to be generated.

FIG. 9 is an exemplary view of a template.

FIG. 17 is an exemplary view of a table used in a fifth embodiment of the present invention.

FIG. 18 is an exemplary view of another table used in the fifth embodiment.

FIG. 20 is an exemplary view of a screen for obtaining an update instruction in the sixth embodiment.

FIG. 32 is an exemplary view of a table stored by a validity information storage section.

FIG. 33 is an exemplary view of another table stored by a validity information storage section.

FIG. 37 is a view of an operation when referring to an MX record of DNS.

FIG. 38 is a view of an operation for determining whether an e-mail to an e-mail address.

FIG. 41 is an exemplary view of a non-delivery notice e-mail.

FIG. 42 is an exemplary view of the table where message IDs are associated with e-mail addresses.

FIG. 83 is an exemplary view of the state of access to a conventional WEB page generation system.

DESCRIPTION OF THE PREFERRED EMBODIMENTS

The preferred embodiments of the present invention will be described with reference to the drawings. Note that the present invention is not limited to the preferred embodiments, but can be executed in various kinds of mode without departing from the scope of the invention.

Figure 1:
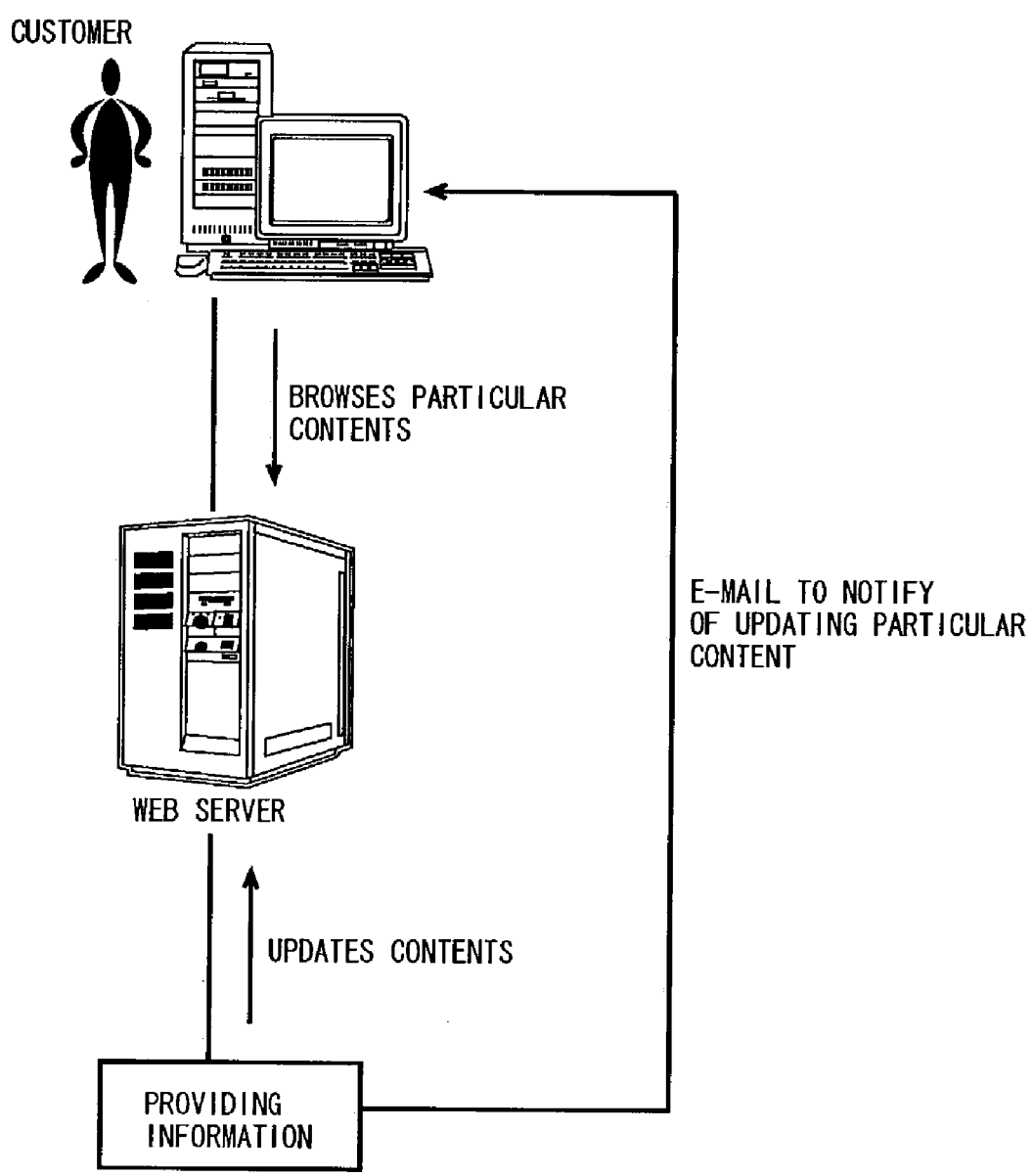
FIG. 1 is a view showing an outline of the present invention.

FIG. 1 exemplifies the outline of the present invention. In the present invention, a customer is a user who browses the contents of a website. The customer cannot browse all the contents, but particular contents are determined for each customer. For example, when prices of products are determined for each customer, the customer can browse information of the price offered to the customer but is not able to browse a price list offered to another customer. For this reason, when the customer tries to browse the particular content, he/she is requested to enter the identification code such as the ID and password, and is permitted to browse the particular contents only when the identification code is authenticated.

An information provider may update the contents stored in the WEB server, for example. Then, notice that the contents have been updated is sent by e-mail to the customer who can browse the updated contents. Accordingly, only the customer who can browse the particular contents is informed of the update.

Figure 30:
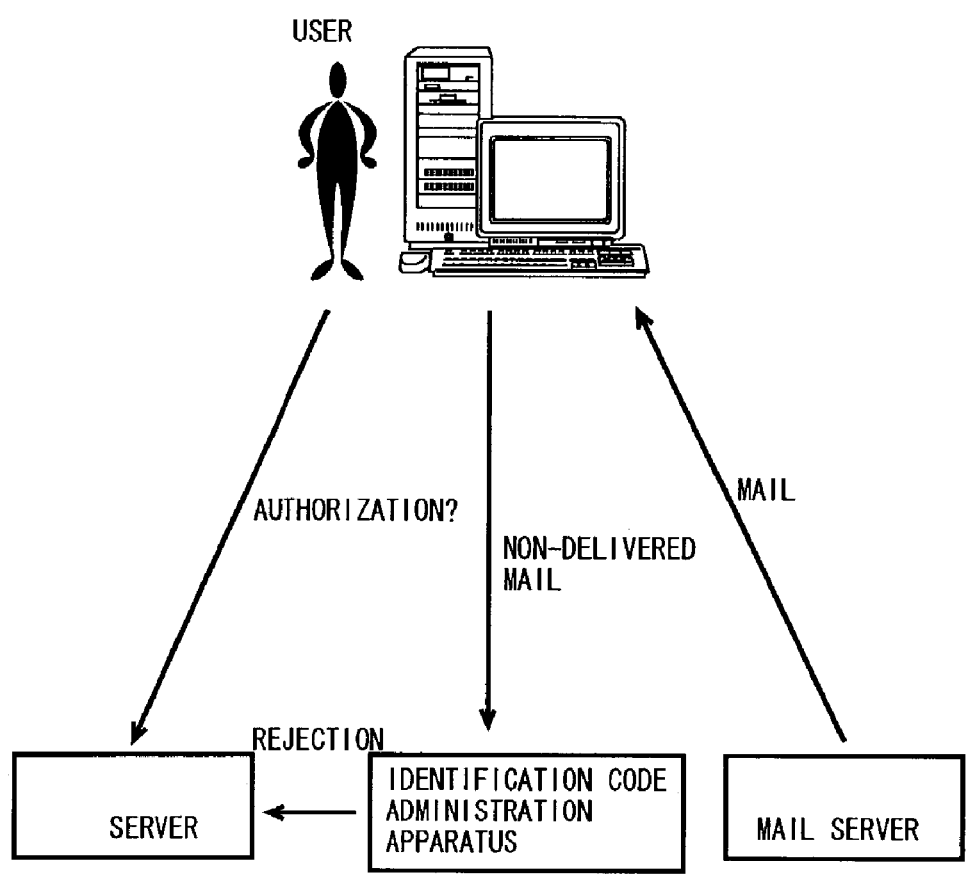
FIG. 30 is a view showing the outline of the present invention.

FIG. 30 exemplifies another aspect of the outline of the present invention. The user is a person employed by a partner company. The user enters the password in order to show that he/she has the authorization to browse the information presented only for the company, which is stored in a server or the like. When the identification code and password are correct, he/she can browse the information.

A mail server transmits the e-mail regularly or irregularly to the user to determine whether the e-mail can reach the e-mail address of the user or not, and confirms whether the user is employed by the partner company. If the user is not employed by the company any more, the e-mail address of the user is unreachable, and a mail showing non-delivery is returned to the identification code administration apparatus of the present invention. The identification code administration apparatus outputs an instruction to reject browsing permission if the user tries to browse the information stored in the server or the like, and the user who is not employed by the company can no longer view the information.

To clarify the relationship between the information processing apparatus of the present invention and the system for providing information for each customer, a description will be given for an information processing apparatus or a WEB page generation system for providing information for each customer.

Figure 51:
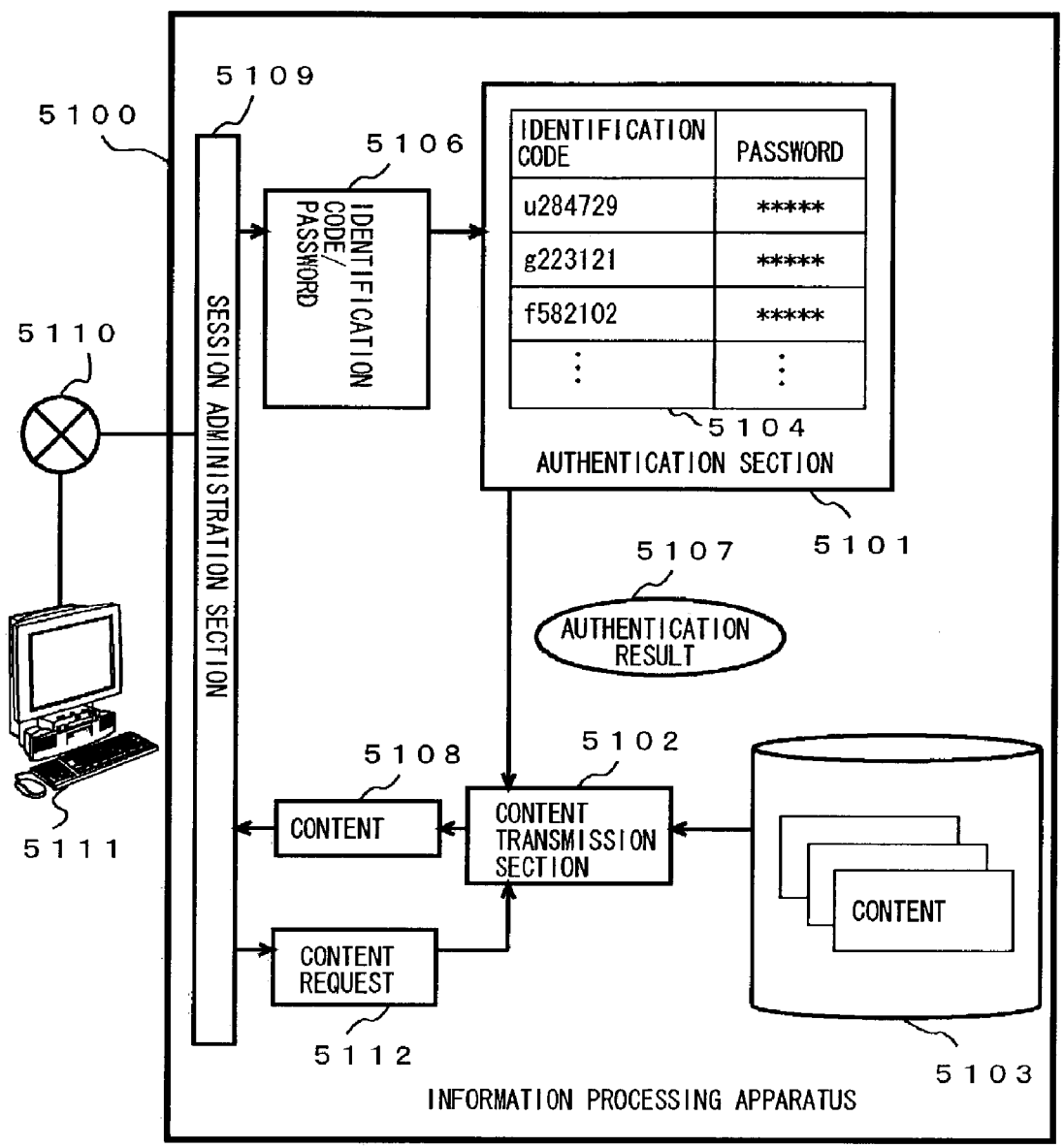
FIG. 51 is a functional block diagram of the information processing apparatus that permits an access to content by authentication information.

FIG. 51 exemplifies the functional block diagram of the information processing apparatus that enables the user to browse content such as a WEB page by entering the identification code and password The information processing apparatus comprises an authentication section 5101, a content transmission section 5102, a content database 5103, and a session administration section 5109. The authentication section stores a table 5104 storing sets of the identification codes and passwords. When the user who is the customer tries to browse content 5105 or the like stored in the content database, he/she inputs the identification code and a password 5106 to the authentication section 5101 to prove that he/she has the authorization to browse the contents.

The 'authentication section' 5101 determines whether the identification code and password, which have been entered, match the ones stored in the table 5104, and sends an authentication result 5107 that is the result of determination to the content transmission section 5102.

The 'content transmission section' 5102 determines the details of the authentication result 5107, transmits the content stored in the content database 5103 as content 5108 if authentication has succeeded, and allows the user to browse the content.

Further, the content transmission section receives a content request 5112 from the user, and may transmit the content in response to the request. In this case, an information processing apparatus 5100 receives the content request first, requests the user for the identification code and password in response to the request, and may operate to transmit the content after confirming whether the identification code and password, which have been entered, match the stored ones or not.

The 'session administration section' 5109 administrates communication condition between a user terminal 5111 connected to a communication network 5110 and the information processing apparatus 5100. The session administration section requests the user terminal for the identification code and password to be input to the authentication section when the user accesses to the information processing apparatus from the user terminal, and outputs the content transmitted from the content transmission section to the user terminal to which authentication has been performed.

Note that a table, which relates the contents stored in the content database to the identification codes, or the like is further stored in the content database, the authentication result 5107 is made to include not only the result showing whether authentication has been performed or not, but also information showing to which identification code the authentication has been performed, and thus the content transmission section can automatically transmit the content corresponding to the identification code.

Figure 23:
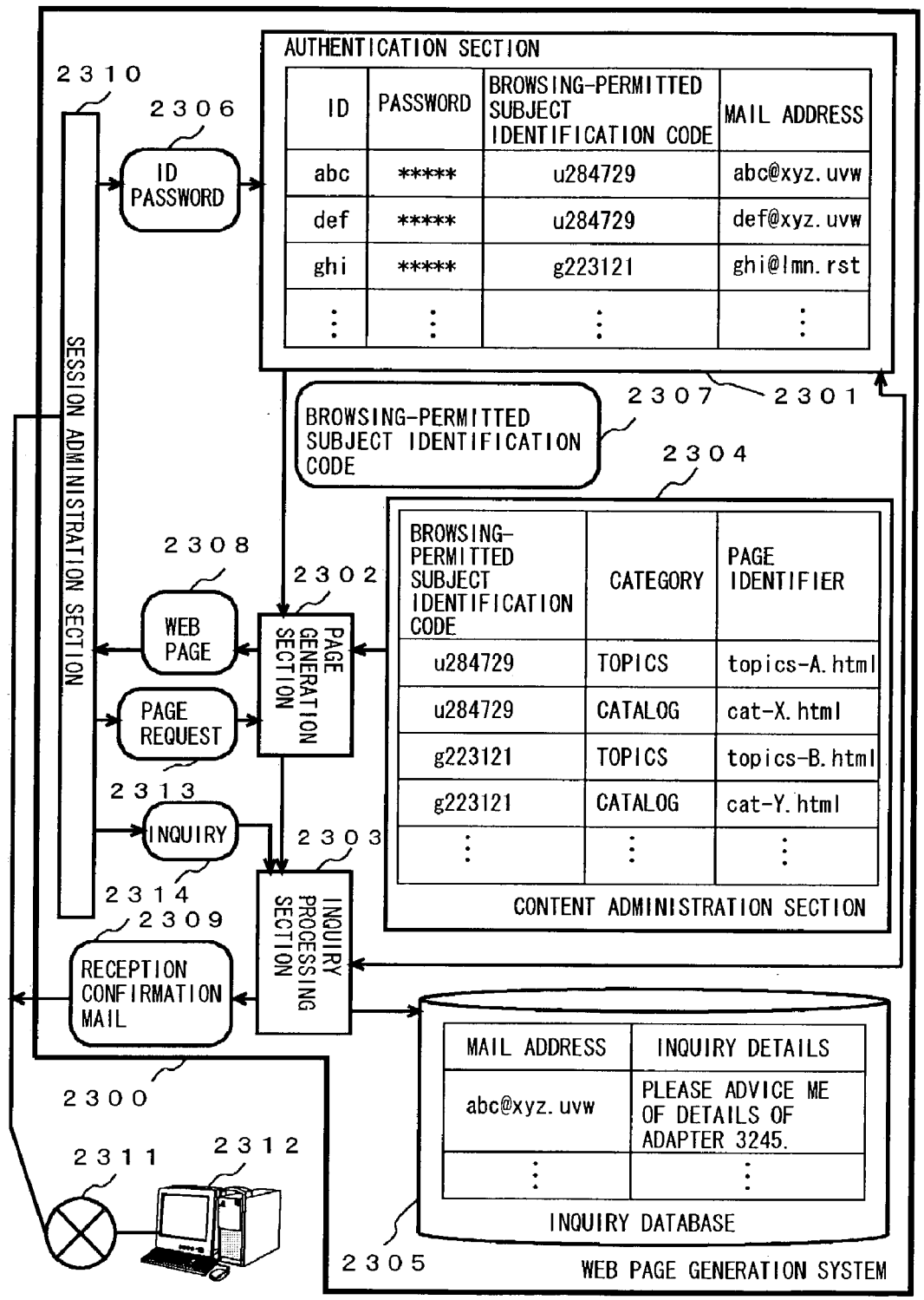
FIG. 23 is a functional block diagram of the WEB page generation system.

FIG. 23 exemplifies the functional block diagram of the WEB page generation system. In FIG. 23, a WEB page generation system 2300 comprises an authentication section 2301, a page generation section 2302, an inquiry processing section 2303, a content administration section 2304, an inquiry database 2305, and a session administration section 2310.

The 'authentication section' 2301 administers the table in which the ID, password, browsing-permitted subject identification code, and mail address are associated with each other. The ID and password are authentication information for the user to browse the particular content. The browsing-permitted subject identification code may be the same as the ID. For example, when browsing of content having the same details is permitted for the users who belong to a same organization, the identification code identifying the organization is the browsing-permitted subject identification code. The mail address is the e-mail address of the user, and is used for processing in the processing section described hereinafter.

When the user inputs authentication information 2306 that typically consists of the ID and password, the authentication section determines whether the ID and password match based on the data stored in the table. When it is determined that the ID and password match as a result of determination, the section obtains a browsing-permitted subject identification code 2307, which is associated with the ID and password, and sends it to the page generation section. Further, the information sent from the authentication section to the page generation section is not limited to the browsing-permitted subject identification code 2307, but may include the mail address of the user, which can be obtained from the entered ID.

The 'page generation section' 2302 generates a WEB page 2308 corresponding to the browsing-permitted subject identification code based on the information administered by the content administration section, from the browsing-permitted subject identification code 2307 that has been sent. More specifically, the page generation section sends the browsing-permitted subject identification code, which has been sent, to the content administration section first, and obtains a content identifier and a category, which correspond to the browsing-permitted subject identification code. Next, the page generation section generates the WEB page 2308 from the content identifier and category, which have been obtained, and transmits it to a user terminal 2312. Simultaneously with the transmission, the page generation section sends information of the generated page to the inquiry processing section 2303 for handling of inquiries (described later). The information of page includes the mail address of the user, for example.

Further, the page generation section also receives a page request 2313 that arises when the user who viewed the details of the generated WEB page tracks the link shown in the WEB page, and transmits the WEB page accordingly. The WEB page transmitted in response to the page request 2313 may be administered by the content administration section 2304 or by another section.

The 'content administration section' 2304 associates the browsing-permitted subject identification code with the content. In FIG. 23, the content administration section not only associates the browsing-permitted subject identification code with the content identifier, but also associates the category of the content identified by the content identifier, and thus controlling them. The 'category' is classification of the details of content, and 'topics', 'catalog' and the like are exemplified in FIG. 23.

Figure 22:
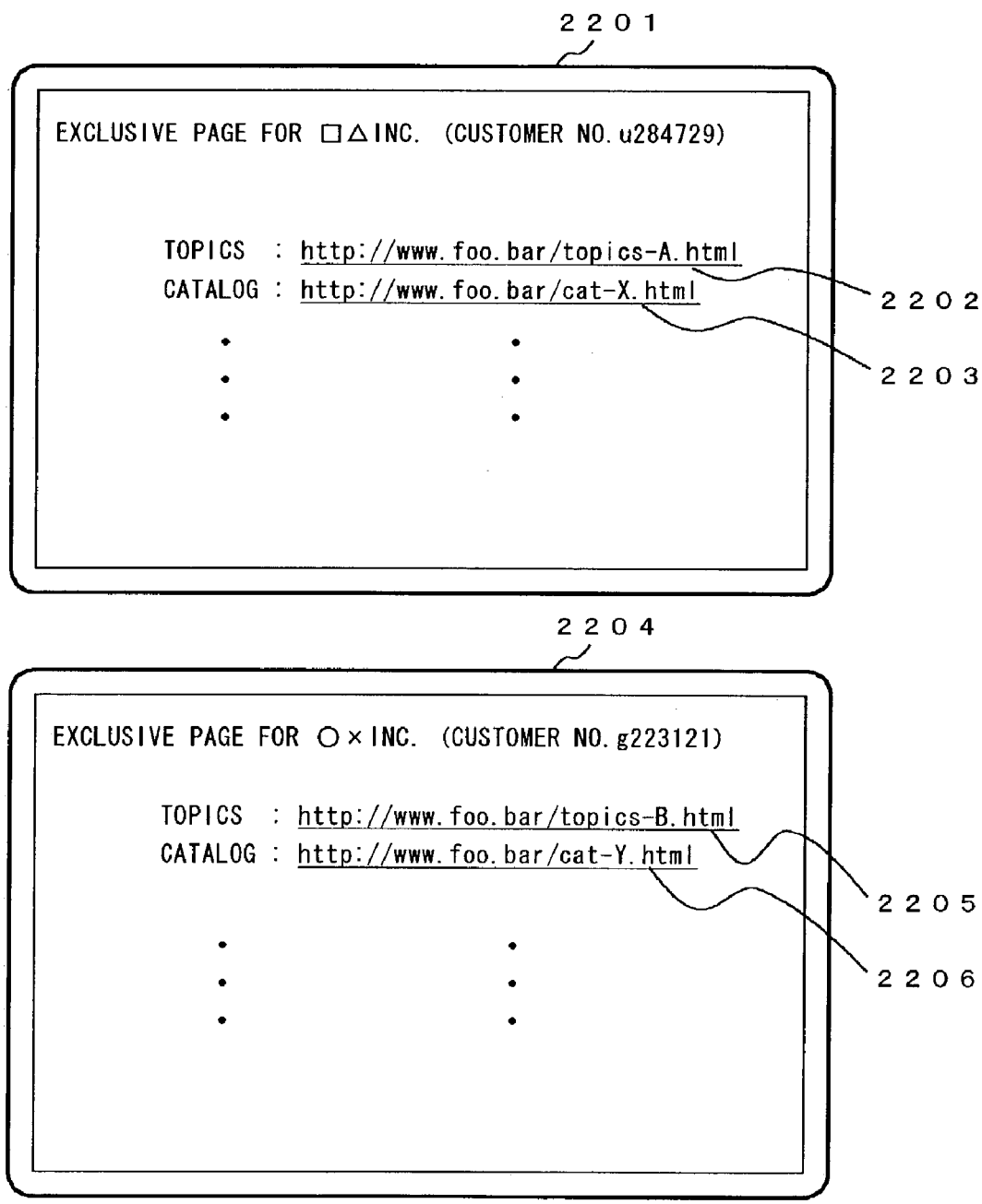
FIG. 22 is an exemplary view of a screen generated by a WEB page generation system.

When the browsing-permitted subject identification code such as 'u284729' is sent to the page generation section, the section obtains information such as 'topics, topics-A.html' and 'catalog, cat-X.html' from the content administration section, and generates the WEB page shown on the upper portion 2201 of FIG. 22. Similarly, when the browsing-permitted subject identification code such as 'g223121' is sent to the page generation section, the WEB page shown in the lower portion 2204 of FIG. 22 is generated. The areas shown by underlines (2202, 2203, 2205 and 2206) are hyperlinks to each category for the customer, where the customer browses the content by clicking the areas with a mouse or the like.

Further, when the user who browsed the generated WEB page makes inquiry, the inquiry 2314 is sent to the inquiry processing section 2303. The 'inquiry processing section' 2303 obtains the mail address of the user from the information of the page sent from the page generation section, stores the mail address and the details of inquiry into the inquiry database, and transmits a reception confirmation mail 2309 to the user showing that it has received the inquiry.

The mail addresses and inquiry details stored in the inquiry database are sent to a proper section and a return mail is sent to the mail address.

The 'session administration section' 2310 administers the communication condition between the user terminal 2312 connected to the communication network 2311 and the WEB page generation system. When the user accesses to the WEB page generation system, the section requests the user terminal for the ID and password to be input to the authentication section, and outputs the WEB page generated in the page generation section to the user terminal of the user to whom the authentication has been performed.

Figure 24:
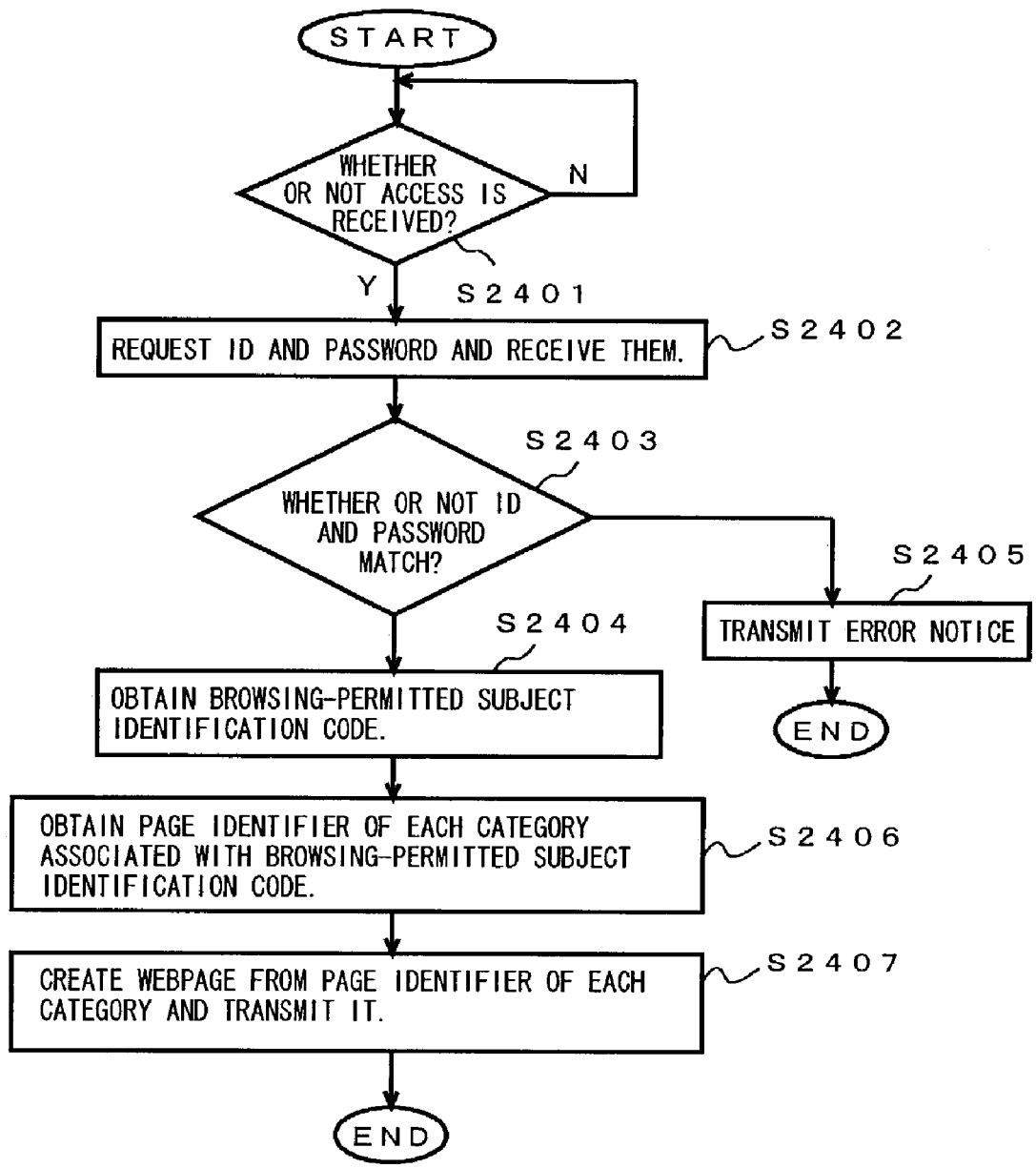
FIG. 24 is a flowchart of processing of the WEB page generation system.

FIG. 24 exemplifies the flowchart of processing that the WEB page generation system 2300 generates the WEB page.

At step S2401, the system waits until it receives access from the user. On receiving access from the user, the processing proceeds to step S2402.

At step S2402, the system requests the ID and password for the user, and receives them.

At step S2403, whether the ID and password, which were received on step S2402, match or not is determined by the authentication section, and the processing proceeds to step S2404 when they are determined to match. Otherwise, the processing proceeds to step S2405, where the system transmits an error notice to end the processing.

At step S2404, the authentication section obtains the browsing-permitted subject identification code.

At step S2406, the page generation section obtains a page identifier and category, which are associated with the browsing-permitted subject identification code, and thus obtains the page identifier for each category.

At step S2407, the page generation section creates the WEB page from the page identifier of each page.

By performing the above-described processing, it is possible to generate a page that includes different kinds of content for each user or each organization to which the user belongs.

Figure 2:
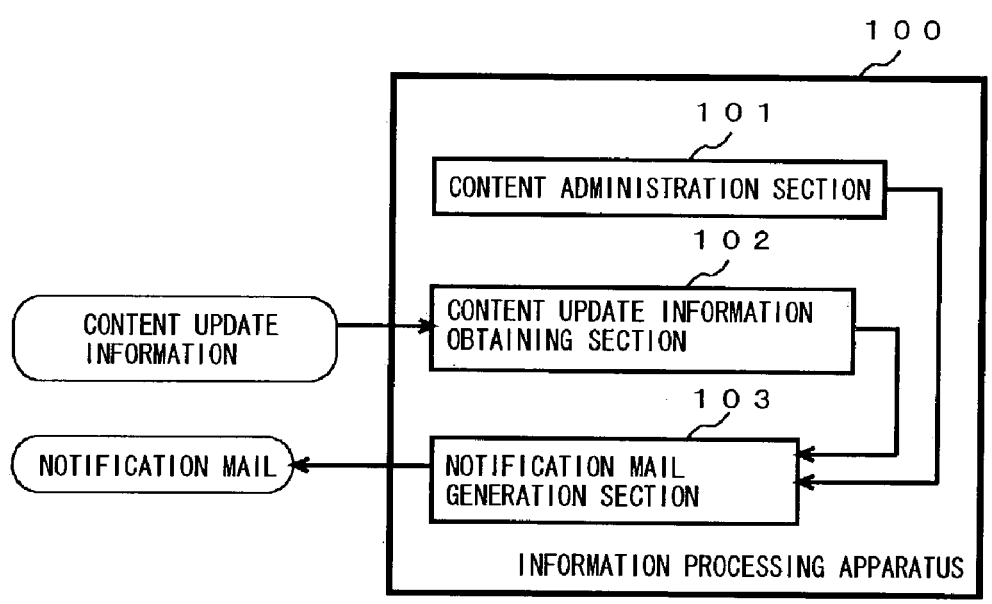
FIG. 2 is a functional block diagram of an information processing apparatus in a first embodiment of the present invention.

FIG. 2 exemplifies the functional block diagram of the information processing apparatus according to the first embodiment of the present invention.

In the first embodiment, an information processing apparatus 100 comprises a content administration section 101, a content update information obtaining section 102, and a notification mail generation section 103.

The 'content administration section' 101 administers plural kinds of content and browsing-permitted subject identification code for each content by associating them. Associating them here means that the section maintains some correspondence between the plurality of contents and identification codes, e.g. by storing them in a table, by storing references between the contents and the identification codes, or the like. Herein the 'browsing-permitted subject identification code' is an identification code to identify a subject to which content browsing is permitted. In other words, for those subjects which are authorized to have access to a certain content their browsing permitted subject identification code is stored together with the content which they are authorized to access in the contents administration section. Subjects identified by the identification code may be natural persons, groups of natural persons, computers, groups of computers, or any other devices which may access the content. A number allocated for each company is an example of such identification code. When the number allocated for each company is used as the browsing-permitted subject identification code, the same content is provided for users who work for the same company. Further, even in the same company, different browsing-permitted subject identification codes may be allocated for different sections, then these different sections will have access to different contents.

Contents here can for example be webpages, URLs, files, directories, or any other data which the corresponding subjects are authorized to access.

Figure 3:
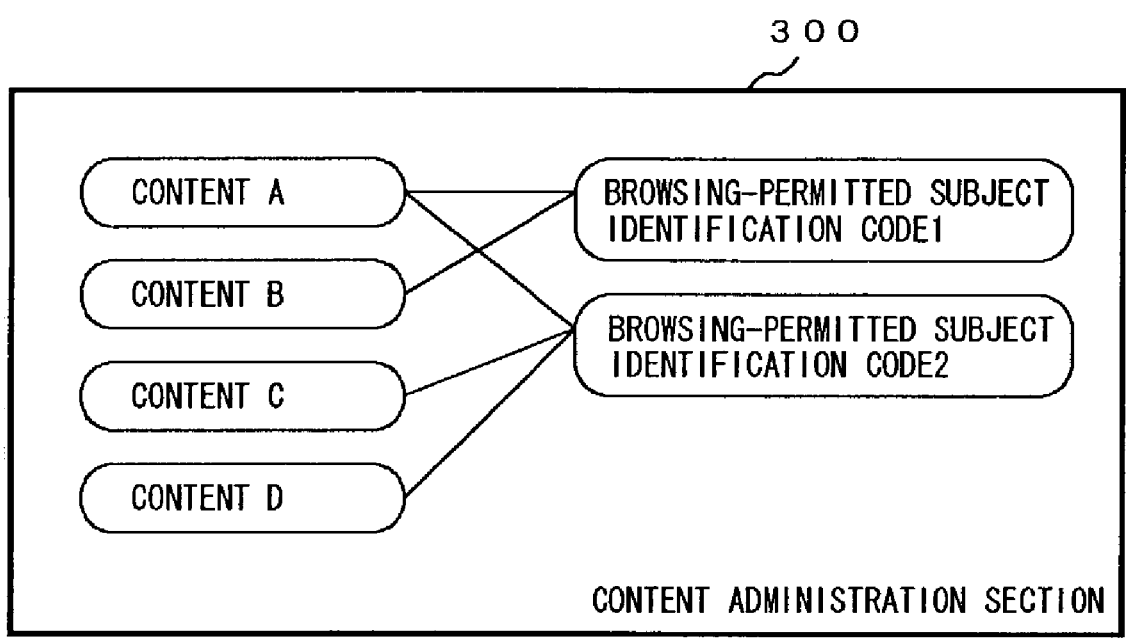
FIG. 3 is an exemplary view showing the state of control in a content administration section.

FIG. 3 exemplifies the state where the content administration section administrates the content and the browsing-permitted subject identification codes. The ellipses vertically arranged on the left show the content, and the ellipses vertically arranged on the right show the browsing-permitted subject identification codes. In this case, a content administration section 300 stores the content. In FIG. 3, the line segments between the ellipses on the left and the ellipses on the right show correspondence of the browsing-permitted subject identification code for each content. For example, FIG. 3 shows that the content called 'content A' corresponds to 'browsing-permitted subject identification code 1' and 'browsing-permitted subject identification code 2', and 'content C' corresponds to 'browsing-permitted subject identification code 2'. The situation shown in FIG. 3 means that content A and content B may be accessed by those subjects (persons, departments of a company, or the like) which are identified by subject identification code 1, and contents A, C, and D may be accessed by those subjects which are identified by subject identification code 2.

FIG. 4 exemplifies the table that the content administration section administers when the content administration section itself does not need to store the content. In this case, it is assumed that the content is identified by content identifier, the content identifiers are stored in the content administration section, and these identifiers reference the actual contents which are stored somewhere else. To maintain correspondence of the browsing-permitted subject identification code for each content, the content identifier and the browsing-permitted subject identification code associated with the content, which is identified by the content identifier, are stored in one line. For example, in the first line of the table, the content identified by the content identifier as 'A040167.html' corresponds to the browsing-permitted subject identification code as 'u284729'.

Note that a column showing a category of details of content identified by the content identifier may be further added to the table shown in FIG. 4. Moreover, as shown if FIG. 3, more than one subject identification codes may correspond to a certain content. For that purpose it is also possible to have additional columns.

As another table that the information processing apparatus of this embodiment should control, there may be a table storing the details of content with respect to the content, a table storing the attribute of organizations identified by the browsing-permitted subject identification codes with respect to the codes, or the like.

In the following description, although description will be made on the assumption that the table storing the details of content and the table storing the attribute of organizations identified by the browsing-permitted subject identification codes are administrated, these tables are not essential constituent requirement for the present invention.

A 'content update information obtaining section' 102 obtains content update information. The 'content update information' is information regarding updates of content. The 'updates of content' can be for example be updates of content details, deletion of content, addition of content, and the like. Although the content update information can include information as to which content has been updated, it may also include information as to how it has been updated. For example, it can include information such that the details have been updated, deleted, or added. Further, in the case where the details of content have been updated, the information may include information as to what kind of details update has been made (for example a change from a html-file type to a WORD document type, a price list is update, a specification of a certain product is revised, etc.).

A 'notification mail generation section' 103 generates a notification mail based on the content update information. The 'notification mail' is an e-mail having notification information that is information regarding the update of the content. In a certain embodiment the update information relates to the update of the details of the content. The notification mail is directed to an e-mail address, which is obtained based on an updated content and an associated browsing-permitted subject identification code, as a destination.

For example, when the content update information includes information as to how the content has been updated, the notification information may include information as to how and which content has been updated.

The e-mail address is obtained based on the browsing-permitted subject identification code. Based on a correspondence relationship, the address is obtained based on the correspondence relationship which is stored somewhere. To each subject identification code there is one or more corresponding e-mail address. There is stored a correspondence between a certain subject identification code and its corresponding e-mail address or e-mail addresses. For example, a certain subject identification code may be associated with or may belong to a corresponding mailing list, and if this is the case, then the notification mail will be directed to all e-mail addresses contained in the list.

In order to maintain the aforementioned correspondence between the subject identification codes and the e-mail addresses, there may exist a table in which the browsing-permitted subject identification codes together with their corresponding e-mail addresses are stored, and the e-mail address may be obtained based on such a table.

Note that an operation such as 'to generate notification mail' described here may include transmission of the notification mail.

Figure 25:
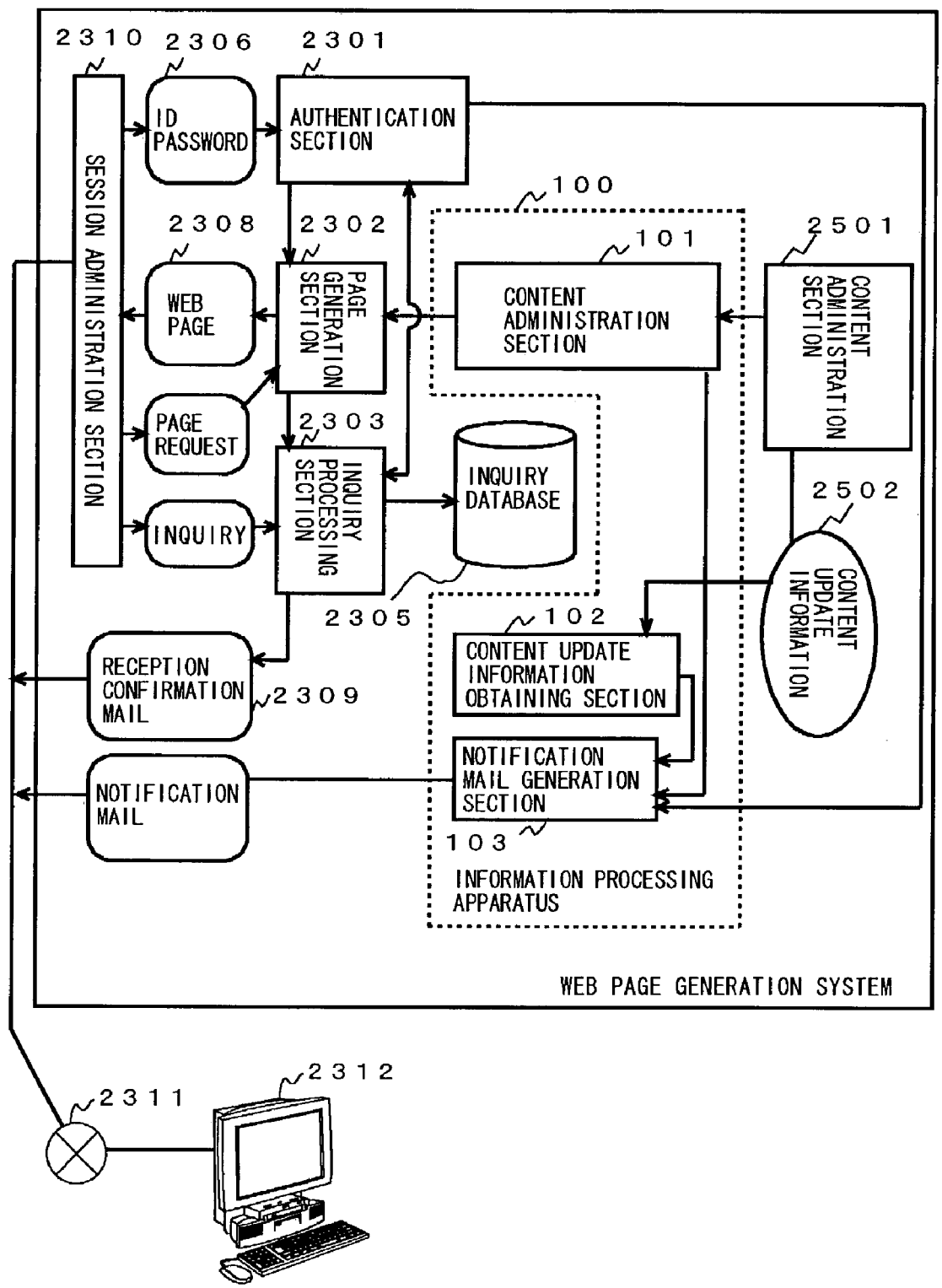
FIG. 25 is an exemplary view of a state where the information processing apparatus in the first embodiment and the WEB page generation system are combined.

FIG. 25 exemplifies the state where the information processing apparatus 100 exemplified in FIG. 2 and the WEB page generation system 2300 exemplified in FIG. 23 have been combined. The area enclosed by a broken line is the information processing apparatus 100 of this embodiment. The information processing apparatus of this embodiment and the WEB page generation system are combined while they share the content administration section 101.

Note that the content administration section should store the content in FIG. 25. Further, a content update section 2501 that is not shown in FIG. 23 is shown. The content update section updates the content stored in the content administration section of FIG. 23. If the content administration section does not store content, the content update section updates the content in a section storing the content.

When the content update section updates the content, the content update section sends content update information 2502 to the content update information obtaining section. Sending the content update information to the content update information obtaining section triggers generation of a notification mail. The e-mail address that is the destination of the notification mail may be the one that the notification mail generation section requests for the authentication section 2301 and obtains based on the browsing-permitted subject identification code.

By combining the information processing apparatus 100 and the WEB page generation system 2300 in this manner, not only content browsing and inquiry handling for the users but also generation of a notification mail for the updated content is made possible.

Figure 5:
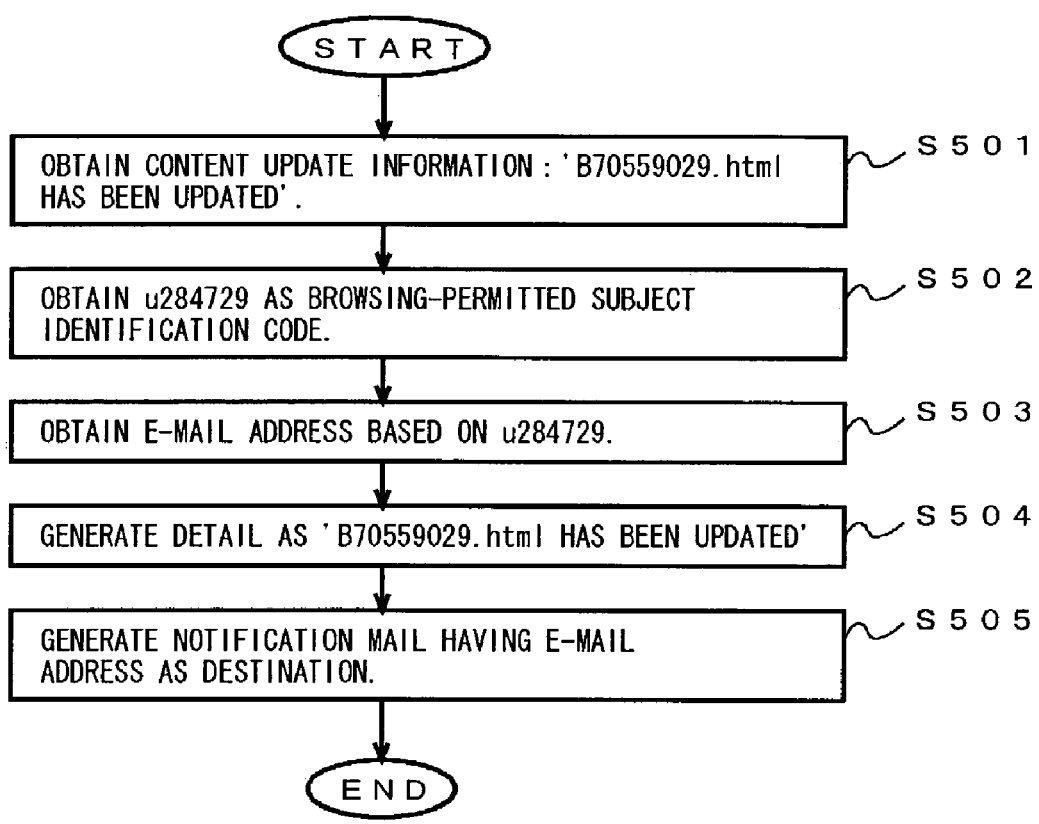
FIG. 5 is a specific example of a processing in the first embodiment.

FIG. 5 exemplifies the flowchart explaining a processing of the information processing apparatus when the content identified by B70559029.html has been updated in the case where the content administration section 101 holds the table of FIG. 4.

At step S501, the content update information obtaining section obtains 'B70559029.html has been updated' that is content update information.

At step S502, 'u284729' is obtained as the browsing-permitted subject identification code based on B70559029.html.

At step S503, the notification mail generation section or the like obtains the e-mail address based on 'u284729'.

At step S504, the notification mail generation section generates notification information having details that 'B70559029.html has been updated'.

At step S505, the notification mail generation section generates a notification mail having the electronic mail address as a destination.

Figure 7:
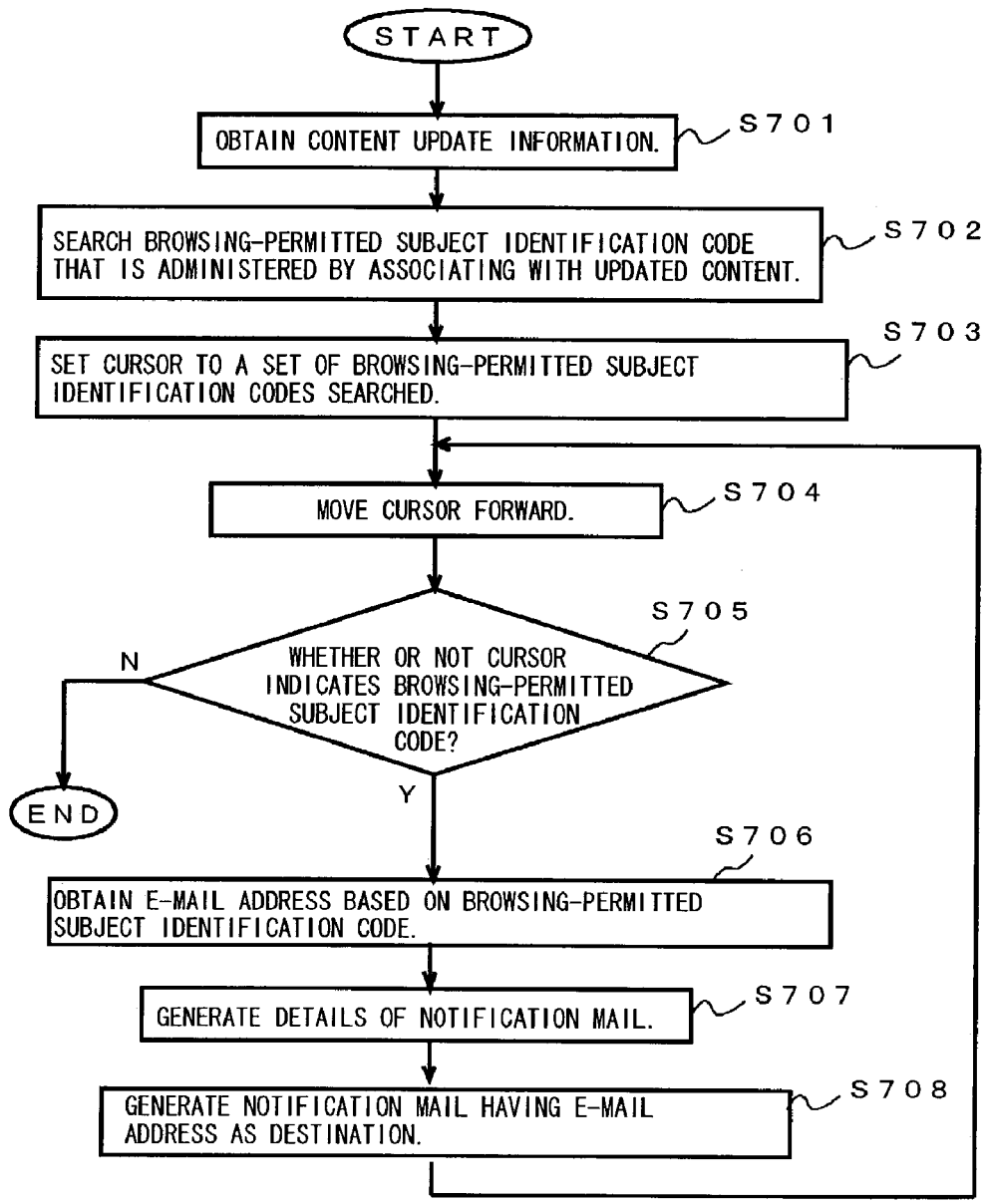
FIG. 7 is a flowchart explaining the processing in the first embodiment.

FIG. 7 exemplifies the flowchart explaining a general operation of the information processing apparatus in this embodiment. In the flowchart, it is assumed that a database administration system administrates association between the content and the browsing-permitted subject identification codes in the content administration section.

At step S701, the content update information obtaining section 102 obtains the content update information.

At step S702, the content administration section searches the browsing-permitted subject identification code, which is administrated by associating with the updated content. A search result is generally a set made up of a plurality of browsing-permitted subject identification codes.

At step S703, a cursor is set to the browsing-permitted subject identification codes that have been searched. A 'cursor' is a pointer that points to a element of the set of searched results. When the cursor is set, it is assumed that the elements are arranged in order in the set, and the cursor points to a virtual element before the first element.

At step S704, the cursor is moved forward. When the cursor points to the virtual element before the first element, the cursor points to the first element by moving the cursor forward.

At step S705, whether the browsing-permitted subject identification code is pointed to by the cursor is determined. If the cursor is moved forward after the cursor points to the last element in the set, then the cursor is in the state where it does not point to any browsing permitted element. If the browsing-permitted subject identification code is indicated by the cursor, the processing moves to step S706. Otherwise, the processing thus ends since all the browsing-permitted subject identification codes have been processed.

At step S706, the e-mail address is obtained based on the browsing-permitted subject identification code.

At step S707, the notification mail generation section generates the details of notification mail.

At step S708, the notification mail generation section generates the notification mail having the e-mail address as a destination.

(First Embodiment: Example of Notification Mail)

FIG. 6 shows the example of the notification mail. In the example, the content is indicated by hyperlink via URLs (Uniform Resource Locator). FIG. 6 shows that a notification mail has been generated to a recipient having the mail address foo@bar.com.xyz. The mail informs its recipient about the fact that the content indicated by the URL as http://www.foo.bar/topics-A.html was added and about the fact that the content indicated by the URL as http://www.foo.bar/ac-adaptor-a347.html was updated.

A computer can embody the information processing apparatus of this embodiment. In this case, the computer operates an information processing program that causes the computer to execute a content administration step, a content update information obtaining step, and a notification mail generation step.

The 'content administration step' is a step where plural kinds of contents and the browsing-permitted subject identification code for each content are administrated by associating them. For example, it is the step where the database administration system storing the table exemplified in FIG. 4 is operated.

The 'content update information obtaining step' is a step where the content update information is obtained. For example, it is the step where the content update information, which is entered by an input device such as a keyboard connected to the computer, is read.

The 'notification mail generation step' is a step where the notification mail is generated.

The content administration step corresponds to step S702 where the browsing-permitted subject identification code is searched. The content update information obtaining step corresponds to step S701. Further, the notification mail generation step corresponds to steps S706, S707 and S708.

Furthermore, it is also possible to store the information processing program of this embodiment in a medium such as a CD-ROM.

According to this embodiment, since the notification mail is generated to the e-mail address, which is obtained based on the browsing-permitted subject identification code corresponding to the updated content, it is possible to timely notify the users of update of content. Further, since the notification mail is sent to the user who is related to the updated content, the updated content is never sent to those who are not target users.

Furthermore, in the invention disclosed in Japanese Patent Laid-open No. Hei10-171700 publication, users who want to receive the update notice mail need to take time to register their e-mail addresses, and when even one data file of the registered disc is updated, the update notice mail is transmitted to all the registered e-mail addresses. On the other hand, in this embodiment, the users do not need to register their e-mail addresses. Still further, the notification mail is transmitted according to association between the content and the browsing-permitted subject identification codes, so that the notification mail is transmitted only to the users who can browse the updated content and thus wasteful traffic does not occur.

Figure 8:
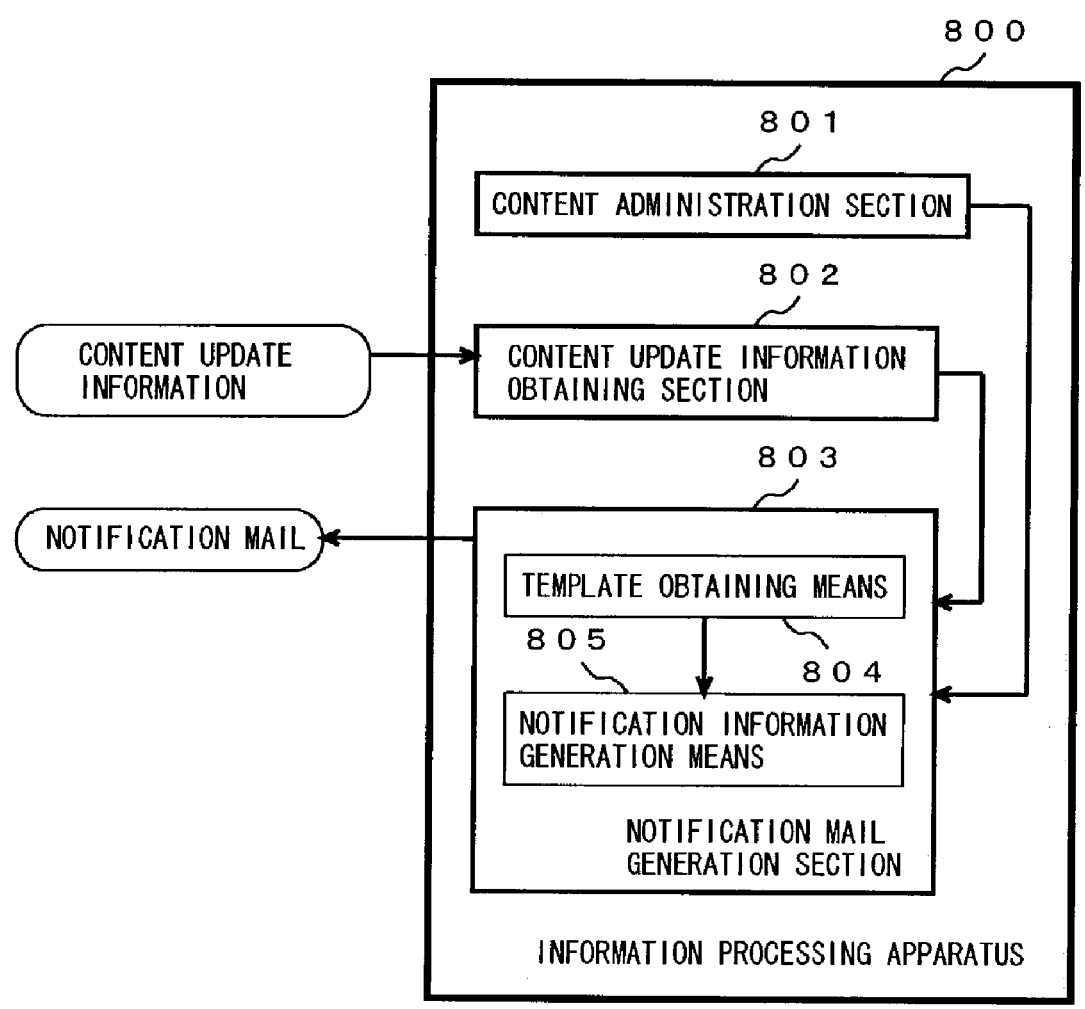
FIG. 8 is a functional block diagram of the information processing apparatus in a second embodiment of the present invention.

FIG. 8 exemplifies the functional block diagram of the information processing apparatus according to the second embodiment of the present invention. In this embodiment, generation of notification mail is performed based on a template.

In an information processing apparatus 800 in this embodiment, the notification mail generation section of the information processing apparatus in the first embodiment comprises template obtaining means 804 and notification information generation means 805.

The 'template obtaining means' 804 obtains the template. The 'template' refers to a pattern, and is information where areas in which information should be filled and kinds of information that should be filled in the areas are determined.

FIG. 9 shows the example of the template in this embodiment. The areas enclosed by '{' and '}' show the areas where information is filled, and character strings enclosed by '{' and '}' show the kinds of information that should be filled in the areas. For Example, {mail_address} shows that the e-mail address that is a destination should be filled therein. Further, {renewal_genre}, {renewal_title} and {renewal_url} show that the category of the updated content, the title name of the updated content, and the URL of the updated content should be respectively filled therein. The content administration section administers the category, the title name and the like of the updated content and they may be obtained from the content administration section, or they are included in the content update information and the category, the title name and the like of the updated content may be obtained from the content update information.

The 'notification information generation means' 805 generates the notification information by using the template that the template obtaining means has obtained. Specifically, the means fills appropriate information in the position where the information of the obtained template is filled. Note that it is not limited that the notification information generated by the notification information generation means is filled only by filling the template, but a part of the notification information may be generated by means other than filling the template.

Figure 26:
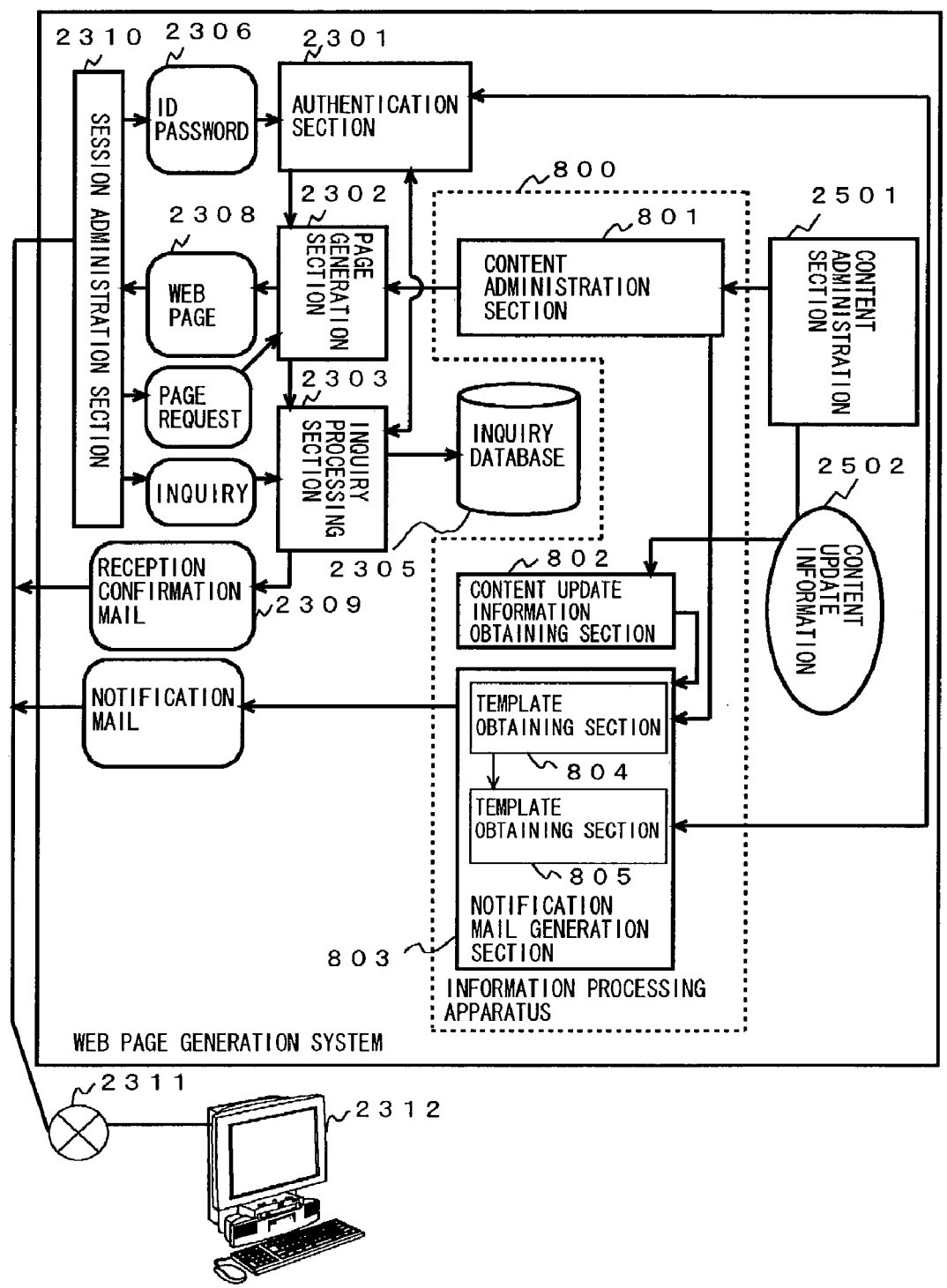
FIG. 26 is an exemplary view of a state where the information processing apparatus in the second embodiment and the WEB page generation system are combined.

FIG. 26 exemplifies the embodiment wherein the information processing apparatus 800 exemplified in FIG. 8 and the WEB page generation system 2300 exemplified in FIG. 23 have been combined. The area enclosed by the broken line is the information processing apparatus 800 of this embodiment. The information processing apparatus of this embodiment and the WEB page generation system are combined while they share the content administration section 801.

Note that the content update section 2501 is the one described in the first embodiment. Further, the notification mail generation section may be designed to operate so as to request the authentication section for the e-mail address that is the destination of the notification mail based on the browsing-permitted subject identification code, and to obtain the e-mail address.

By combining the information processing apparatus 800 and the WEB page generation system 2300 in this manner, not only content browsing and inquiry handling for the users but also generation of the notification mail using the template of the updated content is made possible.

Figure 10:
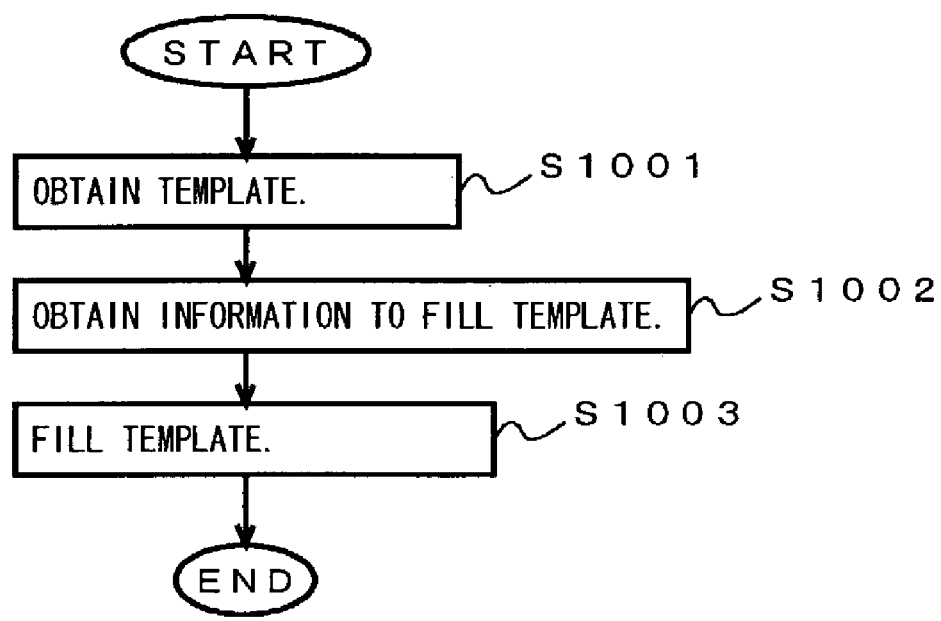
FIG. 10 is a flowchart of the processing in the second embodiment.

FIG. 10 exemplifies the flowchart explaining generation of the notification information in the information processing apparatus in this embodiment.

On step S1001, the template obtaining means obtains the template. In obtaining the template, the same template may be always obtained, or the template may be obtained based on the content update information obtained by the content update information obtaining means. Alternatively, the template may be obtained based on the browsing-permitted subject identification code associated with the updated content. For example, the template is determined for each browsing-permitted subject identification code and the determined template may be obtained. Further, the template may be obtained based on the e-mail address obtained based on the browsing-permitted subject identification code.

On step S1002, information filled in the template is obtained based on the content update information.

On step S1003, the notification information generation means fills the template.

By generating the notification information using the template, the appearance of the notification mail can be changed through regularly revising the template. Further, it is possible to generate the notification mail that fits the destination of the notification mail. For example, the notification mail using graphics by an HTML mail is generated for the users to whom a high-speed Internet line is connected, and the notification mail that typically consists of only text can be generated to the other users.

Figure 11:
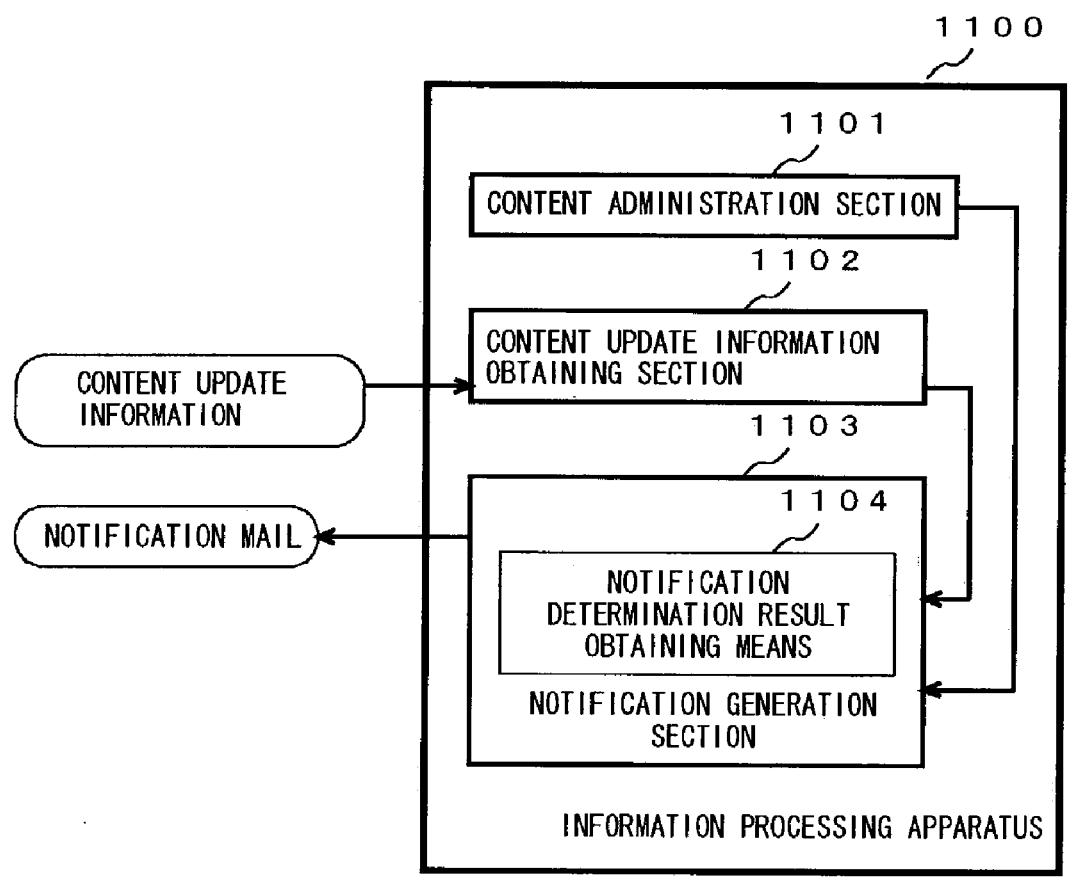
FIG. 11 is a functional block diagram of the information processing apparatus in a third embodiment of the present invention.

FIG. 11 exemplifies the functional block diagram of the information processing apparatus according to the third embodiment of the present invention.

In this embodiment, the notification mail is not always generated when the apparatus obtains the content update information, but a determination result whether the notification mail is generated or not is obtained and whether the mail is generated or not is determined based on the determination result.

In an information processing apparatus 1100 in this embodiment, the notification mail generation section of the information processing apparatus in the first embodiment comprises notification determination result obtaining means 1104, and generates the notification mail based on the notification determination result obtained by the notification determination result obtaining means.

The 'notification determination result obtaining means' 1104 obtains a notification determination result that is information for determining whether the notification mail is generated or not in response to the content update information. For example, the means displays the screen exemplified in FIG. 13 to let the user select either one of buttons (1301, 1302), and thereby obtaining a selection result of the user.

Figure 27:
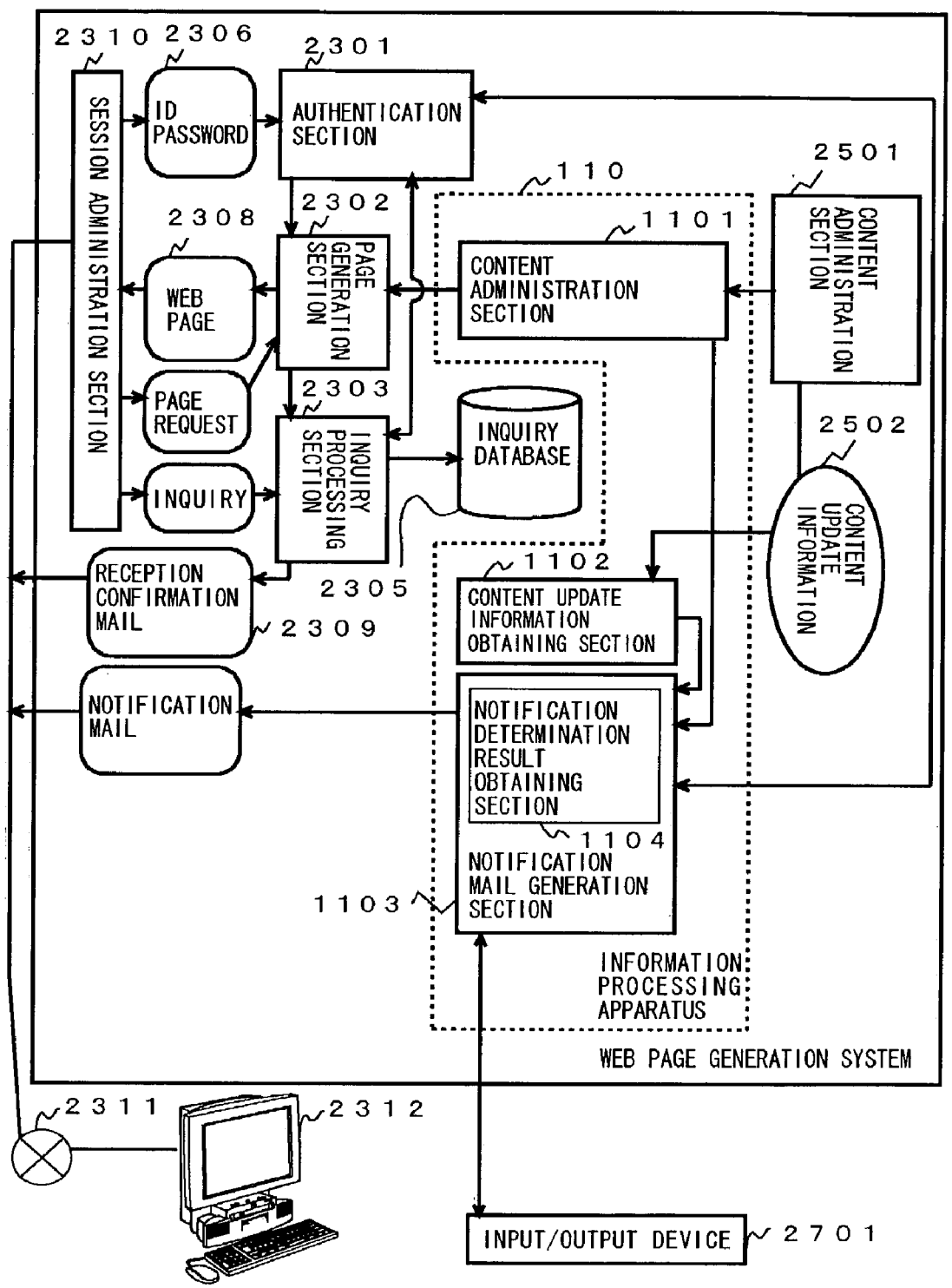
FIG. 27 is an exemplary view of a state where the information processing apparatus in the third embodiment and the WEB page generation system are combined.

FIG. 27 exemplifies the state where the information processing apparatus 1100 exemplified in FIG. 11 and the WEB page generation system 2300 exemplified in FIG. 23 have been combined. The area enclosed by a broken line is the information processing apparatus 1100 of this embodiment. The information processing apparatus of this embodiment and the WEB page generation system are combined while they share the content administration section 1101.

Note that the content update section 2501 is the one described in the first embodiment. Further, the notification mail generation section may operate so as to request the authentication section for the e-mail address that is the destination of the notification mail based on the browsing-permitted subject identification code, and to obtain the electronic e-mail address.

By combining the information processing apparatus and the WEB page generation system in this manner, not only content browsing and inquiry handling for the users but also generation of the notification mail of the updated content according to the determination result is made possible.

Figure 13:
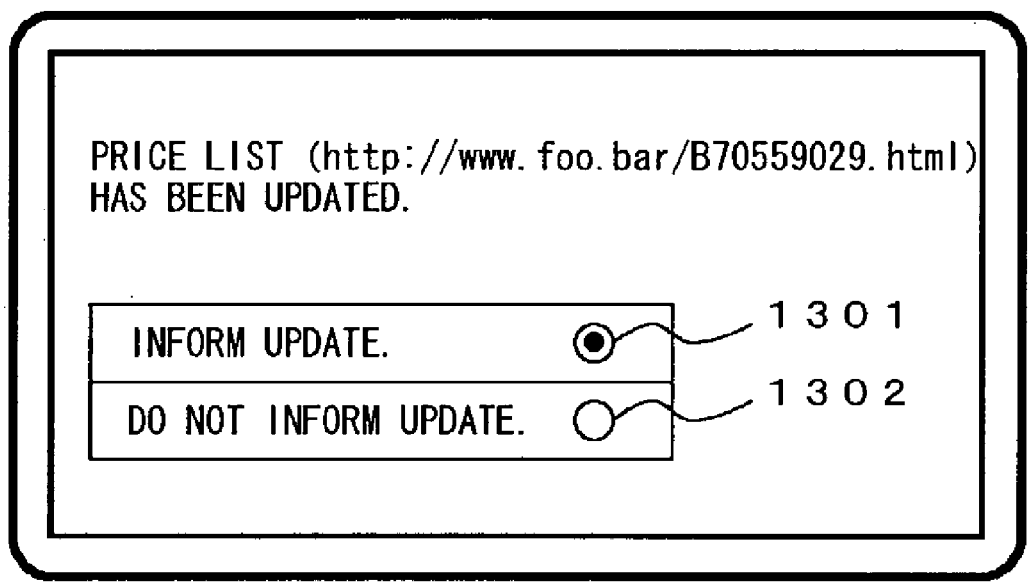
FIG. 13 is an exemplary view of a screen for obtaining a notification determination result in the third embodiment.

In FIG. 27, an input/output device 2701 is a device used when the notification determination result obtaining means 1104 outputs the screen exemplified in FIG. 13 and for entering the notification determination result, and the device comprises a CRT, a keyboard, a mouse and the like. Further, the input/output device may not be directly connected to the WEB page generation system 2300 but may be connected to the system via a communication network.

Figure 12:
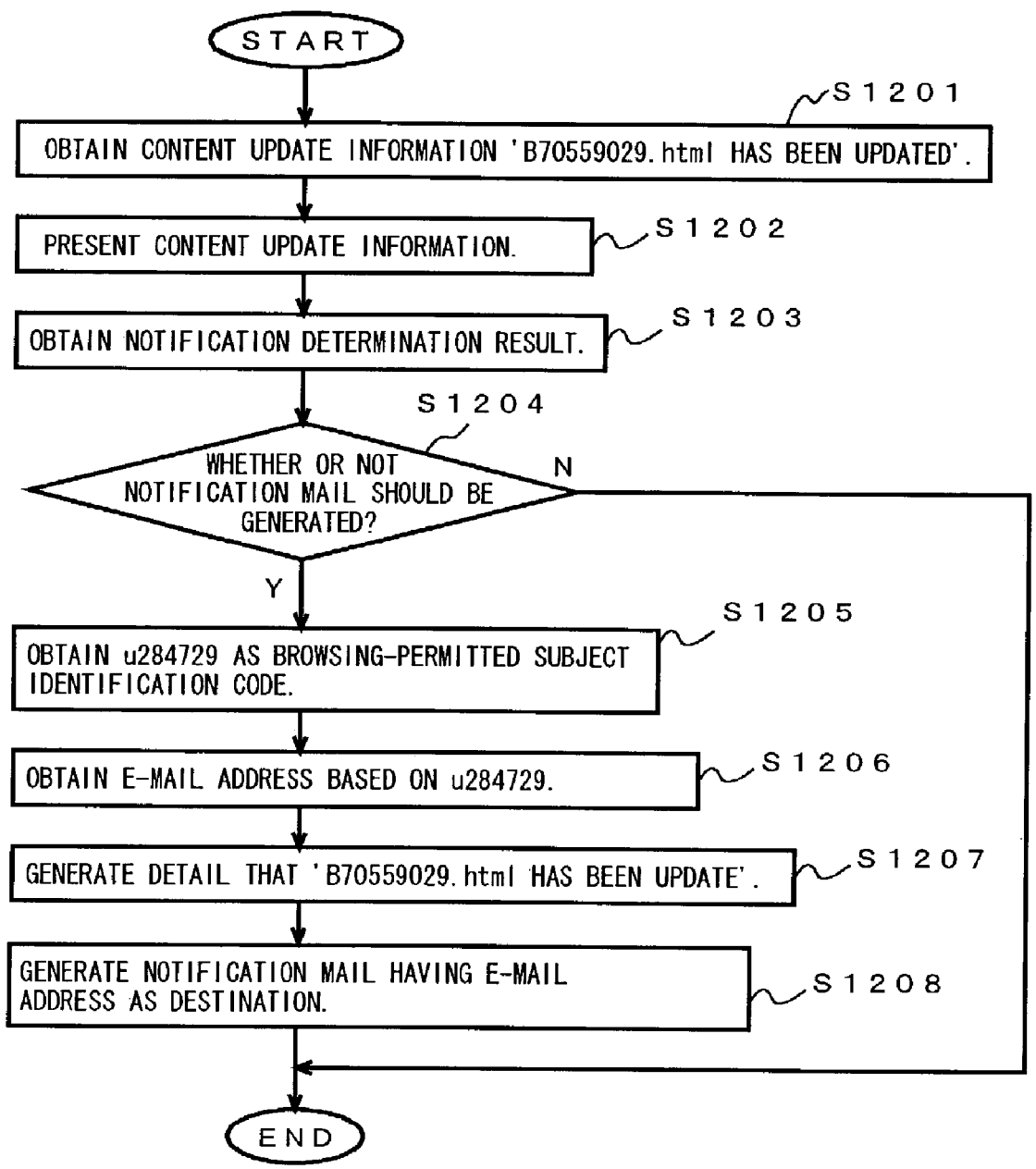
FIG. 12 is a specific example of the processing in the third embodiment.

FIG. 12 is the flowchart explaining the specific example of the operation of the information processing apparatus in this embodiment. In the flowchart, description is made for the processing when the content expressed by B70559029.html has been updated.

On step S1201, the apparatus obtains the content update information as 'B70559029.html has been updated'.

On step S1202, the content update information is presented. For example, the apparatus shows which content has been updated by presenting the screen exemplified in FIG. 13. A person in charge of sales for the users, who are the target of the updated content, and an operator of the information processing apparatus can be cited as a subject person to whom the screen exemplified in FIG. 13 is presented.

On step S1203, the notification determination result obtaining means obtains the notification determination result. For example, it obtains information as to which of the buttons (1301, 1302) has been pushed.

On step S1204, determination is made as to whether the notification mail should be generated or not. If it is determined that the notification mail should be generated, the processing proceeds to step S1205. Otherwise, the processing ends.

At step S1205, the content administration section obtains u284729 as the browsing-permitted subject identification code associated with B70559029.html.

At step S1206, the e-mail address is obtained based on u284729.

At step S1207, the detail as 'B70559029.html has been updated' is generated.

At step S1208, the notification mail having the e-mail address as a destination is generated.

Figure 14:
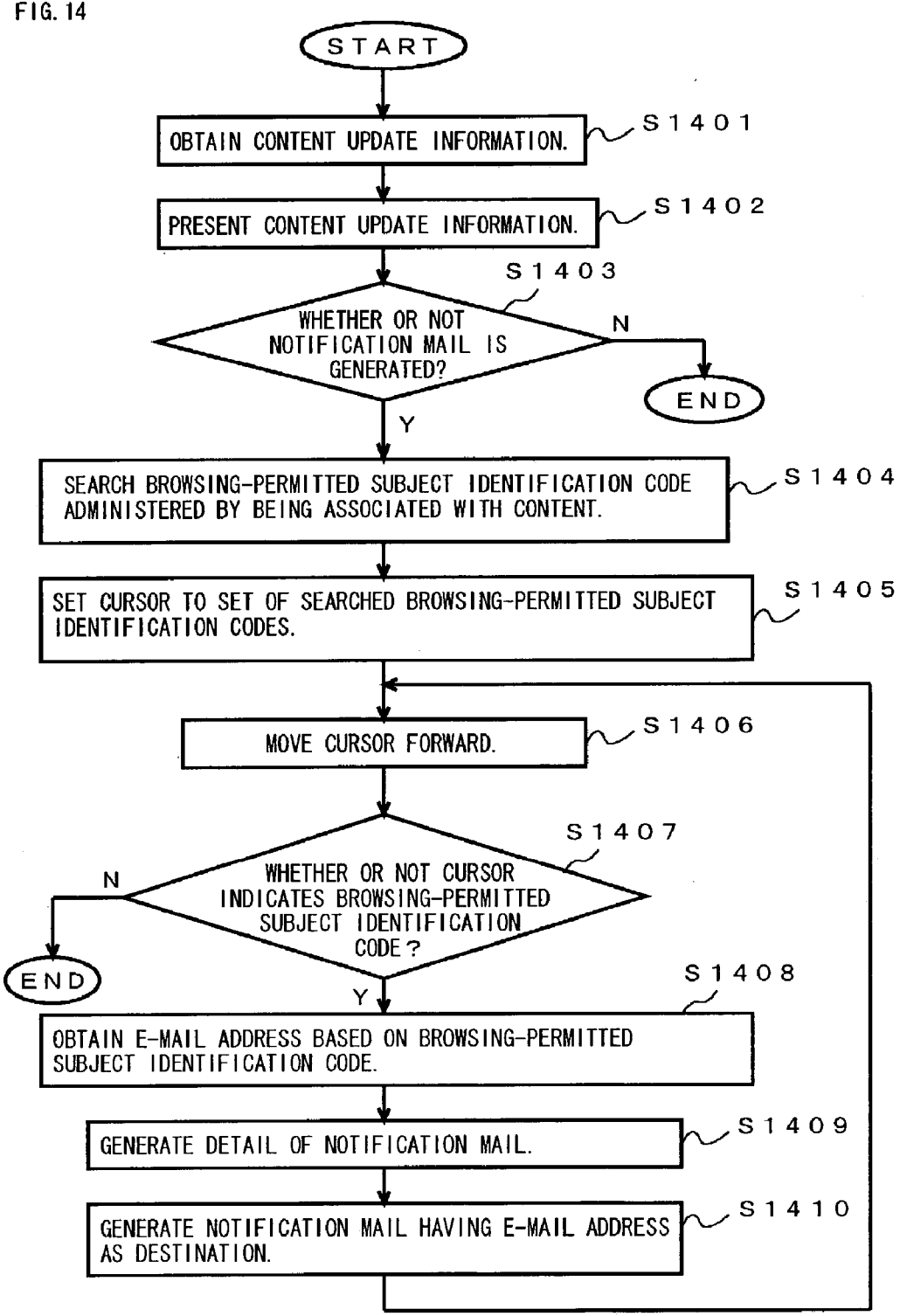
FIG. 14 is a flowchart of the processing in the third embodiment.

FIG. 14 exemplifies the flowchart explaining the general processing of the information processing apparatus in this embodiment.

At step S1401, the content update information obtaining section obtains the content update information.

At step S1402, the content update information is presented.

At step S1403, the notification determination result obtaining means obtains the notification determination result according to the content update information presented, and determines whether the notification mail should be generated or not. If it is determined that the notification mail should be generated, the processing proceeds to step S1404. Otherwise, the processing ends.

At and after step S1404, the processing of the flowchart exemplified in FIG. 7 is performed.

According to this embodiment, it is possible to determine whether the notification mail should be generated or not corresponding to the level of content update (correction of errors, or essential revision of detail, for example). Thus, a meaningless notification mail is prevented from being sent to the customers, and it is possible to prevent the customers from being inconvenienced.

Figure 15:
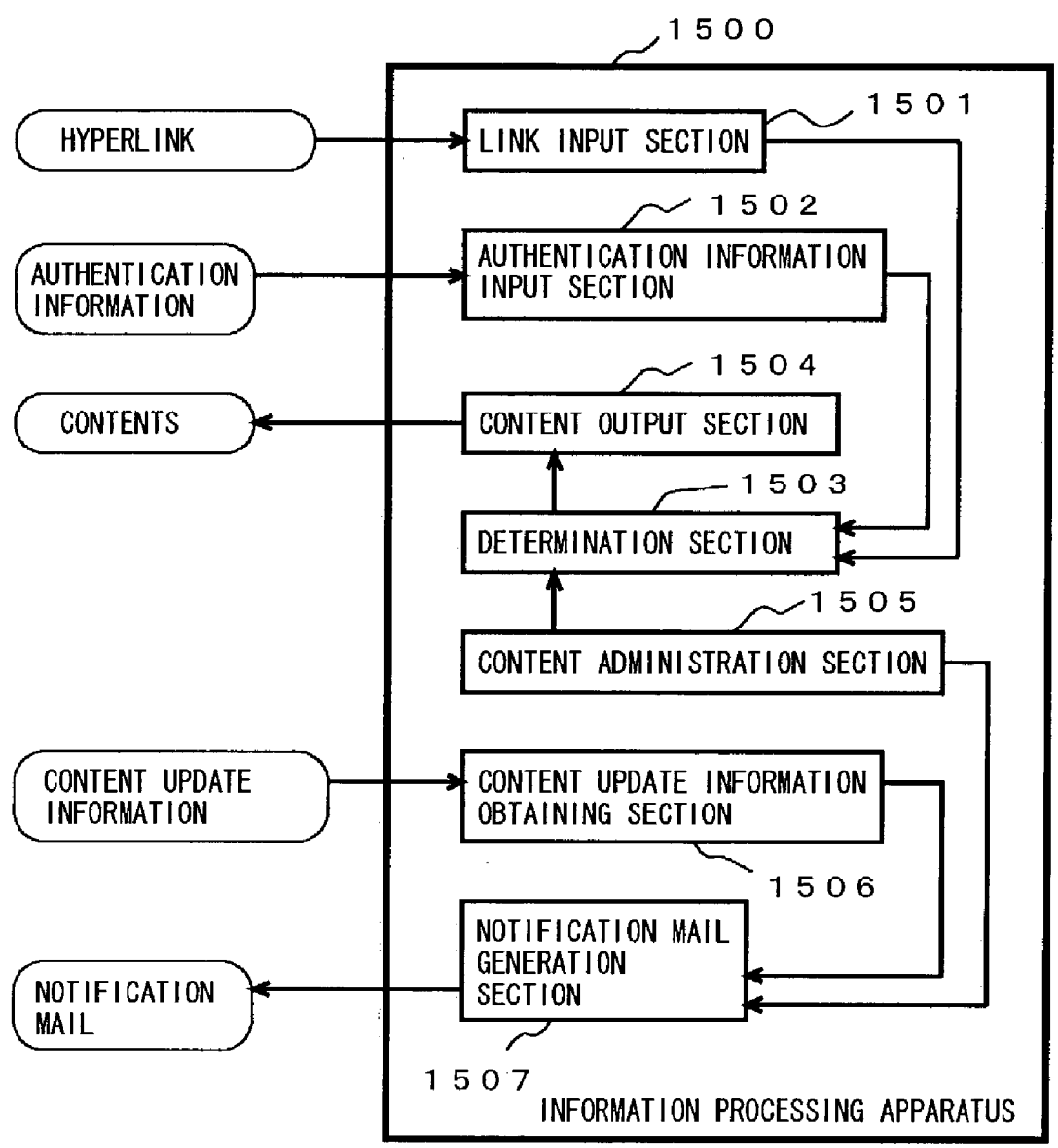
FIG. 15 is a functional block diagram of the information processing apparatus in a fourth embodiment of the present invention.

FIG. 15 exemplifies the functional block diagram of the information processing apparatus according to the fourth embodiment of the present invention. In this embodiment, contents are tracked by hyperlinks. When the information processing apparatus of this embodiment receives the hyperlink, the content indicated by the hyperlink is output.

An information processing apparatus 1500 in this embodiment is one in which the information processing apparatus in one of the first to third embodiments comprises a link input section 1501, an authentication information input section 1502, a determination section 1503, and a content output section 1504.

The 'link input section' 1501 enters the hyperlink. The 'hyperlink' is information expressed by the URL. In this embodiment, a part of the URL may be input into the section. For example, a part after the domain name out of the URL may be entered. Note that to 'enter' means to read from outside into the input section.

The 'authentication information input section' 1502 enters authentication information. The 'authentication information' is information for authentication. It is, for example, an ID and a password and used to determine whether the person or the device that entered the authentication information has an authority to view the contents indicated by the hyperlink entered at the link input section 1501.

The 'determination section' 1503 determines whether authentication information corresponding to the browsing-permitted subject identification code, which is associated with the content linked to the hyperlink entered by the link input section 1501, matches authentication information entered by the authentication information input section 1502. The 'content linked to the hyperlink' is the content indicated by the hyperlink. Note that if the hyperlink is a part of URL after the domain name, it may be understood that a domain name allocated for the information processing apparatus 1500 is specified as the domain name.

Association between the content and the browsing-permitted subject identification codes shall be performed by the content administration section 1505.

'The authentication information match' means that the authentication information is correct. For example, when the information is the ID and password, to match means that the password specified by the ID and the entered password match. Further, in this embodiment, determination as to whether the information 'match' includes a determination as to whether or not a person specified by the entered password may browse the content, which is indicated by the hyperlink that has been input to the input section.

The 'content output section' 1504 outputs the content identified by the hyperlink input to the link input section 1501 when the determination result in the determination section 1503 is the 'information has matched'.

Figure 28:
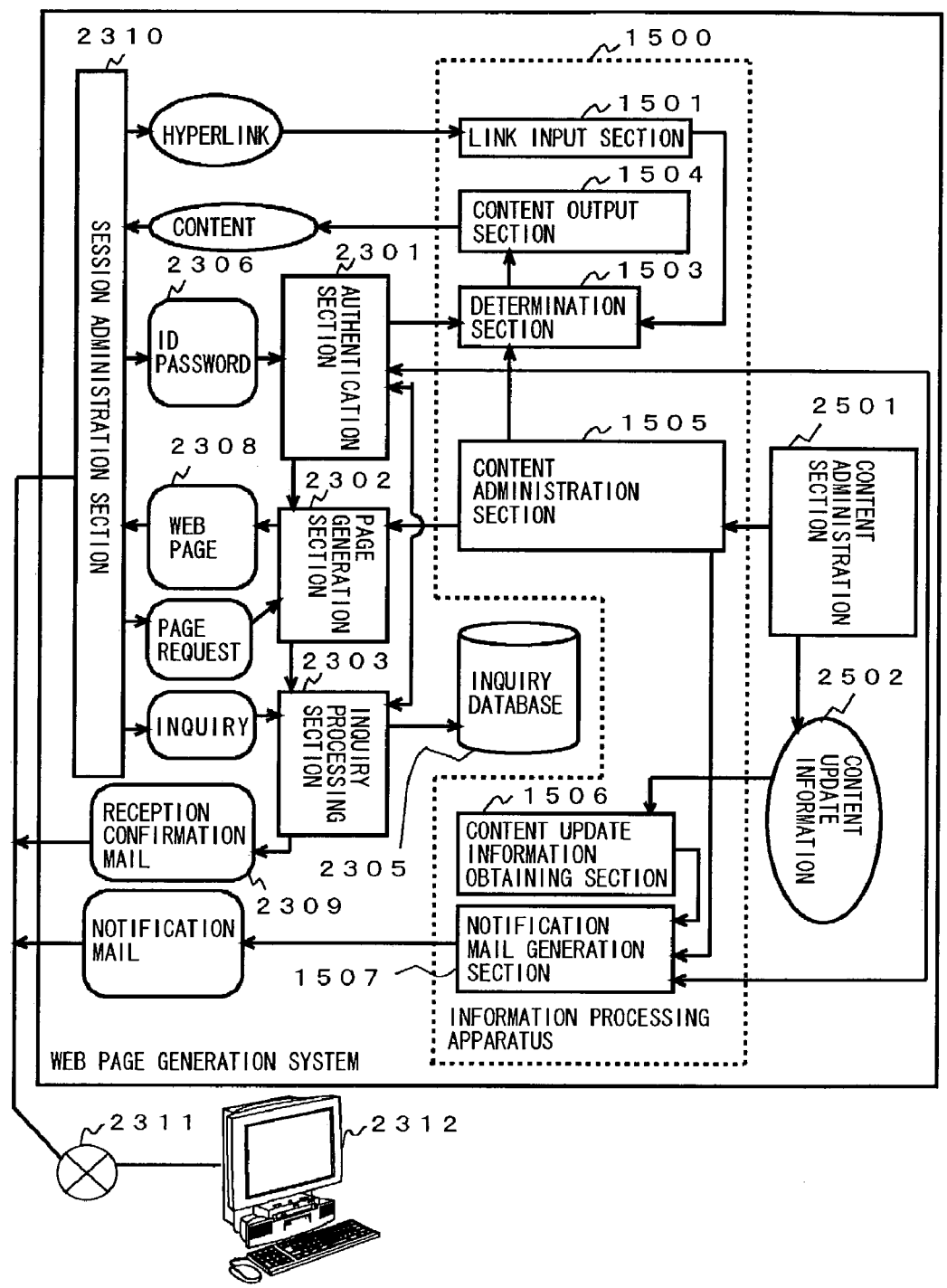
FIG. 28 is an exemplary view of a state where the information processing apparatus in the fourth embodiment and the WEB page generation system are combined.

FIG. 28 exemplifies the state where the information processing apparatus 1500 exemplified in FIG. 15 and the WEB page generation system 2300 exemplified in FIG. 23 have been combined. The area enclosed by the broken line is the information processing apparatus 1500 of this embodiment. The information processing apparatus of this embodiment and the WEB page generation system are combined while they share the content administration section 1505.

Note that the content update section 2501 is the one described in the first embodiment. Further, the notification mail generation section may be designed to operate so as to request the authentication section for the e-mail address that is the destination of the notification mail based on the browsing-permitted subject identification code, and to obtain the electronic mail address.

By combining the information processing apparatus 1500 and the WEB page generation system 2300 in this manner, not only content browsing and inquiry handling for the users but also generation of the notification mail of the updated content is made possible, and access to content other than the content presented by the WEB page 2308 can be restricted.

Figure 16:
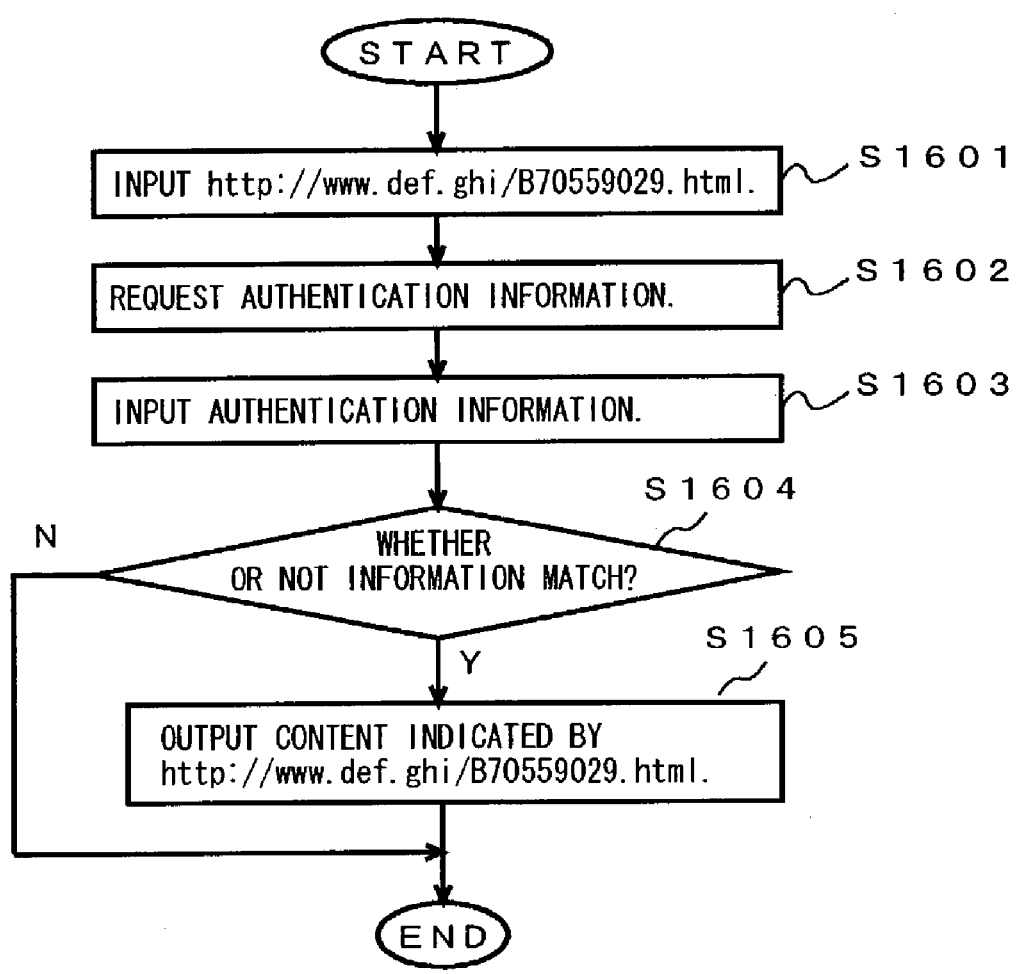
FIG. 16 is a specific example of the processing in the fourth embodiment.

FIG. 16 shows the specific example of the processing after the hyperlink has been input to the information processing apparatus of this embodiment.

At step S1601, a hyperlink is input to the link input section. Only a file name such as B70559029.html may be entered, and in such a case, the processing is moved forward on the assumption that a host name has been specified as the domain name allocated for the information processing apparatus.

At step S1602, the authentication information input section or the like requests the authentication information.

At step S1603, the authentication information is input to the authentication information input section.

At step S1604, whether the authentication information entered and the authentication information associated with the hyperlink which is input at step S1601 match or not is determined. If it is determined that they match, the processing proceeds to step S1605. Otherwise, the processing ends.

At step S1605, the content output section outputs the content indicated by the hyperlink which is input at step S1601.

According to this embodiment, only the person who enters the matching authentication information can view the particular content. For example, in the case where different price lists are presented for different companies, it is possible to prevent the price lists from being browsed by a person who is not employed by the companies for which the price lists should be originally presented.

In this embodiment, the content administration section in the first to fourth embodiments administers a notification preferences presence information that specifies whether or not the user prefers to receive a notification mail, and the notification mail generation section generates a notification mail based on the notification mail preference presence information.

FIG. 17 is the example of the table of correspondence between the content and the browsing-permitted subject identification codes, which is administered by the content administration section. The content identifiers, the browsing-permitted subject identification codes, and the notification mail preferences presence information are stored in the table by being associated with each other. When the content update information obtaining means obtains the content update information, the browsing-permitted subject identification code associated with the updated content is searched, and the notification mail preferences presence information is also searched. Then, the notification mail is generated to the e-mail address obtained based on the browsing-permitted subject identification code whose notification mail preferences presence information is 'Yes'.

For example, when A040167.html is updated, 'u284729, Yes' and 'g223121,No' are searched, and the notification mail is generated for the e-mail address obtained based on u284729 but the notification mail is not generated for the electronic mail address obtained based on g223121.

Further, it is not necessary that one table controls the content identifiers, the browsing-permitted subject identification codes, and the notification mail preferences presence information. FIG. 18 exemplifies the table used in combination with the table in FIG. 4. The table stores information on which notification mail that should be generated against e-mail addresses obtained based on the browsing-permitted subject identification code.

When the table of FIG. 17 is used, whether the notification mail should be generated can be decided for each content. On the other hand, when this embodiment is realized using the table of FIG. 4 and the table of FIG. 18, generation of notification mail is generally controlled for the browsing-permitted subject identification code.

Figure 19:
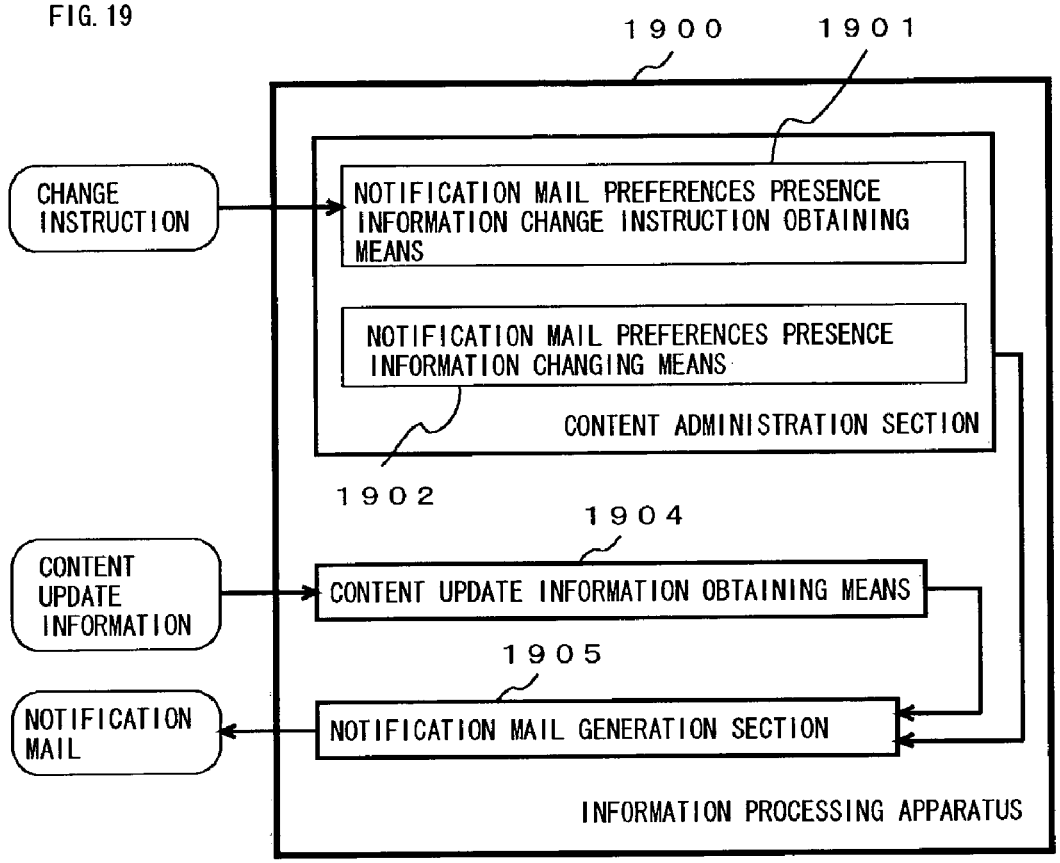
FIG. 19 is an exemplary view of the information processing apparatus in a sixth embodiment of the present invention.

FIG. 19 shows the functional block diagram of the information processing apparatus according to the sixth embodiment of the present invention. This embodiment is one where the notification mail preferences presence information in the fifth embodiment can be changed.

In an information processing apparatus 1900 in this embodiment, the content administration section of the information processing apparatus of the fifth embodiment has notification mail preferences presence information change instruction obtaining means 1901, and notification mail preferences presence information changing means 1902.

The 'notification mail preferences presence information change instruction obtaining means' obtains a change instruction that is an instruction to change the notification mail preferences presence information.

For example, when the content administration section administrates the notification mail preferences presence information by the table of FIG. 17, the screen exemplified in FIG. 20 may be displayed in order to obtain the change instruction for changing the notification mail preferences presence information of each content for a particular browsing-permitted subject identification code. FIG. 20 exemplifies the screen for obtaining the change instruction for each content for the browsing-permitted subject identification code u284729. The change instruction for each content can be specified by buttons (2001, 2002, 2003, 2004) or the like, and the notification mail preferences presence information change instruction obtaining means can obtain the change instruction when an update button 2005 is pushed.

Figure 21:
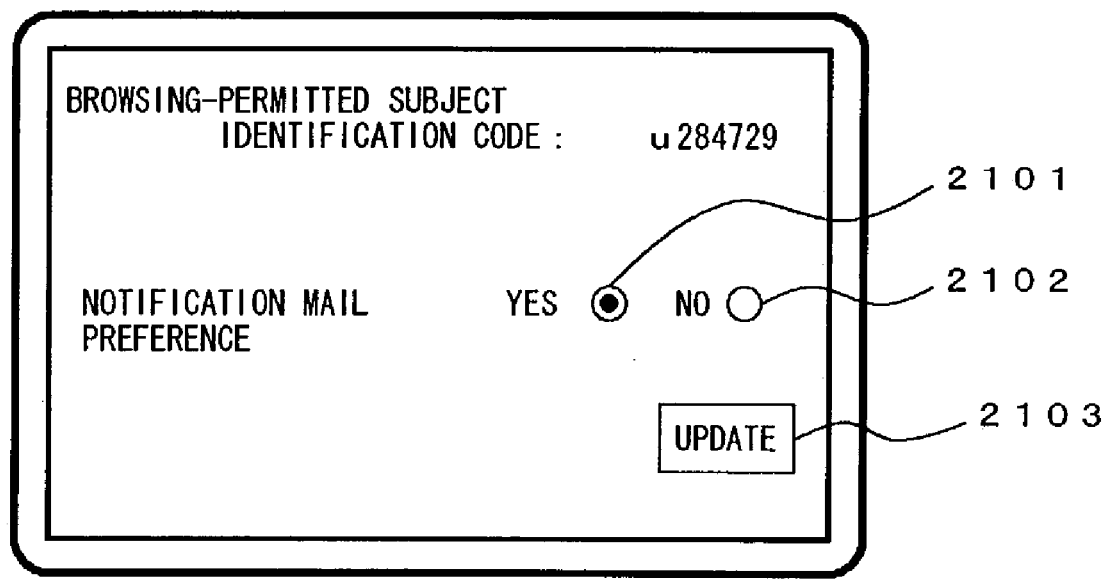
FIG. 21 an exemplary view of another screen for obtaining the update instruction in the sixth embodiment.

Further, when the content administration section administrates the content, the browsing-permitted subject identification codes, and the notification mail preferences presence information by the table of FIG. 4 and the table of FIG. 18, the screen exemplified in FIG. 21 may be displayed. FIG. 21 exemplifies the screen for changing the notification mail wish presence information of the browsing-permitted subject identification code u284729. The change instruction can be specified for the notification mail preferences presence information for the browsing-permitted subject identification code by buttons (2101, 2102), and the notification mail preferences presence information change instruction obtaining means can obtain the change instruction when an update button 2103 is pushed.

Note that the screen exemplified in FIG. 20 or FIG. 21 may be presented for an administrator of the information processing apparatus 1900 or may be presented for the user having the browsing-permitted subject identification code.

The 'notification mail preferences presence information changing means' 1902 changes the notification mail preferences presence information in response to the change instruction obtained by the notification mail preferences presence information change instruction obtaining means 1901.

Specifically, an operation to update the values in the column of the notification mail preferences presence information in the table shown in FIG. 17 or FIG. 18 is performed based on the obtained update instruction by using the browsing-permitted subject identification code as a key value.

Figure 29:
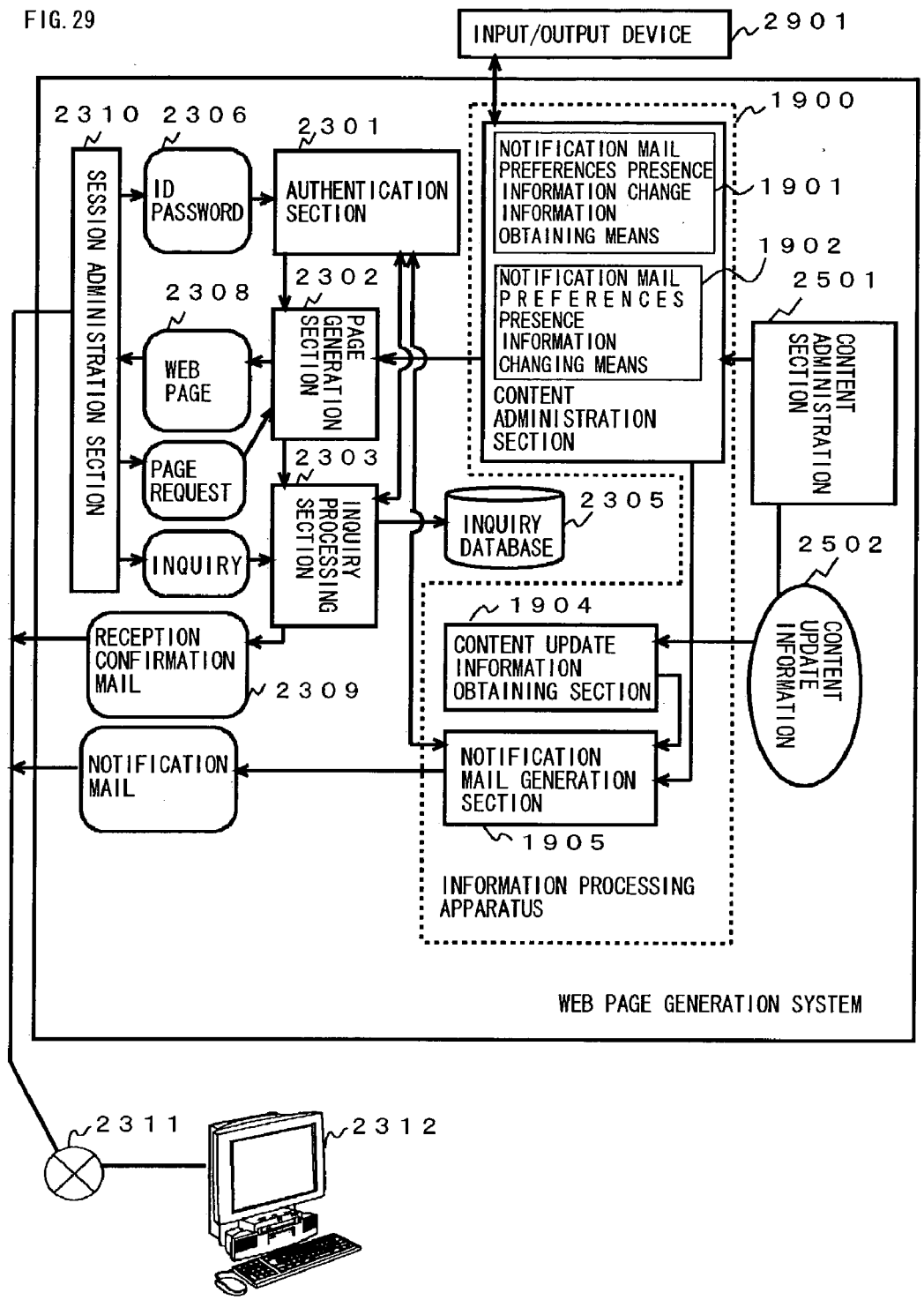
FIG. 29 is an exemplary view of a state where the information processing apparatus in the sixth embodiment and the WEB page generation system are combined.

FIG. 29 exemplifies the state where the information processing apparatus 1900 exemplified in FIG. 19 and the WEB page generation system 2300 exemplified in FIG. 23 have been combined. The area enclosed by the broken line is the information processing apparatus 1900 of this embodiment. The information processing apparatus of this embodiment and the WEB page generation system are combined while they share the content administration section.

Note that the content update section 2501 is the one described in the first embodiment. Further, the notification mail generation section may be designed to operate so as to request the authentication section for the e-mail address that is the destination of the notification mail based on the browsing-permitted subject identification code, and to obtain the e-mail address.

By combining the information processing apparatus 1900 and the WEB page generation system 2300 in this manner, not only content browsing and inquiry handling for the users but also generation of the notification mail of the updated content is made possible for the user who prefers to receive notification mail of the updated content.

In FIG. 29, an input/output device 2901 is a device used when the notification mail preference presence information change instruction obtaining means 1901 outputs the screen for obtaining the notification mail preferences presence information and for entering the notification mail preference presence information. The input/output device may be directly connected to the WEB page generation system or may be connected to the system via the communication network.

According to this embodiment, it is possible to change the notification mail preference presence information. Thus, the notification mail is not generated for the user who does not prefer to receive the notification mail and the notification mail can be generated for the user who prefers the notification mail.

The outline of embodiments from the seventh embodiment onward will be described.

FIG. 83 exemplifies the state of access to the conventional WEB page generation system. Specifically, an employee 8302 who works for company A 8301 makes a WEB page generation system 8303 execute authentication processing to himself/herself via the terminal 8304, and then, he/she can browse content via the terminal 8304. The 'content' described here may be content disclosed only for the company A 8301, for example. Further, the authentication processing is performed when the employee 8302 enters an identification code (user ID) and a password, which identify the employee 8302, for example.

Figure 84:
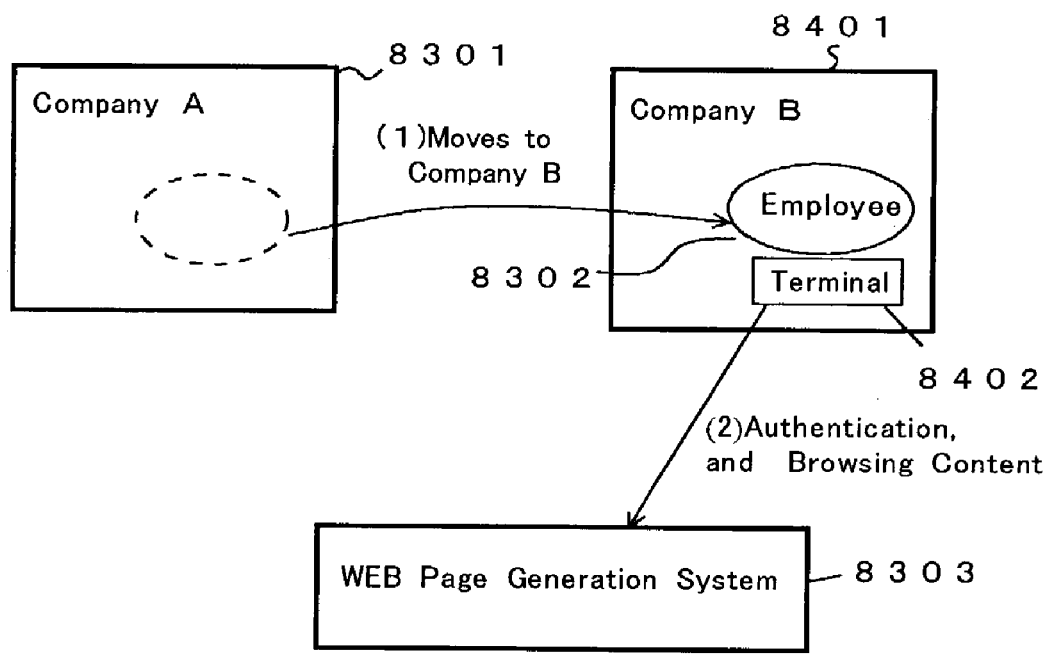
FIG. 84 is an exemplary view of the state of access to the WEB page generation system after an employee has transferred to another company.

FIG. 84 exemplifies the state of access to the WEB page generation system after the employee 8302 moved from company A 8301 to company B 8401 (that is, retired from company A and joined to company B). If the employee 8302 moves to company B 8401 without noticing his/her move to the administrative body of the WEB page generation system 8303, the employee 8302 can make the system execute the authentication processing to browse the content via the terminal 8402 even after moving to company B if he/she remembers the authentication code and the password or has a note where such information is noted down. Therefore, a problem occurs that information that should originally be disclosed only for company A 8301 is also disclosed for company B 8401.

Figure 85:
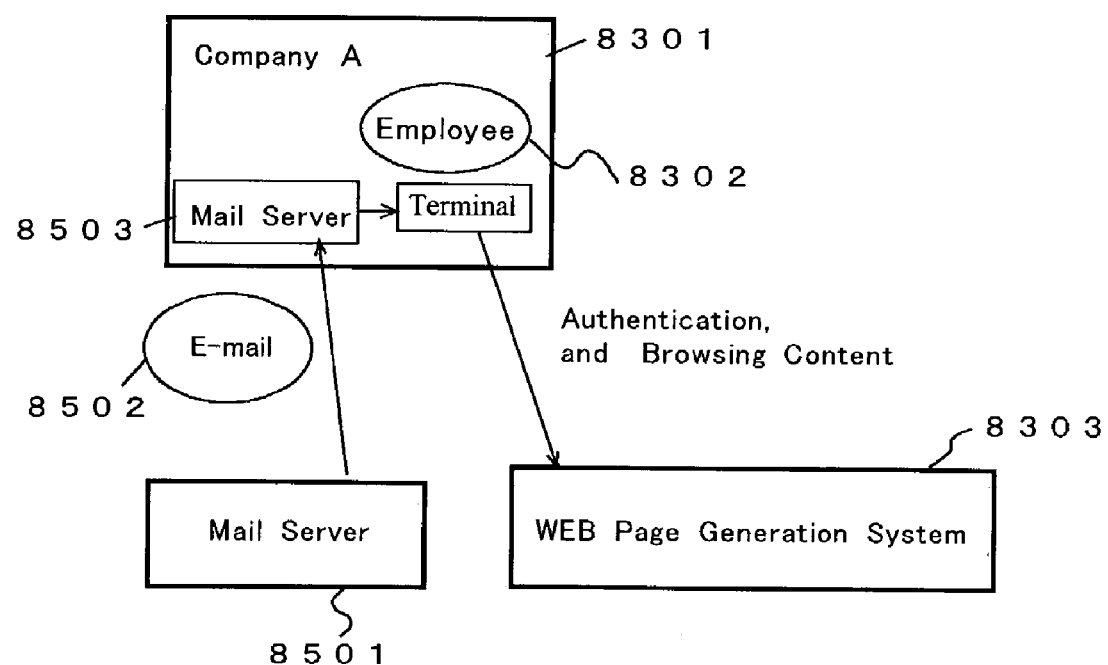
FIG. 85 is an exemplary view of the solving means by the present invention.

FIG. 85 exemplifies means for solving the problem in the present invention. In the present invention, a mail server 8501 transmits an e-mail 8502 regularly or irregularly to the e-mail address of the employee 8302, which is administered by the mail server 8503 of the company A. So the mail server 8501 sends the e-mail 8502 to the mail server 8503 of company A 8301, and the e-mails whose destination are the e-mail address of the employee 8302 are distributed from the mail server 8503 to the terminal of the employee 8302. The e-mail 8502 may be the notification mail in the first to sixth embodiments, that is, an e-mail that informs of the update of content browsable via the WEB page generation system 8303, for example.

Figure 86:
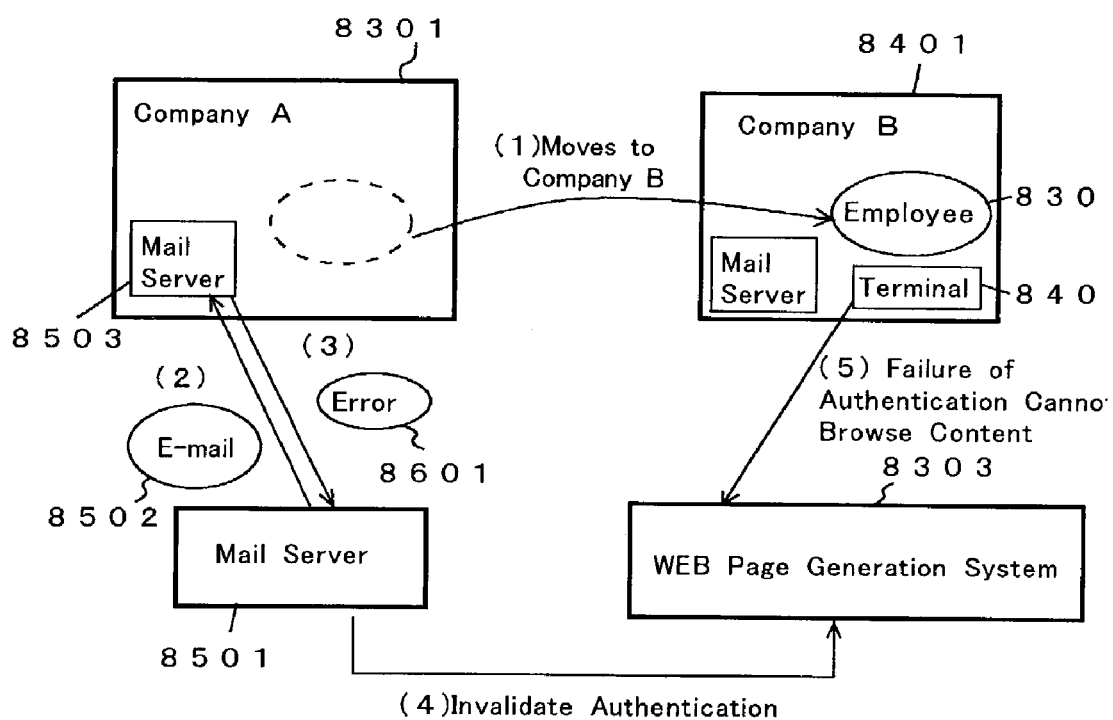
FIG. 86 is an exemplary view of the state of access the WEB page generation system in the present invention in the state after the employee has transferred to another company.

FIG. 86 exemplifies the state of access to the WEB page generation system in the present invention in the state after the employee 8302 moved from company A 8301 to company B 8401. It is assumed that the employee 8302 has resigned from company A 8301 to move to company B 8401 (1). With the resignation, company A 8301 deletes from the mail server 8503 the e-mail address assigned to the employee 8302 for the purpose of confidentiality and preventing dishonesty or deleting a region to store the mail address. Then, the mail server 8501 transmits an e-mail 8502 to the mail server 8503 of company A 8301 (2). Consequently, an error 8601 is notified from the mail server 8503 because the electronic mail address of the employee 8302 has been deleted (3). The mail server 8501 detects the occurrence of the error 8601. Then, the mail server 8501 performs a processing to invalidate the authentication information of the employee 8302 for the WEB page generation system 8303 (4). Thus, even if the employee 8302, who now works for company B 8401, tries to browse the content browsable via the WEB page generation system 8303, an authentication processing fails and he/she cannot browse the content (5). Accordingly, it is prevented that the information, which should be disclosed only for company A 8301, is disclosed for another company such as company B 8401.

Figure 31:
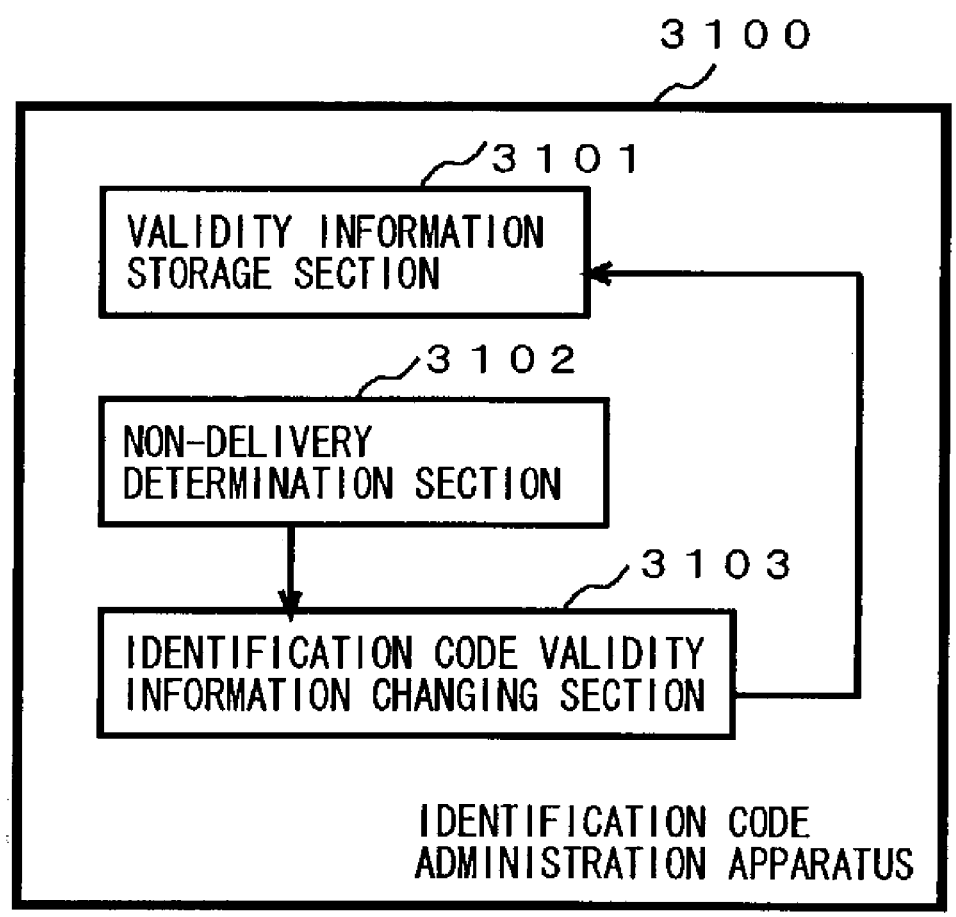
FIG. 31 is a functional block diagram of the information processing apparatus in a seventh embodiment of the present invention.

FIG. 31 exemplifies the functional block diagram of the identification code administration apparatus according to the seventh embodiment of the present invention.

In this embodiment, an identification code administration apparatus 3100 has a validity information storage section 3101, anon-delivery determination section 3102 and an identification code validity information changing section 3103.

The 'validity information storage section' 3101 stores an identification code, identification code validity information that is information showing whether one that entered the code or is identified by the code has particular authorization corresponding to the identification code, and further an e-mail address corresponding to a subject identified by the identification code. The identification code, the validity information and the mail address are stored in correspondence to each other or associated to each other.

The 'identification code' is information for discriminating a processing subject to which a certain processing relates, e.g. by processing data belonging to the subject identified by the identification code, or by processing data which somehow relates to the person thus identified. For example, when the subject identified by the identification code is a person, then an ID given to the person, a set of ID and password, a fingerprint, a palm print, a voice print, an iris pattern, an outline of face, an entire face, DNA information or the like can be cited as an example for the identification code.

The 'particular authorization' means that some kinds of processing is allowed to be performed by the person or in relation to the person identified by the identification code. For example, in the case where a lock is unlocked to open a door by entering the identification code, the processing where the door is opened is the processing which is allowed to be performed by the particular authorization. Further, the authorization may mean that the one identified by the identification code is allowed to electronically obtain particular information. The particular information may be information that is in a determined range or on a certain predetermined location like in a certain directory, path or on a particular computer, for example. In such a case, the identification code can be ID and the password to log in or log on the computer.

The 'identification code validity information' is information showing whether one that entered the code has the particular authorization based on the identification code, as described above. Herein, 'whether one that entered the code has the particular authorization' means that, for example, whether the particular authorization is allocated or not for a subject (person or device) for which the identification code has been allocated, that is, whether particular processing may be performed or not. 'Based on the identification code' means that presence of particular authorization can be detected by the identification code with regard to the subject for which the identification code has been allocated.

Further, the particular authorization may be an authorization to view the details of a file that is in a particular directory or folder in the computer, or may be authorization to view a particular file. In this case, the particular authorization may mean that the person identified by the identification code is allowed to access information determined according to the identification code. For example, in the information processing apparatus exemplified in FIG. 51, information such as content corresponds to the identification codes and the user may be able to obtain the information corresponding to an authenticated identification code if the particular authorization allows for it. It should be noted here that an "authenticated identification code" means that ID and password (the "identification code") have been inserted correctly so that authentication has been confirmed. The "particular authorization" then indicates whether a certain particular processing is allowed to be performed by or in connection with the person authenticated by the identification code.

FIG. 32 shows the example of the table held by the validity information storage section. The table has three columns of 'identification code', 'identification code validity information' and 'e-mail address', where the identification code, the identification code validity information, and the e-mail address, which are stored in each row, are associated with each other. For example, 'u284729', 'valid' and 'abc@def.ghi' are associated, which shows that the identification code 'u284729' is 'valid' and a person identified by the identification code has the e-mail address as 'abc@def.ghi'.

An example where the identification code administration apparatus of this embodiment is used is as follows. As described later, for example, when the information processing apparatus exemplified in FIG. 51 performs authentication by the identification code and the password, which have been entered, it inquires the identification code administration section whether the identification code validity information associated with the identification code indicates the particular authorization, and when a response is made that for the identification information there is not the particular authorization, the particular operation authorized by the particular authorization is made to fail.

The 'non-delivery determination section' 3102 determines whether the transmission of an e-mail having the e-mail address as a destination is non-deliverable or not, in other words, it checks whether or not the mail can be delivered to the e-mail address. The 'e-mail address' mentioned here is an e-mail address stored by the validity information storage section 3101. As a method to determine whether the transmission of e-mail is non-deliverable, there is a method to know whether the e-mail address is valid by requesting user information to a mail server. The protocol defined by RFC1196 can be used to obtain user information from a mail server by specifying the e-mail address of the user. If the user information is obtained from the mail server, it is proven that the user is registered with the mail server specified-by the e-mail address, and it is made clear that the transmission of e-mail is not non-deliverable and that the e-mail can be delivered.

Another method to determine whether the transmission of e-mail is non-deliverable will be described as follows.

The 'identification code validity information changing section' 3103 changes the identification code validity information based on the determination result by the non-delivery determination section 3102. 'Based on the determination result' means 'with some kind of causal relationship with the determination result'. For example, the identification code validity information may be changed as soon as the e-mail is determined to be non-deliverable, or it may be changed after passing a certain period of time. As an example of the latter, whether the e-mail is non-deliverable or not is determined again after a few days have passed since the e-mail was determined to be non-deliverable, and the identification code validity information may be changed in the case where the mail is still non-deliverable on the determination after a few days have passed. Further, the determination result as being non-deliverable is output, and the identification code validity information may be changed based on an instruction that is entered due to the output result.

Furthermore, 'to change' is to make a value be different from a current value, but it may include conception of an operation to make the value be the same value as the current value by an 'update' operation or by a 'confirmation' that the value is still the same.

When the transmission of an e-mail is determined to be non-deliverable (the e-mail cannot be delivered) by the non-delivery determination section, the identification code validity information changing section may change the identification code validity information, which is associated with the e-mail address as the destination of the e-mail, from 'valid' to 'invalid'. Alternatively, like the identification code validity information is changed to 'invalid' as soon as the non-delivery determination section has determined the transmission of e-mail to be non-deliverable, the identification code validity information changing section may change the identification code validity information from 'invalid' to 'valid' if the transmission of electronic mail is found to be deliverable.

Figure 34:
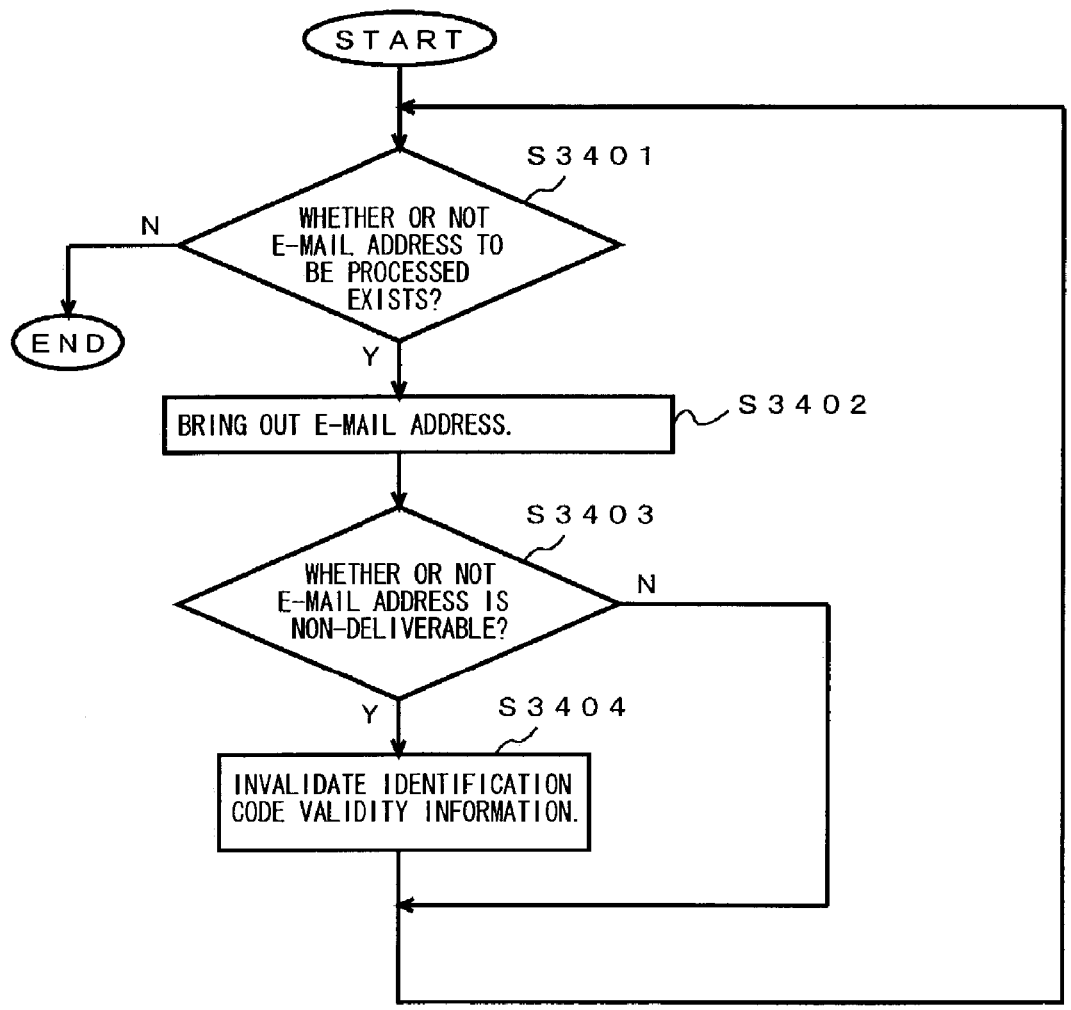
FIG. 34 is a flowchart of the processing in the seventh embodiment.

FIG. 34 exemplifies the flowchart explaining the operation of the identification code administration apparatus in this embodiment. In the flowchart, processing is performed to all the e-mails stored by the validity information storage section.

At step S3401, the apparatus determines whether e-mail addresses to be processed exist or not. If they exist, the processing proceeds to step S3402. Otherwise, the processing ends.

At step S3402, one e-mail address to be processed is fetched.

At step S3403, whether the e-mail to the e-mail address is non-deliverable or not is determined. If it is determined to be non-deliverable, the processing proceeds to step S3404, or step S3404 is skipped if not.

At step S3404, the identification code validity information is invalidated.

Then, the processing returns to step S3401.

Note that the flowchart of FIG. 34 is an example of the processing. The e-mail address to which the e-mail has been non-deliverable on step S3403 is stored, and the identification code validity information associated with the stored e-mail address may be changed later. Alternatively, the processing may be performed to the e-mail addresses whose identification code validity information is 'valid'.

Figure 35:
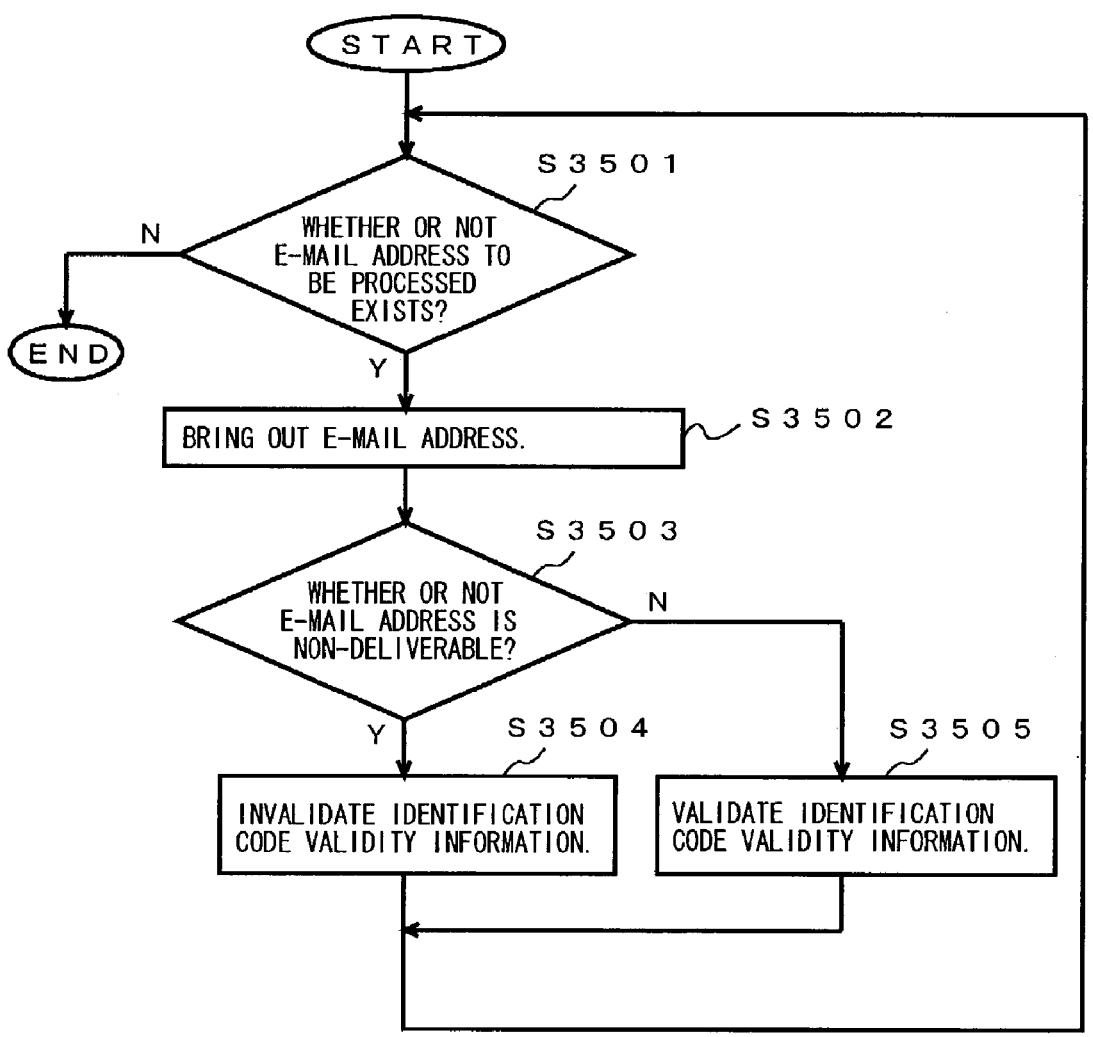
FIG. 35 is a flowchart of another processing in the seventh embodiment.

Further, on step S3503 (corresponds to step S3403) as shown in FIG. 35, when the e-mail has been determined not to be non-deliverable, the identification code validity information may be validated on step S3505.

FIG. 33 shows the example where the non-delivery determination section has determined that the e-mail to the e-mail address abc@def.ghi was non-deliverable, and the identification code validity information changing section has been changed from 'valid' to 'invalid' on step S3404 or step S3504.

Description will be made first for how the e-mail is sent to the destination in order to explain one method to determine that the transmission of e-mail is non-deliverable.

Figure 36:
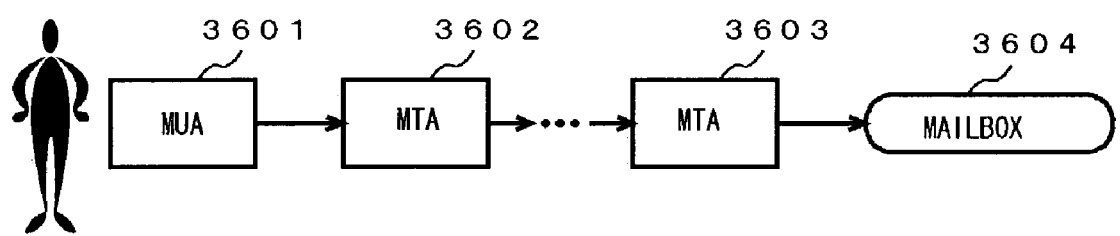
FIG. 36 is a view showing an assumption where an electronic mail is transmitted.

FIG. 36 exemplifies how the e-mail is transmitted. The e-mail is transmitted from MUA 3601, and reaches a mail box 3604 that is a final destination via one or a plurality of MTAs.

An 'MUA' is an abbreviation for a Mail User Agent, and is a program used when the user performs transmission/receiving of the e-mail. It is the program generally called a 'mailer', which usually operates in a personal computer operated by the user.

An 'MTA' is an abbreviation for a Mail Transfer Agent, which receives a mail from the MUA, further receives the e-mail from another MTA, relays the e-mail, and stores the e-mail in the mailbox. The MTA is also referred to as an SMTP server. Typical MTAs are Sendmail, Qmail, and Postfix. The MTA operates usually in a computer that is configured as a server.

In the case of transmitting the e-mail from the MUA, it generally passes the e-mail to a predetermined MTA (the SMTP server provided by an Internet service provider, for example)

In response, the MTA stores the e-mail received in a mailbox if the mailbox locally exists in an operating server, or otherwise, it requests MTA corresponding to the destination of e-mail to relay the e-mail.

By referring to an MX record provided by a domain name server, the MTA decides to which MTA it requests to relay the e-mail.

FIG. 37 shows the example of reference to the MX record of the domain name server. On entering the right part of '@' of the e-mail address on the sixth line, the MX record corresponding to the part is shown on and after the tenth line, where the one shown after 'mail exchanger=' is the details of the MX record and is the name of the server in which the MTA, to which the relay of e-mail is requested, operates. Therefore, it expresses that the e-mail to abc@def.ghi should be passed to the MTA operating in mx.def.ghi or mx2.def.ghi.

FIG. 38 is the view showing the example of communication details when the e-mail is passed to another MTA. The example shows the case where the sender of e-mail is newsletter@hij.kl.jpn (refer to the eighth line) and the destination of e-mail is abc@def.ghi (refer to the ninth line). On the ninth line, the MTA is notified of the destination of e-mail by 'RCPT TO: abc@def.ghi', and the MTA which has been notified of the destination is to return an answer whether the destination of the mail can be accepted or not. For example, when it returns '250 abc"def.ghi . . . . Recipient ok', the destination of e-mail can be accepted, and when it returns an answer such as '550 abc@def.ghi . . . . User unknown' where the number in the 500 to 599 range is attached on the top, the destination of thee-mail cannot be accepted.

Therefore, in this embodiment, the following processing may be performed to determine by the non-delivery determination section 202 whether the transmission of the e-mail having the e-mail address as the destination is non-deliverable or not. First, the section obtains the MX record on the right part of '@' of the e-mail address. It starts communication with the MTA operating in the server whose name has been obtained by the MX record, the e-mail address is continuously entered after 'RCPT TO:', whether the answer attached with the number in the 500 to 599 range is obtained or not, and the section determines that the transmission of e-mail is non-deliverable when such an answer is obtained.

Note that there is a method where the e-mail address is continuously entered after 'VRFY' or 'EXPN' without using 'RCPT TO:', and whether the transmission of e-mail is non-deliverable or not by checking with the answer.

The fact that the transmission of e-mail is not non-deliverable may be detected by detecting that the user has read the e-mail. For example, an HTML mail is transmitted to the user, a graphics file stored by a server is designed to be displayed when the user displays the HTML mail. At this point, by specifying a URL (Uniform Resource Locator) of a different graphics file in the HTML mail for each user, which user read the e-mail, that is, the transmission of e-mail not being non-deliverable is detected through checking with access to the server storing the graphics file.

A computer can embody the identification code administration apparatus of this embodiment. In this case, the computer operates a program that causes the computer to execute a validity information storage step, a non-delivery determination step, and an identification code validity information changing step.

The 'validity information storage step' is a step to realize the validity information storage section. For example, it is the step corresponding to the operation of the database administration system that administrates the table exemplified in FIG. 32 or FIG. 33.

The 'non-delivery determination step' is a step to realize the non-delivery determination section.

The 'identification code validity information changing step' is a step to realize the identification code validity information changing section, which is the step to order a change of identification code validity information to the database administration system that administrates the table exemplified in FIG. 32 or FIG. 33, for example.

In the flowchart of FIG. 34 or FIG. 35, the validity information storage step is equivalent to steps S3401, S3402, S3501 and S3502, the non-delivery determination step is equivalent to steps S3403 and S3503, and the identification code validity information changing step is equivalent to steps S3404, S3504 and S3505.

Figure 52:
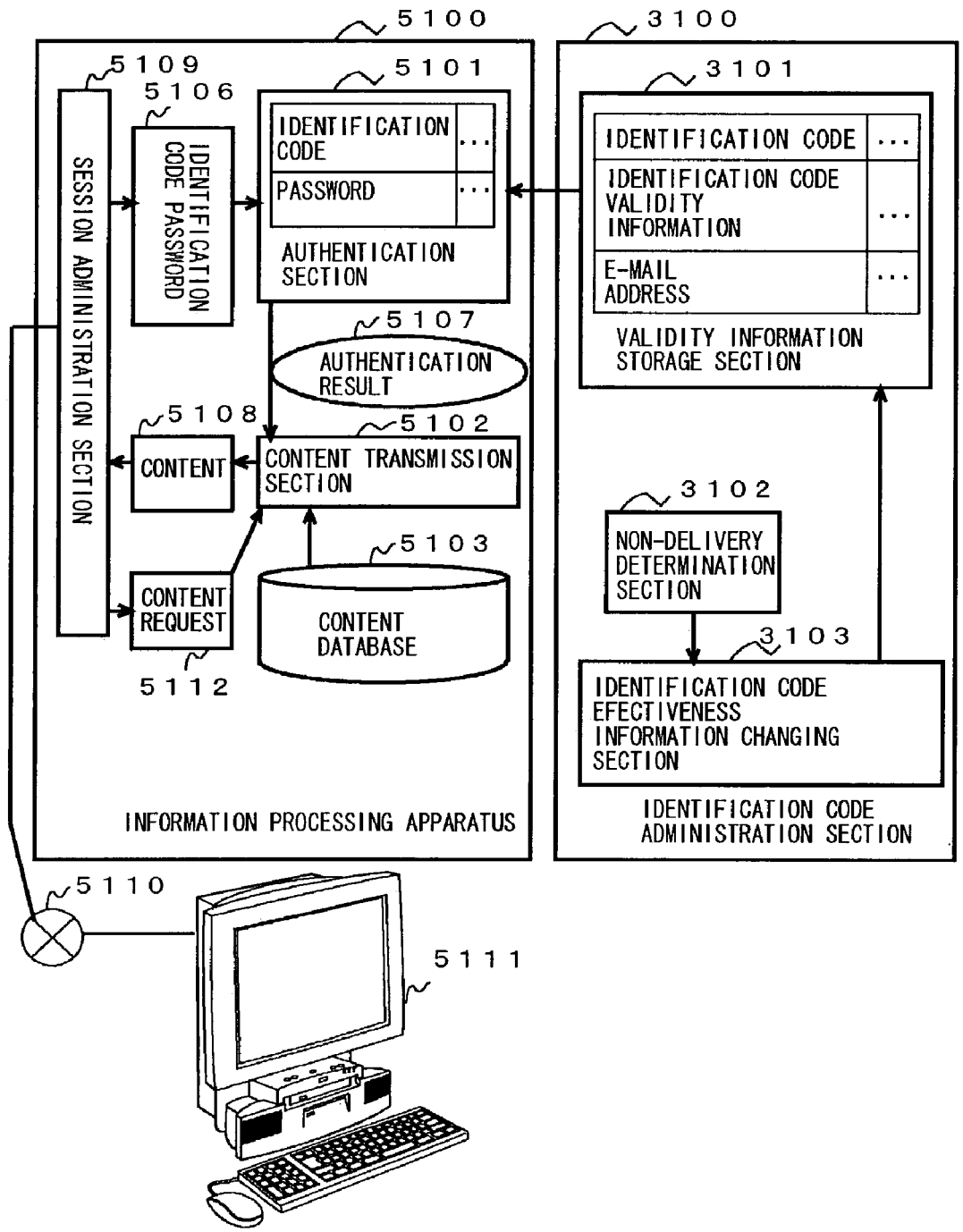
FIG. 52 is an exemplary view of a state where the identification code administration apparatus in the seventh embodiment and the information processing apparatus are combined.

FIG. 52 exemplifies the functional block diagram of a system in which the identification code administration apparatus 3100 and the information processing apparatus 5100 in this embodiment are combined.

The tables, which the validity information storage section 3101 and the authentication section 5101 in this embodiment store, share the values in the column of 'identification code'.

When an identification code and a password 5106 are input to the authentication section 5101, the authentication section 5101 determines whether the identification code and the password match a password stored in the authentication section or not. If they match, the section obtains the identification code validity information, which is stored in the validity information storage section 3101 by being associated with the identification code, and if it is 'invalid', it passes a result as the authentication result 5107 that the authentication has failed to the content transmission section 5102, thereby preventing the content from being transmitted to the user.

Since the identification code validity information is changed by making determination that the e-mail has been non-deliverable with this embodiment, information confidentiality is maintained.

Figure 39:
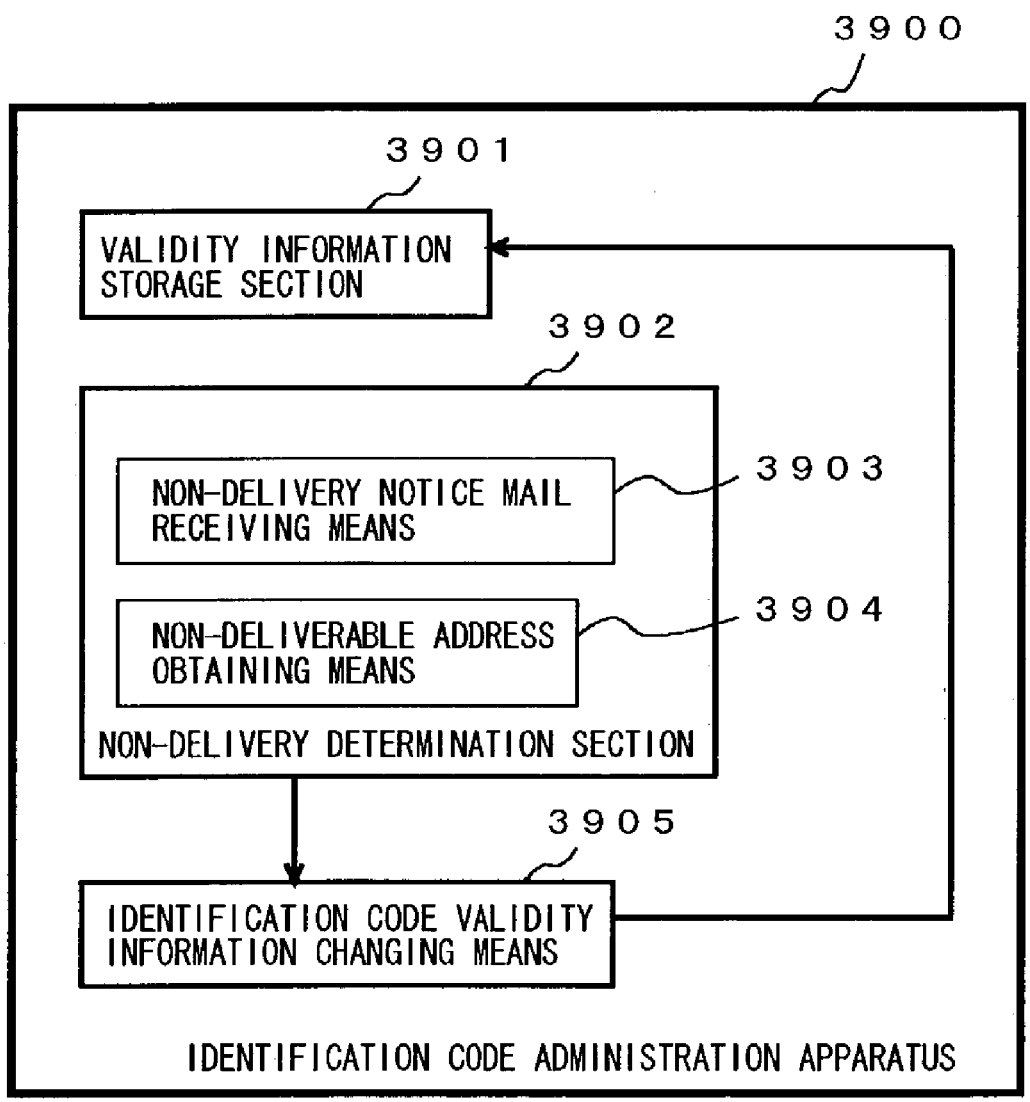
FIG. 39 is a functional block diagram of an identification code administration apparatus of an eighth embodiment of the present invention.

FIG. 39 shows the functional block diagram of the identification code administration apparatus according to the eighth embodiment of the present invention.

In this embodiment, determination that the transmission of e-mail is non-deliverable is performed by receiving a non-delivery notice mail.

In an identification code administration apparatus 3900 of this embodiment, the non-delivery determination section of the identification code administration apparatus in the seventh embodiment has a non-delivery notice mail receiving means 3903 and a non-deliverable address obtaining means 3904.

The 'non-delivery notice mail receiving means' 3903 receives the non-delivery notice mail. The 'non-delivery notice mail' is a mail that informs of non-delivery in response to the mail transmitted with the e-mail address as a destination. The 'mail that informs of non-delivery in response to the mail transmitted' is an e-mail informing that the e-mail transmitted having an e-mail address as a destination has not reached the e-mail address for some reason.

The 'non-deliverable address obtaining means' 3904 obtains the e-mail address to which the transmission of e-mail is non-deliverable based on the non-delivery notice mail received by the non-delivery notice mail receiving means 3903.

Figure 40:
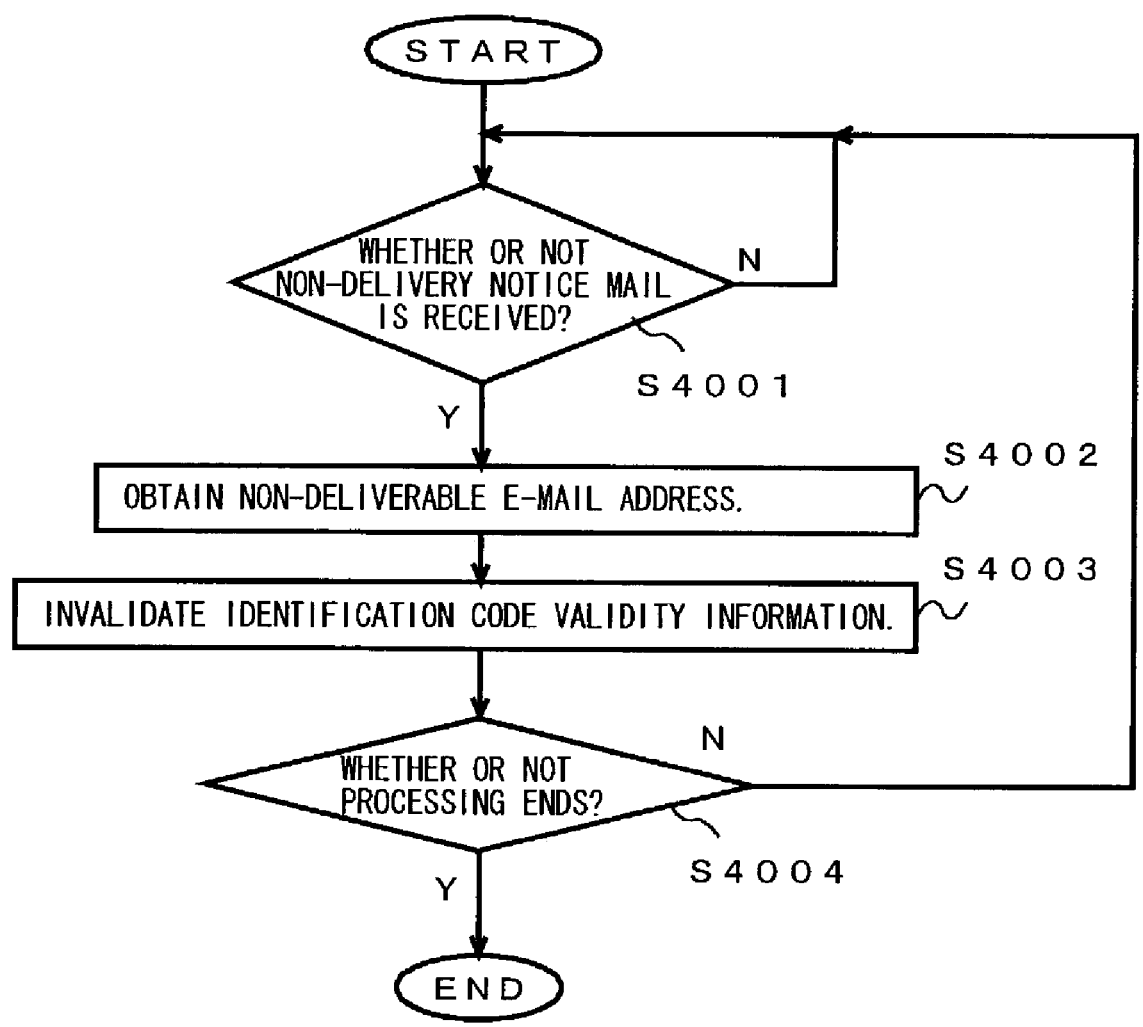
FIG. 40 is a flowchart of the processing in the eighth embodiment.

FIG. 40 exemplifies the flowchart explaining the operation of the identification code administration apparatus in this embodiment. The processing of the flowchart is based on the assumption that the e-mail has been transmitted to the e-mail address stored by the validity information storage section before executing the processing. Some contents, which can be obtained based on the identification code, have been updated are cited as details of the e-mail transmitted. Specifically, the e-mail informing that the content stored in the information processing apparatus of FIG. 51 has been updated is cited.

On step S4001, the non-delivery notice mail receiving means waits until it receives the non-delivery notice mail. When the means receives the non-delivery notice mail, the processing proceeds to step S4002.

On step S4002, the non-deliverable address obtaining means obtains the non-deliverable e-mail address.

On step S4003, the identification code validity information changing section invalidates the identification code validity information.

On step S4004, whether the processing should end or not is determined, and the processing returns to step S4001 when it does not end.

The flowchart shown in FIG. 40 is one processing example, where step S4003 is to be performed immediately after step S4002. However, the non-deliverable e-mail address is stored, and the identification code validity information may be changed to 'invalid' after it is stored for a certain period of time. Further, the non-deliverable e-mail address is output, and whether the identification code validity information should be changed or not may be determined based on information for an instruction entered based on the output.

Herein, the 'non-delivery notice mail' is an e-mail showing that the e-mail transmitted could not be delivered to the destination. FIG. 41 shows the example of the non-delivery notice mail. The non-delivery notice mail is sent from the administrator (the postmaster) of the MTA, which has detected that the e-mail was not delivered, to a sender of the e-mail. In the case of FIG. 41, the e-mail address of the postmaster of the MTA that has detected that the e-mail did not reach is 'POSTMASTER@mx.def.ghi', and the e-mail address of the sender of e-mail is 'newsletter@hij.kl.jpn' (when a header of the transmitted mail specifies an e-mail address by Errors-To:, the non-delivery notice mail may be sent to the e-mail address specified by the header).

Therefore, when the e-mail address of the sender of e-mail is made to be the e-mail address allocated for the non-delivery notice mail receiving means, (or the e-mail address allocated for the non-delivery notice mail receiving means by Errors-To: is specified), the non-delivery notice mail receiving means 3903 can receive the non-delivery notice mail.

As shown in FIG. 41, since the reason of non-delivery and the non-deliverable e-mail address-are generally written at the initial part of text of the non-delivery notice mail, the e-mail address may be obtained from this part. Because there are fewer types of MTA than those of MUA, it is possible to analyze the text of the non-delivery notice mails delivered by all MTAs.

The text of the non-delivery notice mail generally shows the reason of non-delivery, and the header and text of the non-deliverable e-mail, as shown in FIG. 41. In the header of the e-mail, the destination of e-mail is shown by a line starting with 'To:'. Accordingly, it is possible to obtain the non-deliverable e-mail address when the part starting with 'To:' is fetched from the header of the non-deliverable e-mail, which is shown in the text part of the non-delivery notice mail (e-mail has a structure in which a header part and the text part are separated by a blank line).

Furthermore, the header of e-mail shows an ID (message ID) uniquely allocated for the e-mail by 'Message-ID:'.

Consequently, there is a method that the e-mail having a different message ID is transmitted to each user, and which e-mail, for which the message ID has been allocated, was sent to which e-mail address is recorded. FIG. 42 is the example of the table showing correspondence between the message ID and the e-mail address.

The message ID is brought out from the 'Message-ID:' part of the header of the non-deliverable e-mail, which is shown in the text part of the non-delivery notice mail, and the e-mail address associated with the message ID in the table of FIG. 42 may be obtained.

Figure 43:
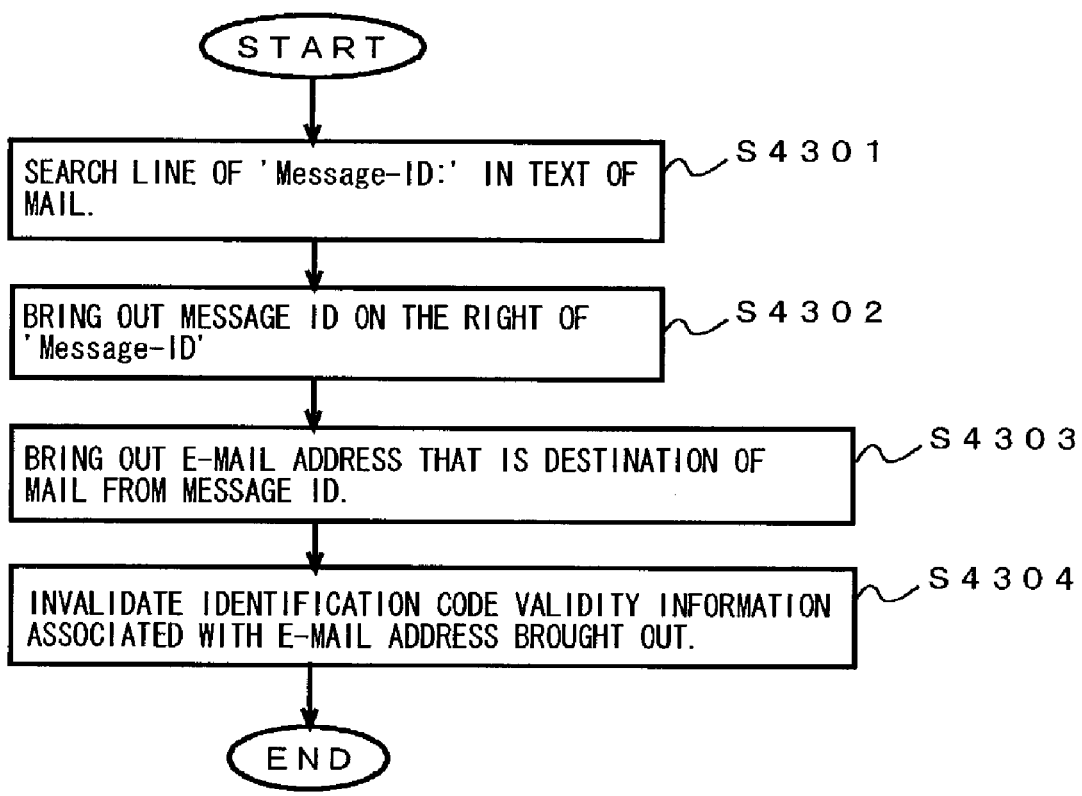
FIG. 43 is an example of a processing where identification code validity information is invalidated from the message ID in a text of the non-delivery notice e-mail.

FIG. 43 exemplifies the flowchart of the processing in which the non-deliverable e-mail address is obtained using the message ID.

At step S4301, the line of 'Message-ID:' in the mail text is searched.

At step S4302, the message ID on the right of 'Message-ID:' is fetched.

At step S4303, the e-mail address as the destination of the mail is brought out by scanning the table of FIG. 42 based on the message ID that has been fetched on step S4302.

At step S4304, the identification code validity information associated with the e-mail address, which has been brought out, is invalidated.

Although the three methods have been cited above, it is not necessary to use only one of these. These methods may be combined such that the first method described above is used first, the second method described above is applied in preparation for the case where new MTA appears, and the third method is applied when the second method cannot be applied (some MTAs do not correctly affix 'To:' in the text part of an error notice mail).

Figure 53:
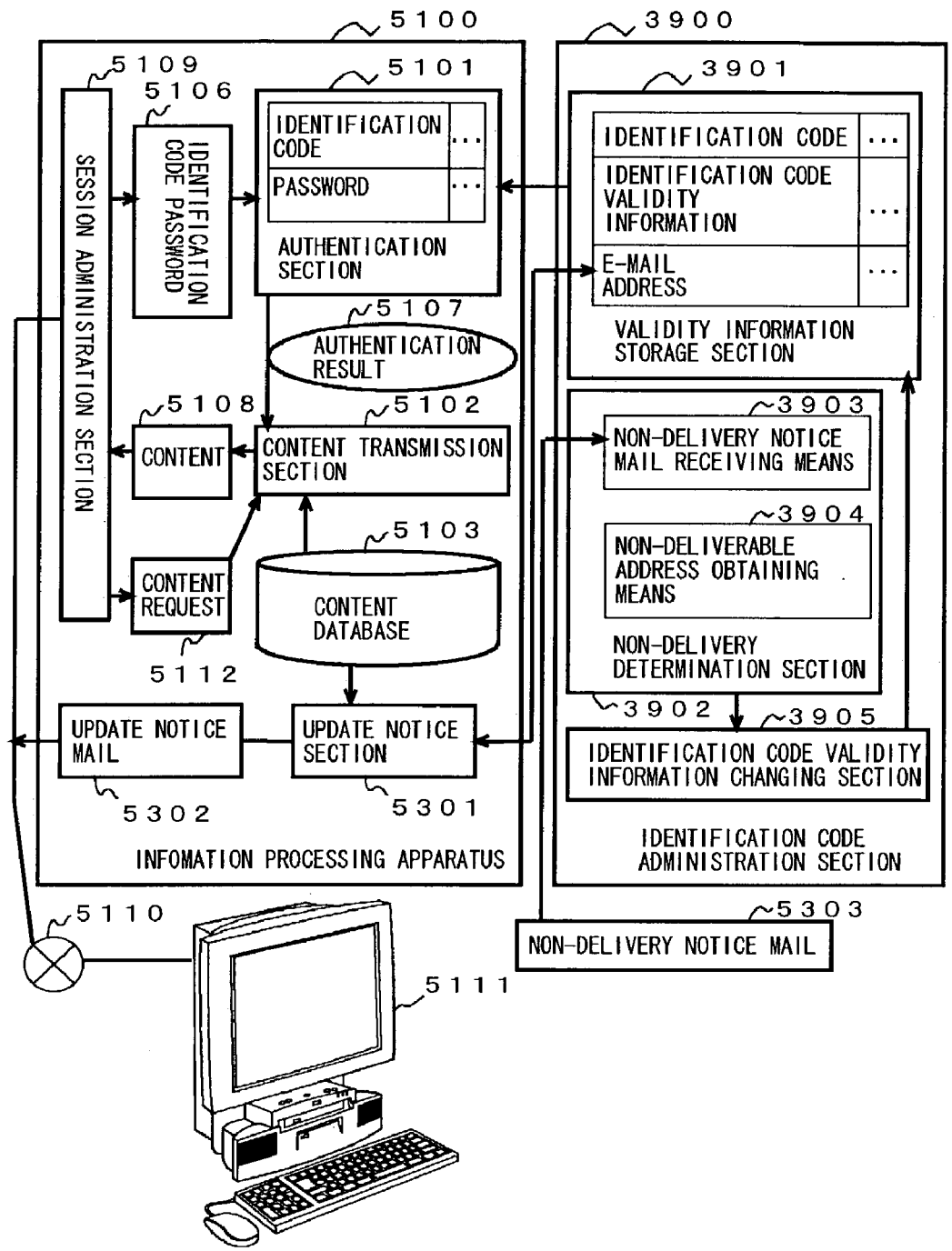
FIG. 53 is an exemplary view of a state where the identification code administration apparatus in the eighth embodiment and the information processing apparatus are combined.

FIG. 53 exemplifies the functional block diagram of the system where the identification code administration apparatus 3900 in this embodiment and the information processing apparatus 5100 have been combined.

The tables, which a validity information storage section 3901 and the authentication section 5101 in this embodiment store, share the values in the column of 'identification code'.

When the identification code and the password 5106 are input to the authentication section 5101, the authentication section 5101 determines whether the identification code and the password match the password stored in the authentication section or not. If they match, the section obtains the identification code validity information, which is stored in the validity information storage section 3901 by being associated with the identification code, and if it is 'invalid', it passes a result as the authentication result 5107 that the authentication has failed to the content transmission section 5102, and thereby preventing the content form being transmitted to the user.

Note that FIG. 53 shows an update notice section 5301. The 'update notice section' 5301 informs the user that a content in the content database have been updated by an update notice mail 5302. If the update notice mail is non-deliverable, a non-delivery notice mail 5303 is generated and the non-delivery notice mail receiving means 3903. The update notice section may request the e-mail address, which is the destination of the update notice mail, for the validity information storage section of the identification code administration apparatus, and to obtain the e-mail address.

According to this embodiment, it is possible to detect almost surely that the transmission of e-mail has been non-deliverable because the e-mail address is obtained based on the non-delivery notice mail.

In this embodiment, non-deliverable e-mail information, which is information regarding the e-mail address to which transmission was non-deliverable has been detected, is output, the instruction whether the identification code validity information is changed or not is obtained based on the output, and the identification code validity information is changed based on the instruction.

Figure 44:
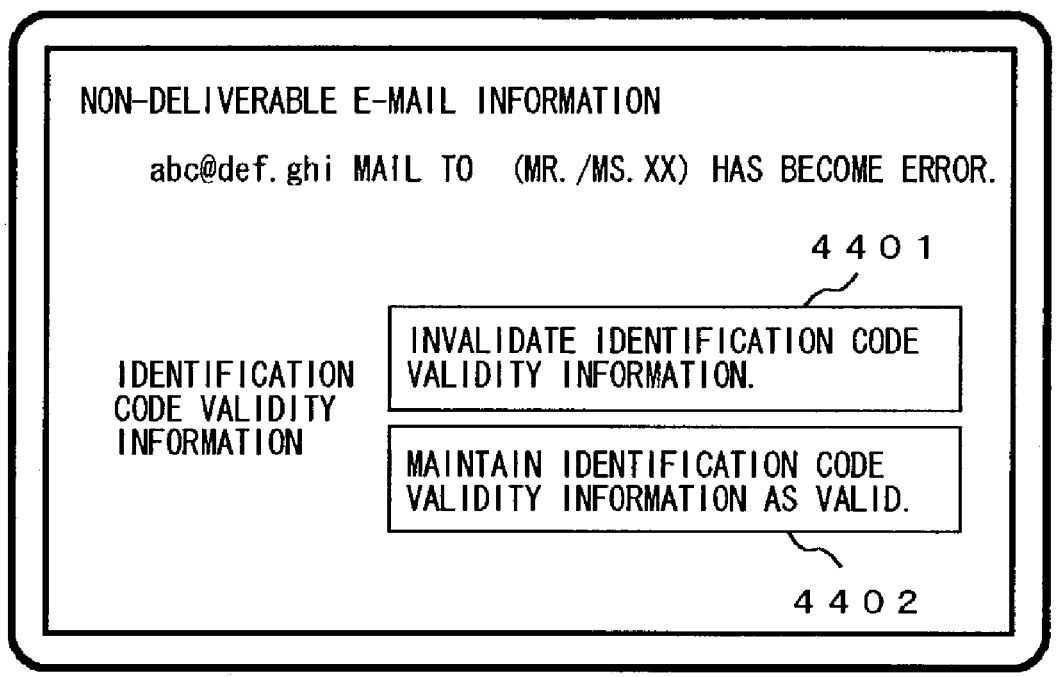
FIG. 44 is an exemplary view of a screen showing non-delivery notice e-mail information.

FIG. 44 exemplifies the example of a screen displaying the non-deliverable e-mail information that has been output. This example is the case where the e-mail to abc@def.ghi has been determined to be non-deliverable. When a button 4401 is pushed, the identification code validity information associated with the abc@def.ghi is invalidated, and when a button 4402 is pushed, the identification code validity information is maintained as valid.

Figure 45:
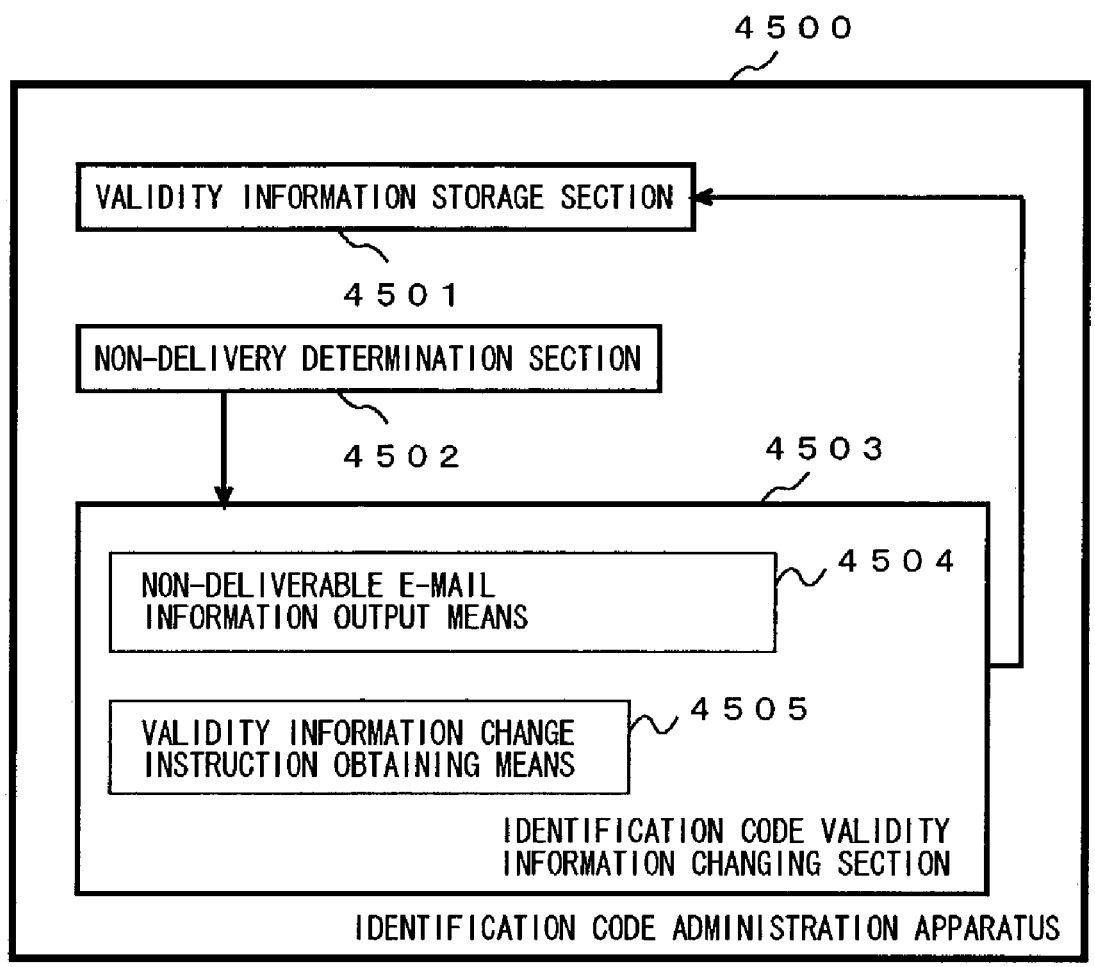
FIG. 45 is a functional block diagram of the identification code administration apparatus of a ninth embodiment of the present invention.

FIG. 45 exemplifies the functional block diagram of the identification code administration apparatus in this embodiment.

In an identification code administration apparatus 4500 of this embodiment, the identification code validity information changing section of the identification code administration apparatus of the seventh or eighth embodiment has non-deliverable e-mail information output means 4504 and validity information change instruction obtaining means 4505.

When the non-delivery determination section obtains determination as 'non-deliverable', the 'non-deliverable e-mail information output means' 4504 outputs the non-deliverable e-mail information regarding the e-mail address determined as 'non-deliverable'. The 'information regarding the e-mail address' may be the e-mail address itself or may be information that can be obtained from the e-mail address. For example, in the case where name, address, phone number and the like of a person, for whom the e-mail address was allocated, are stored by being associated with the e-mail address, the name, address and phone number may be the information regarding the e-mail address.

The 'validity information change instruction obtaining means' 4505 obtains the change instruction. The 'change instruction' is an instruction whether the identification code validity information of the identification information, which identifies a subject regarding the e-mail address of the non-deliverable e-mail information output from the non-deliverable e-mail information output means, is changed or not.

In this embodiment, when the change instruction obtained by the validity information change instruction obtaining means 4505 is the one that should change the identification code validity information of the identification code, the identification code is changed.

Figure 46:
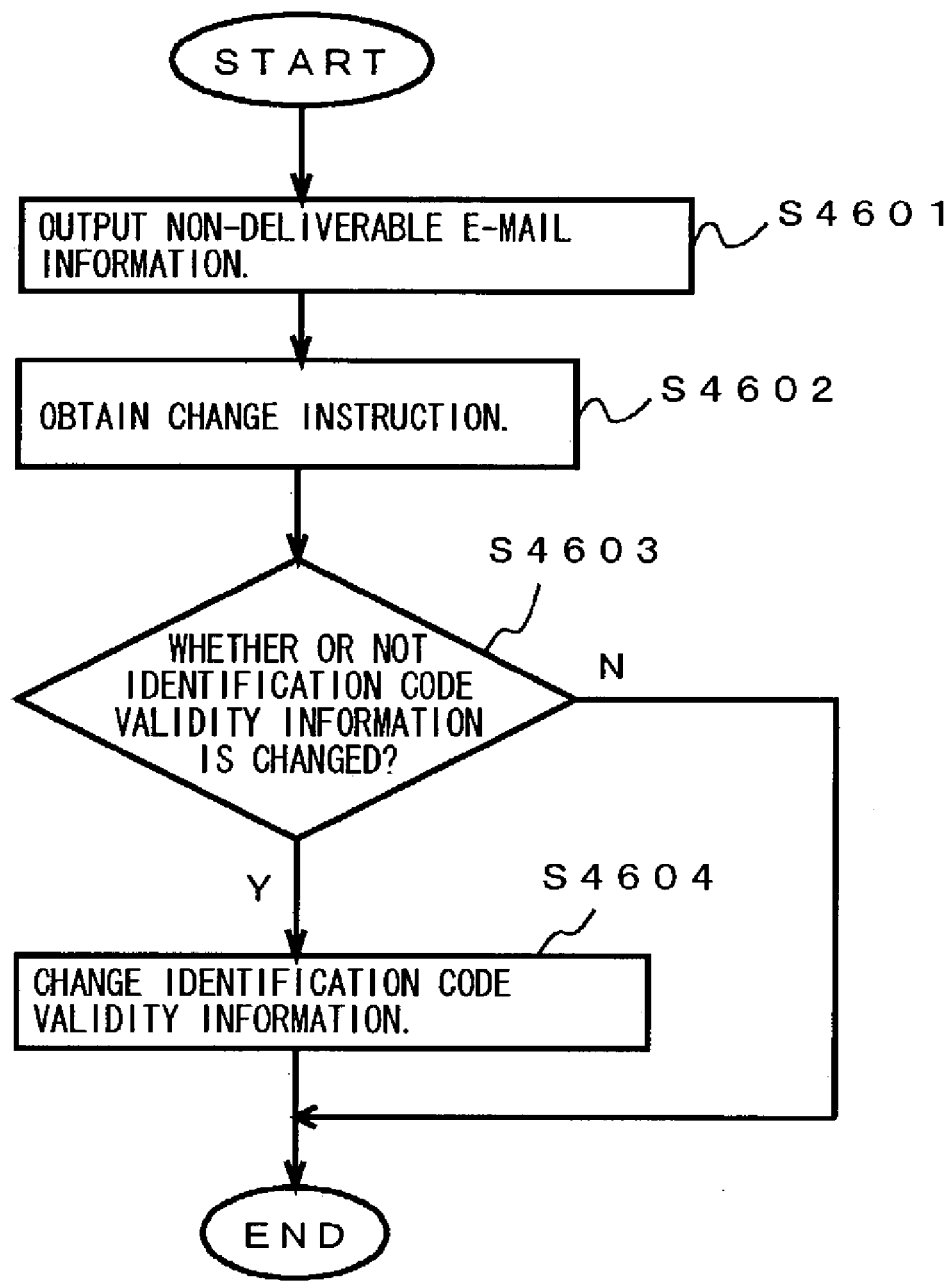
FIG. 46 is a flowchart of the processing in the ninth embodiment.

FIG. 46 exemplifies the flowchart explaining the operation after the identification code administration apparatus of this embodiment obtains the non-deliverable e-mail address.

On step S4601, the non-deliverable e-mail information output means outputs the non-deliverable e-mail information.

On step S4062, the validity information change instruction obtaining means obtains the change instruction.

On step S4603, whether the identification code validity information is changed or not is determined. If it is determined that the information should be changed, the processing proceeds to step S4604. Otherwise, the processing ends.

On step S4604, the identification code validity information is changed.

Note that step S4604 is normally one to invalidate the identification code validity information. However, the identification code validity information is invalidated when the non-delivery determination section determines the e-mail to be non-deliverable, and the identification code validity information may be validated on step S4604.

(Ninth Embodiment: Relationship with Information Processing Apparatus)

Figure 54:
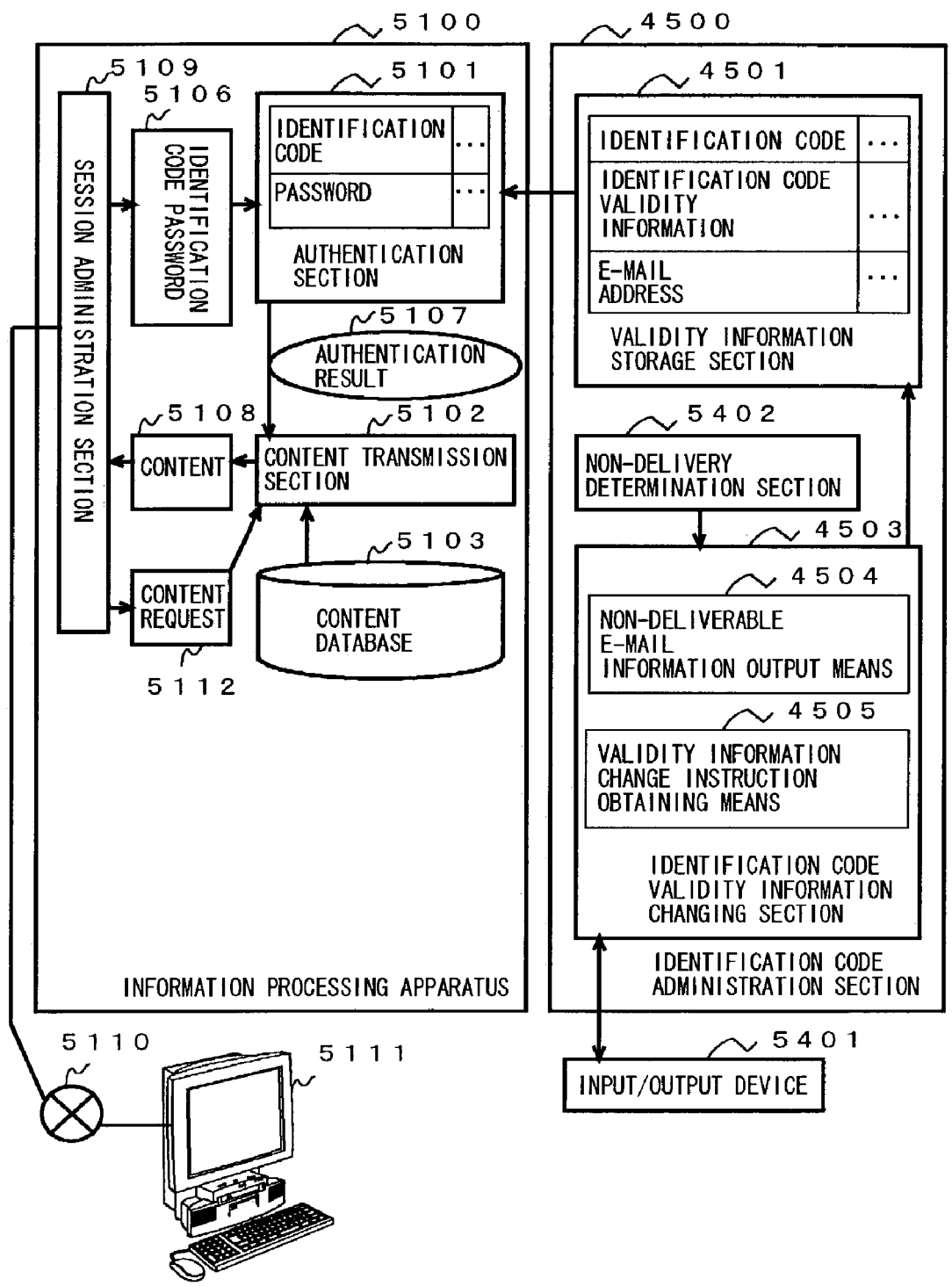
FIG. 54 is an exemplary view of a state where the identification code administration apparatus in the ninth embodiment and the information processing apparatus are combined.

FIG. 54 exemplifies the functional block diagram of the system where the identification code administration apparatus 4500 in this embodiment and the information processing apparatus 5100 have been combined.

The tables, which the validity information storage section 4501 and the authentication section 5101 in this embodiment store, share the values in the column of 'identification code'.

When the identification code and the password 5106 are input to the authentication section 5101, the authentication section 5101 determines whether or not the identification code and the password match the password stored in the authentication section. If they match, the section obtains the identification code validity information, which is stored in the validity information storage section 4501 by being associated with the identification code, and if it is 'invalid', it passes a result as the authentication result 5107 that the authentication has failed to the content transmission section 5102, and thereby preventing the content form being transmitted to the user.

Note that an input/output device 5401 is an output destination from the non-deliverable e-mail information output means 4504 and an input destination to the validity information change instruction obtaining means 4505, and the device typically consists of the CRT, keyboard, mouse and the like. Further, the input/output device 5401 does not need to be directly connected to the identification code administration apparatus 4500 but may be connected to the apparatus via the communication network.

According to this embodiment, the change instruction changes the identification code validity information. Therefore, even if the e-mail address is generated, which has been determined that the e-mail was non-deliverable, it is possible to change the identification code validity information after examining the cause of the non-delivery of a mail.

Figure 47:
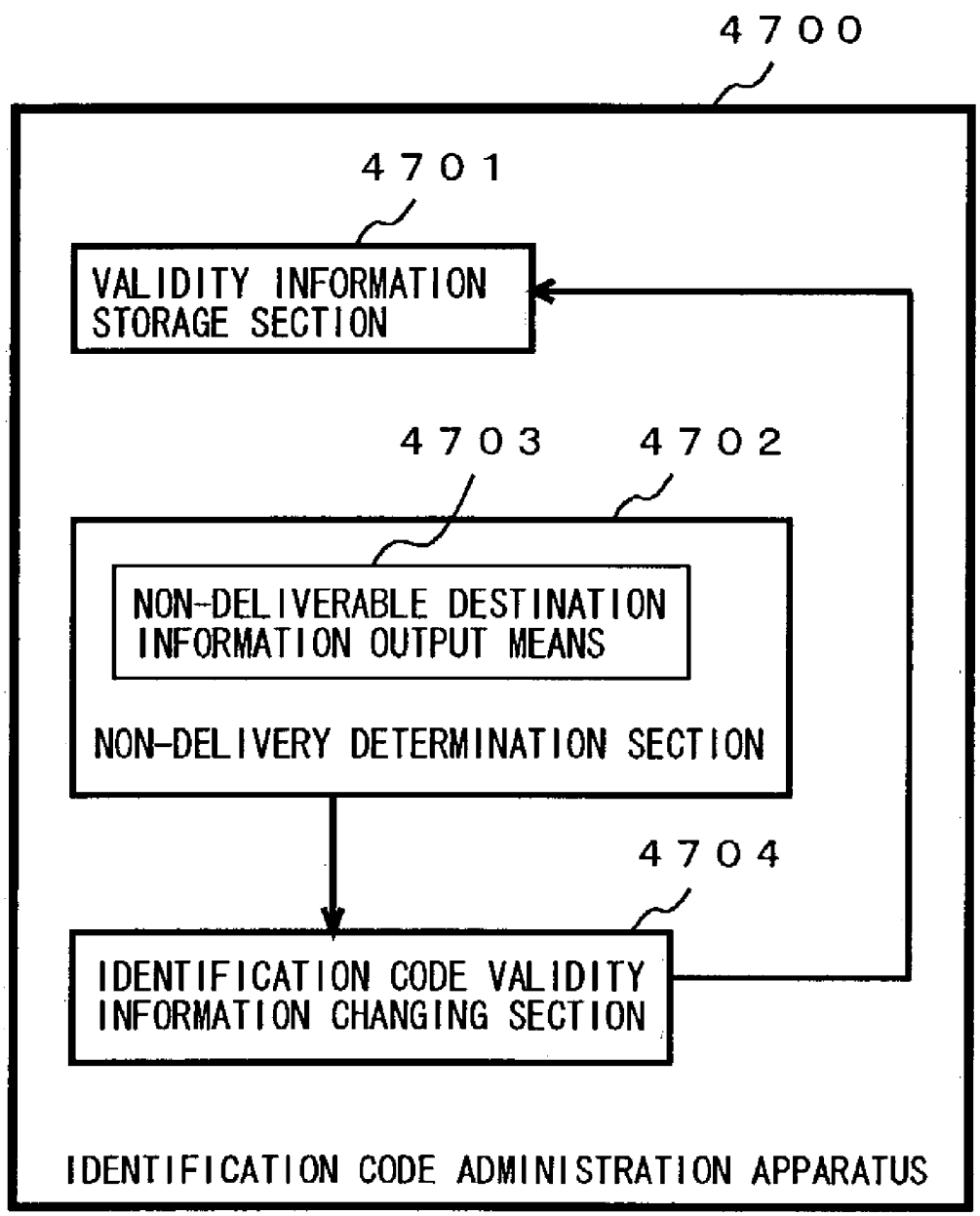
FIG. 47 is a functional block diagram of the identification code administration apparatus of a tenth embodiment of the present invention.

FIG. 47 is the functional block diagram of the identification code administration apparatus according to the tenth embodiment of the present invention.

In this embodiment, information regarding a destination to which transmission has been determined to be non-deliverable is output.

The difference between the identification code administration apparatus of this embodiment and the identification code administration apparatuses in the above-described embodiments is that a non-delivery determination section 4702 has non-deliverable destination information output means 4703 in this embodiment.

The 'non-deliverable destination information output means' 4703 outputs non-deliverable destination information that is information regarding the destination to which transmission has been determined to be non-deliverable. Specifically, when the non-delivery determination section 4702 determines that the e-mail was non-deliverable, the information regarding the e-mail address is output. Herein, 'transmission' means the transmission of e-mail, and 'destination' means the e-mail address that is a transmission destination. Further, 'information regarding the destination' may include not only the e-mail address but also information obtained based on the e-mail address.

Figure 55:
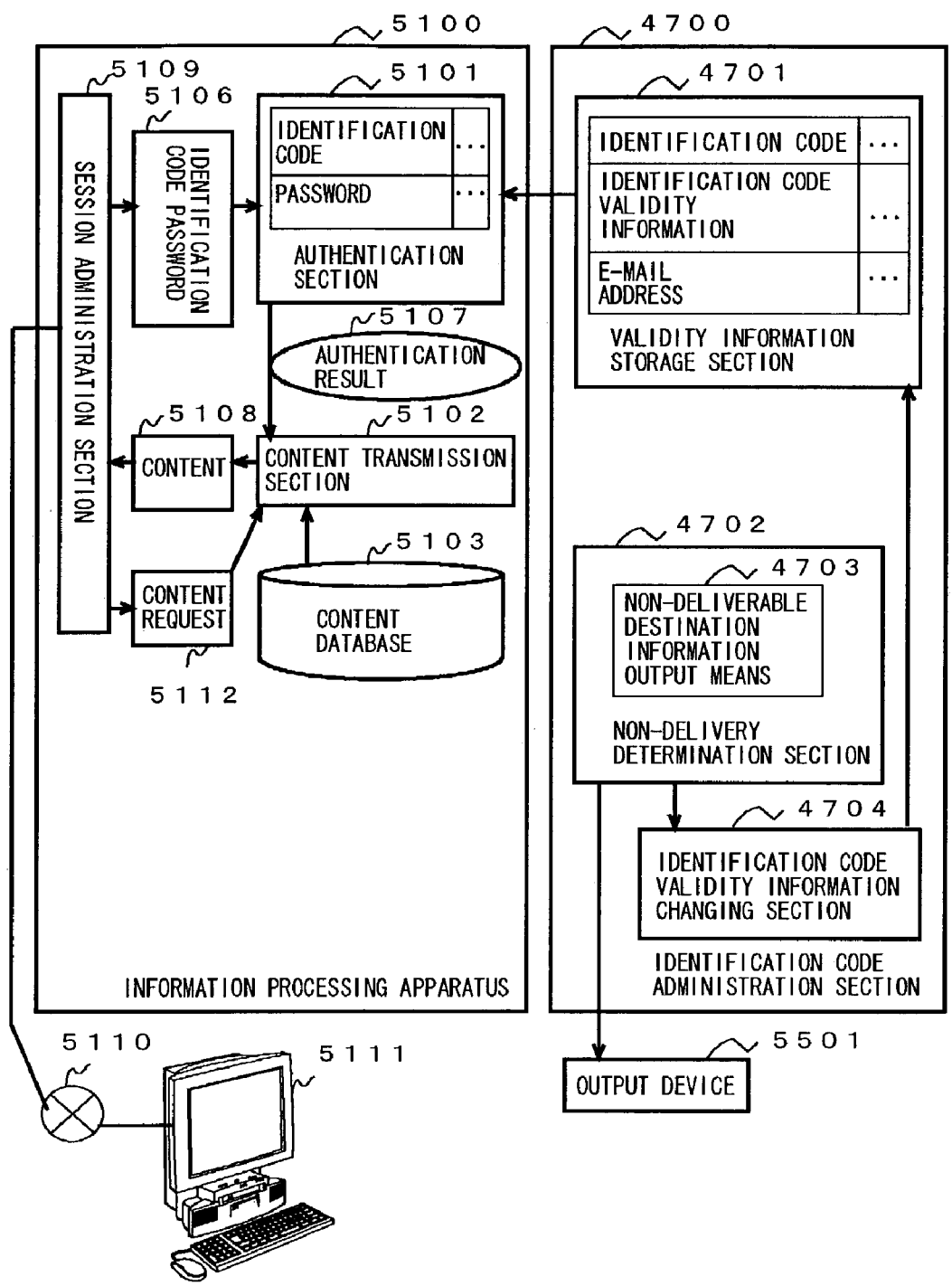
FIG. 55 is an exemplary view of a state where the identification code administration apparatus in the tenth embodiment and the information processing apparatus are combined.

FIG. 55 exemplifies the functional block diagram of the system where the identification code administration apparatus 4700 in this embodiment and the information processing apparatus 5100 have been combined.

The tables, which a validity information storage section 4701 and the authentication section 5101 in this embodiment store, share the values in the column of 'identification code'.

When the identification code and the password 5106 are input to the authentication section 5101, the authentication section 5101 determines whether or not the identification code and the password match the password stored in the authentication section. If they match, the section obtains the identification code validity information, which is stored in the validity information storage section 4701 by being associated with the identification code, and if it is 'invalid', it passes a result as the authentication result 5107 that the authentication has failed to the content transmission section 5102, and thereby preventing the content form being transmitted to the user.

Note that an input/output device 5501 is an output destination from the non-deliverable e-mail information output means 4703. The input/output device 5501 may be directly connected to the identification code administration apparatus 4700, or may be connected to the apparatus via the communication network.

According to this embodiment, when the non-delivery determination section determines that the e-mail is non-deliverable, the information regarding the e-mail address is output, so that it is possible to immediately start examining the cause of the non-delivery of the mail as to why the mail became non-deliverable or the like.

Figure 48:
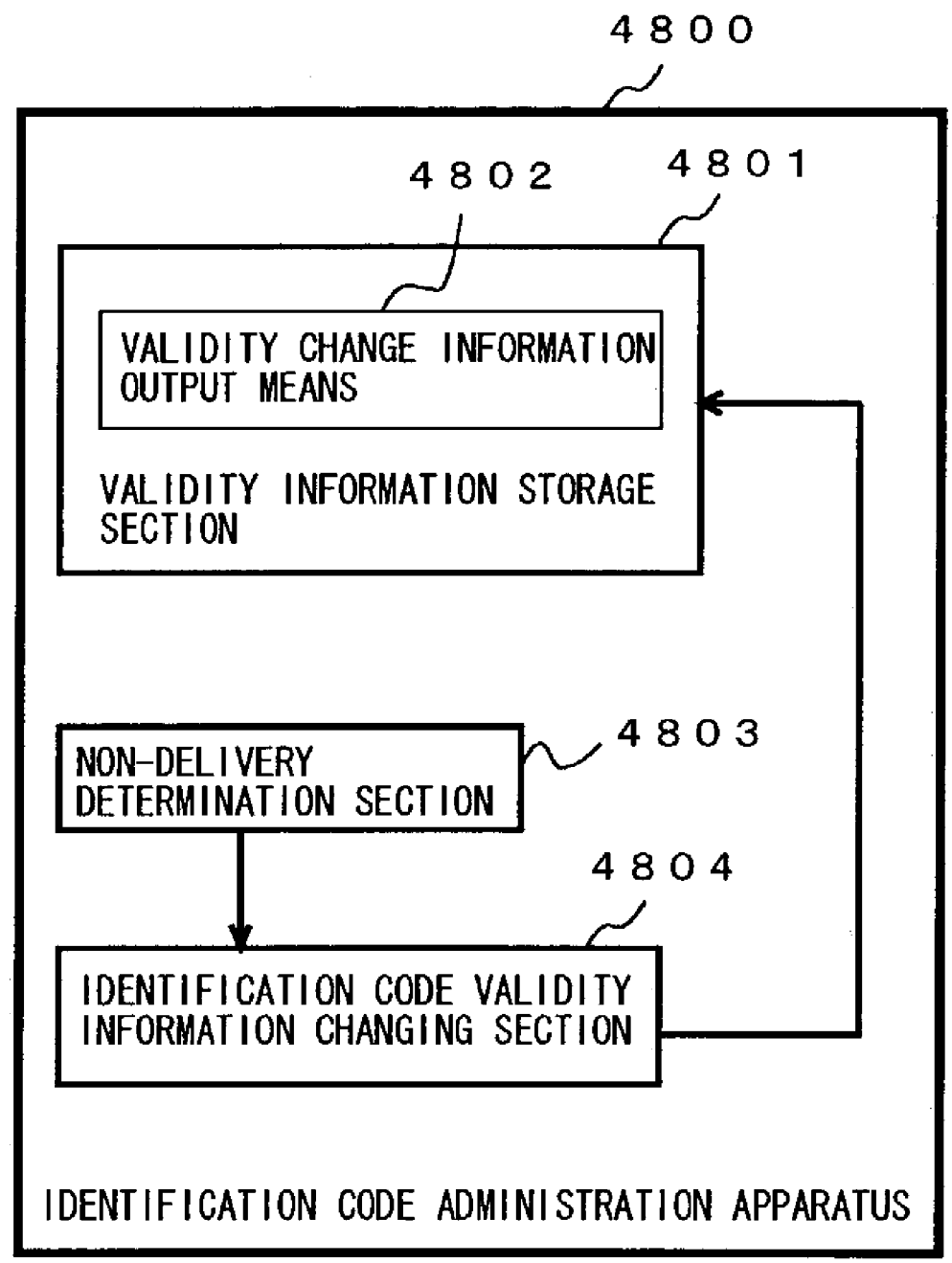
FIG. 48 is a functional block diagram of the identification code administration apparatus of an eleventh embodiment of the present invention.

FIG. 48 exemplifies the functional block diagram of the identification code administration apparatus according to the eleventh embodiment of the present invention.

In this embodiment, when the identification code validity information is changed, information regarding the change is output.

The difference between the identification code administration apparatus of this embodiment and the identification code administration apparatuses in the seventh embodiment to the ninth embodiment is that a validity information holding section has a validity change information output means 4802.

The 'validity change information output means' 4802 outputs validity change information that is information regarding the fact that the identification code validity information has been changed. The 'information regarding the fact that the identification code validity information has been changed' may be information showing that the identification code validity information has been changed, or may be information showing that which identification code validity information related to which identification code or which e-mail address has been changed.

Figure 56:
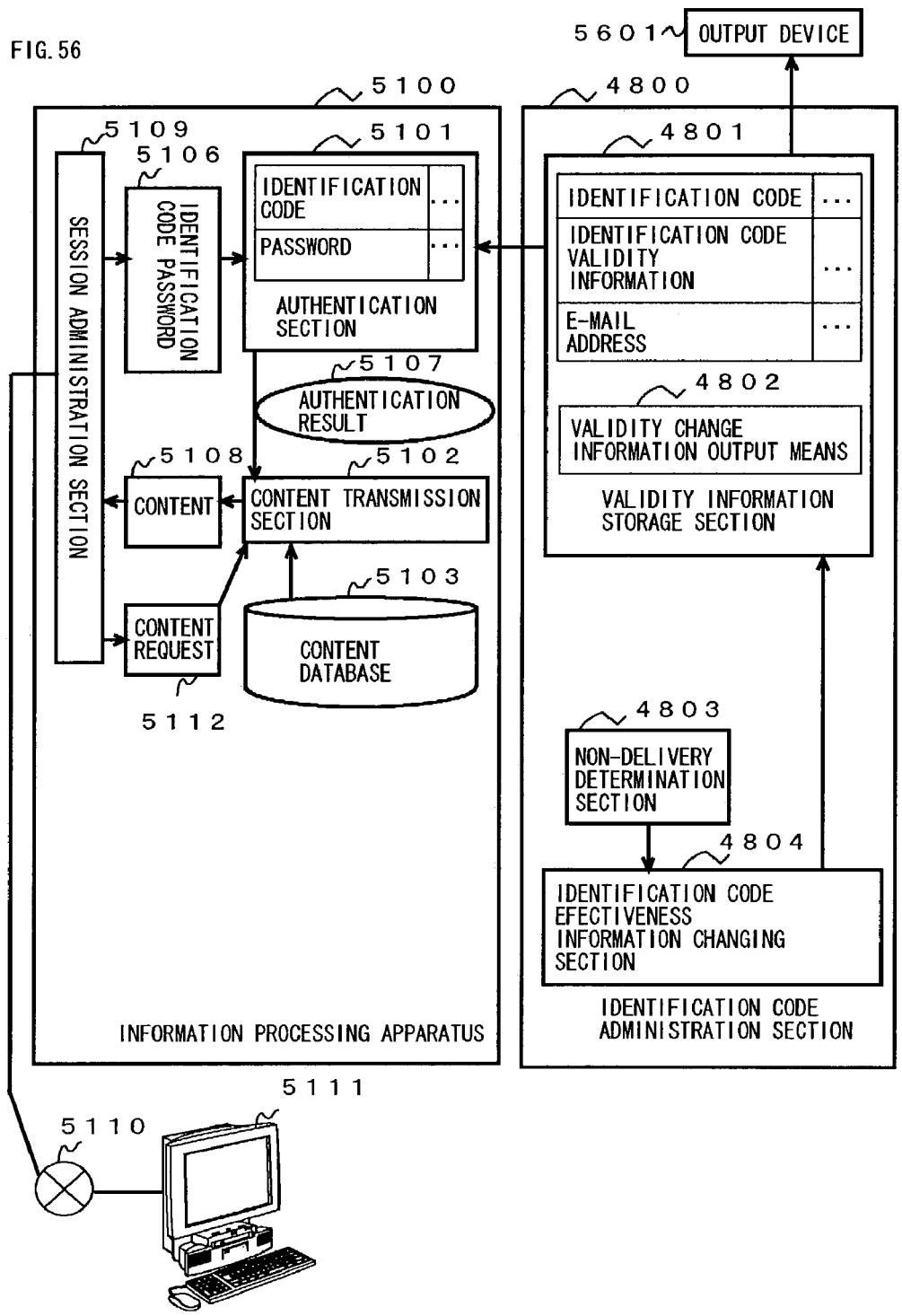
FIG. 56 is an exemplary view of a state where the identification code administration apparatus in the eleventh embodiment and the information processing apparatus are combined.

FIG. 56 exemplifies the functional block diagram of the system where an identification code administration apparatus 4800 in this embodiment and the information processing apparatus 5100 have been combined.

The tables, which a validity information storage section 4801 of the identification code administration apparatus in this embodiment and the authentication section 5101 of the information processing apparatus store, share the values in the column of 'identification code'.

When the identification code and the password 5106 are input to the authentication section 5101, the authentication section 5101 determines whether the identification code and the password match the password stored in the authentication section or not. If they match, the section obtains the identification code validity information, which is stored in the validity information storage section 4801 by being associated with the identification code, and if it is 'invalid', it passes a result as the authentication result 5107 that the authentication has failed to the content transmission section 5102, and thereby preventing the content form being transmitted to the user.

Note that an input/output device 5601 is an display or the like that is an output destination from the validity change information output means 4802. As shown in FIG. 56, the input/output device 5601 may be directly connected to the identification code administration apparatus 4800, or may be connected to the apparatus via a communication network.

(Eleventh Embodiment: Effects)

According to this embodiment, when the identification code validity information is changed, the information regarding the change is output. Therefore, it is possible to know that not only the non-deliverable e-mail information has been changed, but also which identification code validity information associated with which identification code or which e-mail address has been actually changed.

In this embodiment, when the identification code validity information is changed, it can be returned to the state before the change.

Figure 49:
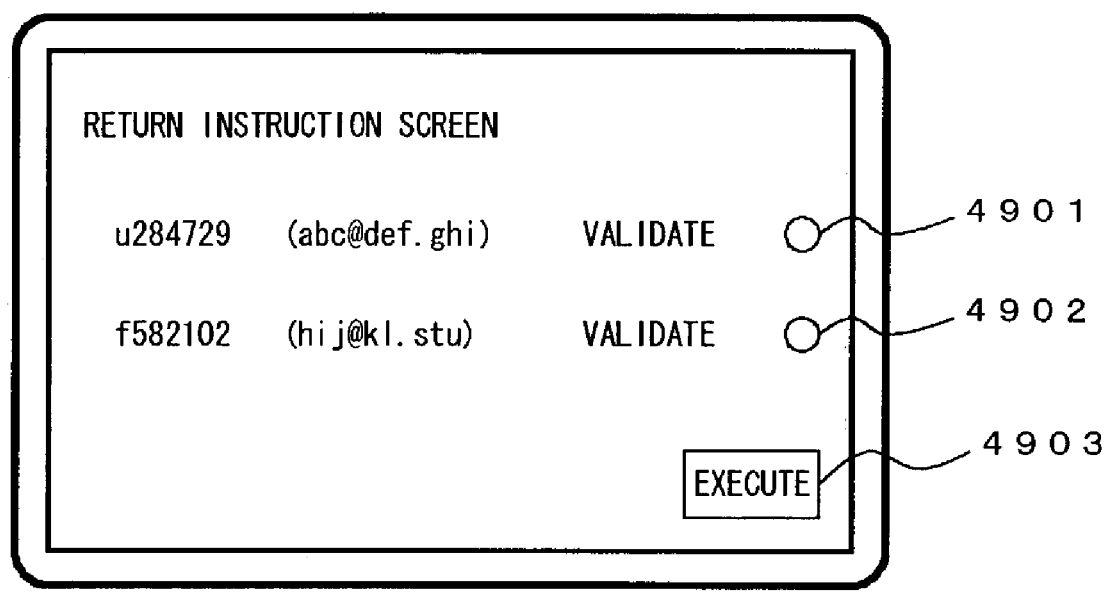
FIG. 49 is an exemplary view of a screen for obtaining change instruction information.

FIG. 49 shows an example of the screen to obtain an instruction for restoring the identification code validity information to the state before the change. In this example, it is shown that the identification code validity information associated with the e-mail addresses, which are abc@def.ghi and hij@kl.stu, has been changed to invalid one, and for each e-mail address an instruction whether the identification code validity information is to be restored or not can be accepted. Checking a button 4901 means the restoration of the identification code validity information associated with abc@def.ghi, and checking a button 4902 means the restoration of the identification code validity information associated with hij@kl.stu. When a button 4903 is pushed, these instructions are sent to the identification code administration apparatus to return the specified identification code validity information.

Figure 50:
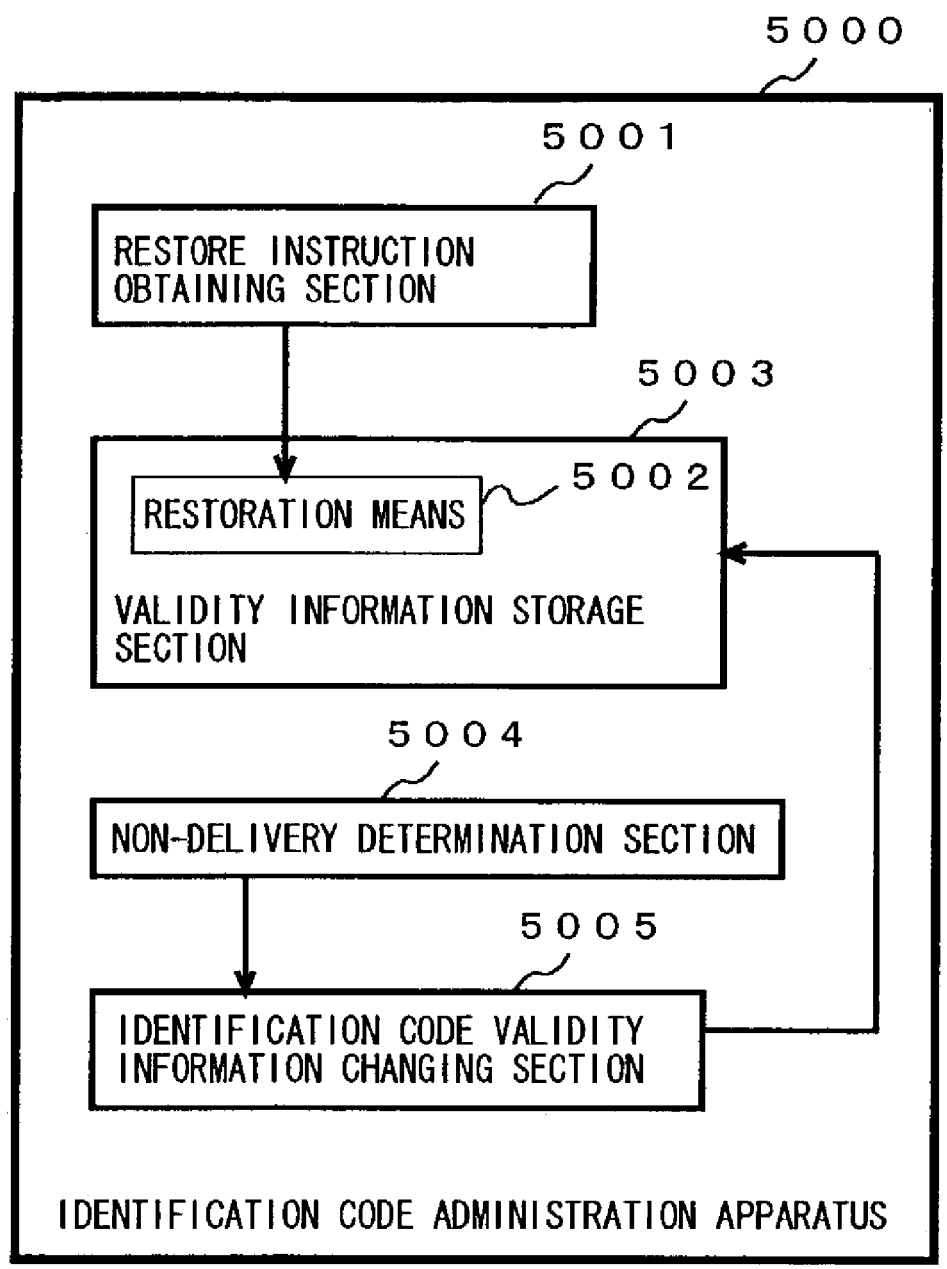
FIG. 50 is a functional block diagram of the identification code administration apparatus of a twelfth embodiment of the present invention

FIG. 50 exemplifies the functional block diagram of the identification code administration apparatus of the twelfth embodiment. The difference between the identification code administration apparatus of this embodiment and the identification code administration apparatuses in the tenth embodiment or the eleventh embodiment is that the apparatus of this embodiment has a restore instruction obtaining section 5001 and a validity information storage section 5003 has restoration means 5002.

The 'restore instruction obtaining section' 5001 obtains restore instruction information that is an instruction to restore the identification code validity information, which has been changed to 'does not have particular authorization' by an identification code validity information changing section 5005, to 'has particular authorization'. For example, it is means for obtaining the fact that buttons (4901, 4902) have been pushed on the screen shown in FIG. 49.

The 'restoration means' 5002 changes the identification code validity information from 'does not have particular authorization' to 'has particular authorization' according to the restore instruction information obtained by the restore instruction obtaining section. For example, in the case where the identification code validity information of u284729, which was valid in FIG. 32, has been changed to invalid in FIG. 33, the returning means changes it to valid again as shown in FIG. 32 .

Figure 58:
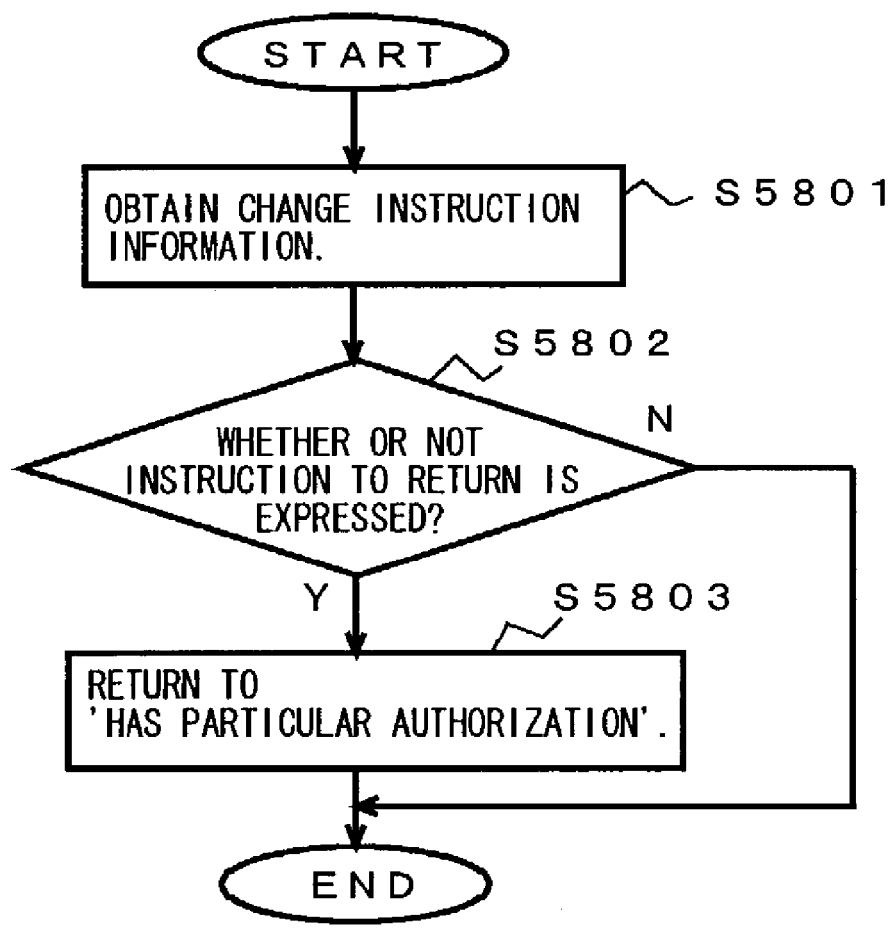
FIG. 58 is a flowchart of the processing in the twelfth embodiment.

FIG. 58 exemplifies the flowchart unique for the twelfth embodiment. Specifically, the flowchart of a processing is exemplified where the restore instruction obtaining section obtains the restore instruction information and the processing is performed based on the restore instruction information.

At step S5801, the restore instruction obtaining section obtains the change instruction information.

At step S5802, whether the obtained restore instruction information expresses an instruction to restore or not the validity, and the processing proceeds to step S5803 if it does. Otherwise, step S5803 is skipped.

At step S5803, the identification code validity information is restored as 'has particular authorization'.

Figure 57:
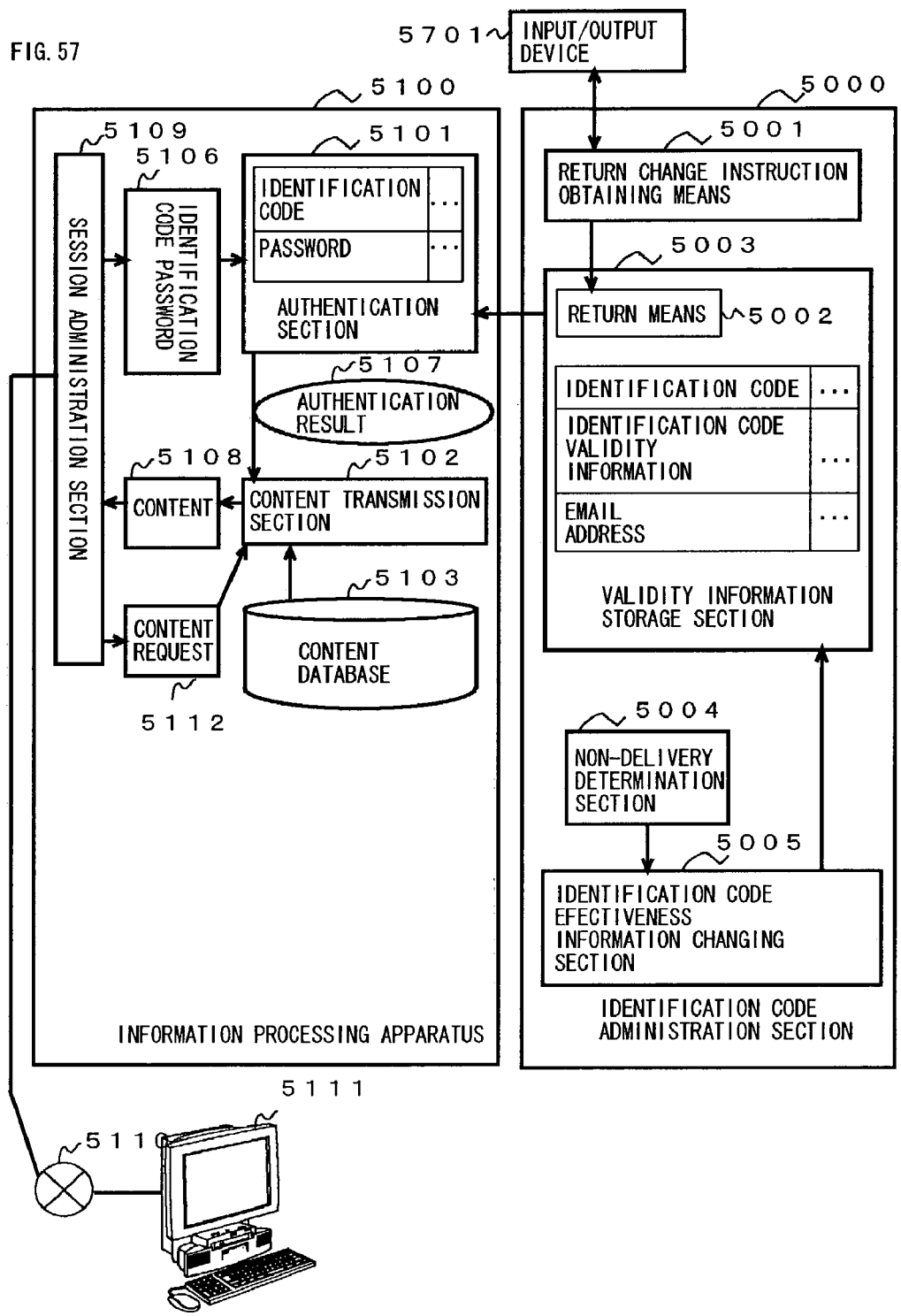
FIG. 57 is an exemplary view of a state where the identification code administration apparatus in the twelfth embodiment and the information processing apparatus are combined.

FIG. 57 exemplifies the functional block diagram of the system where an identification code administration apparatus 5000 in this embodiment and the information processing apparatus 5100 have been combined.

The tables, which the validity information holding section 5003 of the identification code administration apparatus in this embodiment and the authentication section 5101 of the information processing apparatus store, share the values in the column of 'identification code'.

When the identification code and the password 5106 are input to the authentication section 5101, the authentication section 5101 determines whether the identification code and the password match the password stored in the authentication section or not. If they match, the section obtains the identification code validity information, which is stored in the validity information storage section 5003 by being associated with the identification code, and if it is 'invalid', it passes a result as the authentication result 5107 that the authentication has failed to the content transmission section 5102, and thereby preventing the content form being transmitted to the user.

Note that an input/output device 5701 is a device for displaying a screen, where the restore instruction obtaining section 5001 obtains the restore instruction information, and for obtaining the restore instruction information. As shown in FIG. 57, the input/output device 5701 may be directly connected to the identification code administration apparatus 5000, or may be connected to the apparatus via the communication network.

According to the twelfth embodiment, it is possible to restore the identification code validity information, which has been once invalidated, to valid.

The thirteenth embodiment of the present invention relates to an identification code information administration apparatus where the information processing apparatus described in the first embodiment or the like and the identification code administration apparatus described in the seventh embodiment or the like have been combined.

Figure 59:
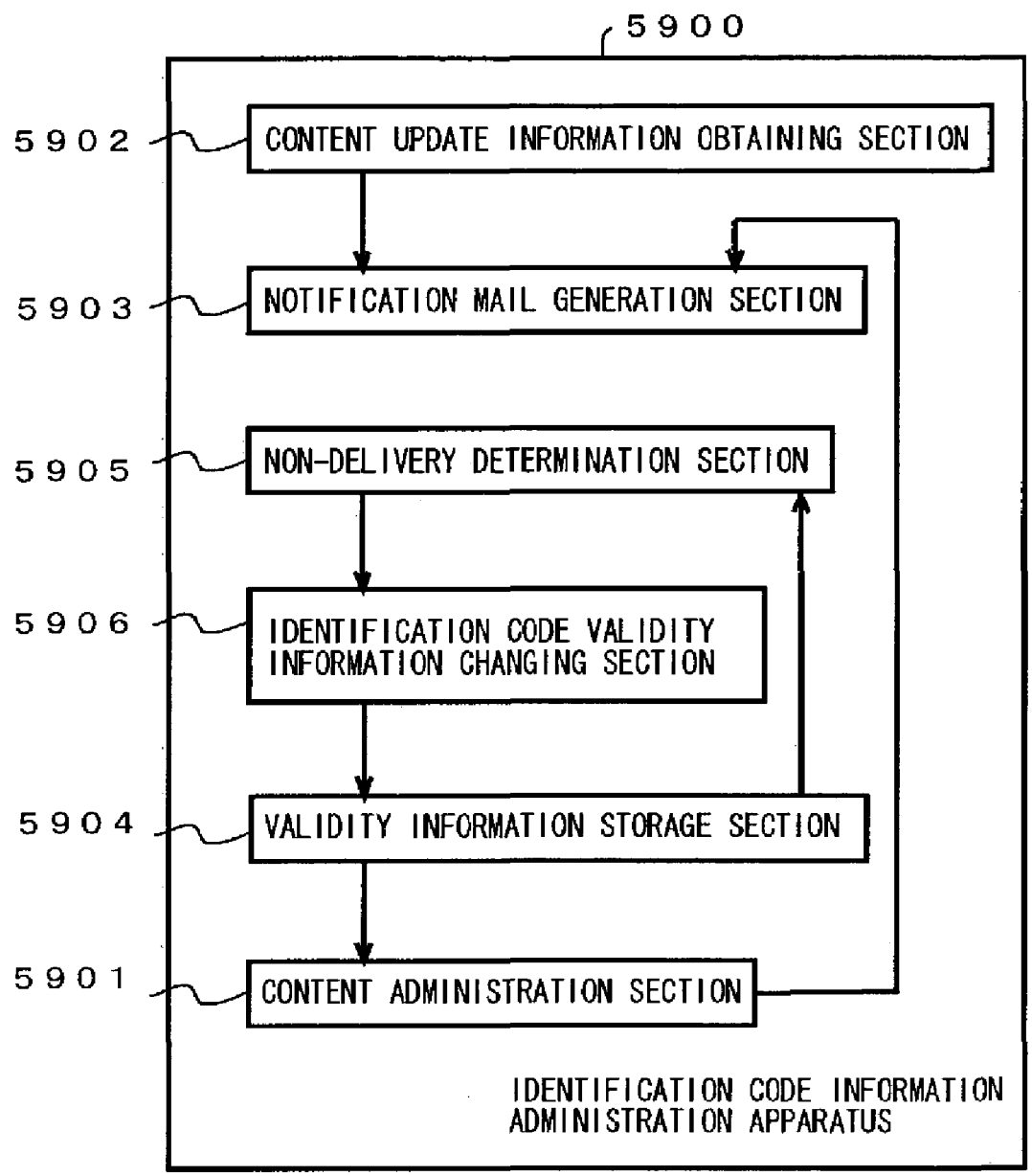
FIG. 59 is a functional block diagram of the identification code information administration apparatus of a thirteenth embodiment of the present invention.

FIG. 59 exemplifies the functional block diagram of the identification code information administration apparatus. An identification code information administration apparatus 5900 comprises a content administration section 5901, a content update information obtaining section 5902, a notification mail generation section 5903, a validity information storage section 5904 a non-delivery determination section 5905, and a identification code validity information changing section 5906.

The 'content administration section', 'content update information obtaining section' and 'notification mail generation section' are the ones as described in the first embodiment or the like.

The 'validity information storage section', 'non-delivery determination section' and 'identification code validity information changing section' are also the ones as described in the seventh embodiment or the like.

In this embodiment and other subsequently described embodiments, as described in the first embodiment and the seventh embodiment, the content administration section 5901 administers plural kinds of contents and the browsing-permitted subject identification code for each content, by associating them. On the other hand, the validity information storage section 5904 stores the identification code, the identification code validity information that is the information showing a person, or a device, etc. that entered the code has particular authorization based on the identification code, the e-mail address regarding a subject identified by the identification code, by associating them with each other. Under such circumstances, the 'browsing-permitted subject identification code' in the content administration section 5901 and the 'identification code' in the validity information storage section 5904 may be the same. Alternatively, a correspondence table or the like of the browsing-permitted subject identification code and the identification code are administered by the validity information storage section 5904 or the content administration section 5901, and the browsing-permitted subject identification code and the identification code may be different. In the following, description will be made assuming that the browsing-permitted subject identification code and the identification code are the same for convenience sake.

Furthermore, in the thirteenth embodiment, the non-delivery determination section 5905 stores all e-mail addresses for which the notification mail generation section generates the notification mails, and may perform determination regarding non-delivery for them. Alternatively, the non-delivery determination section 5905 may determine whether the transmission is non-deliverable or not to the e-mail address associated with the identification code that is included in the identification code validity information stored by the validity information storage section 5904 in the state where the information shall have particular authorization. For this reason, the non-delivery determination section 5905 may obtain the e-mail address associated with the identification code that is included in the identification code validity information by the validity information storage section 5904 in the state where the information has particular authorization.

Further, in the thirteenth embodiment, when the identification code validity information stored by the validity information storage section 5904 is changed by the identification code validity information changing section 5906, the association between the content administrated by the content administration section 5901 and the browsing-permitted subject identification code may be changed. For example, it is assumed that the identification code and the browsing-permitted subject identification code are the same. In this case, when the identification code validity information is changed such that the identification code does not have particular authorization, the association between the identification code and the content may end.

By performing in this manner, even if the content is updated, it is possible that generation of notification mail is not performed for the e-mail address, which is obtained based on the identification code associated with the content.

Figure 60:
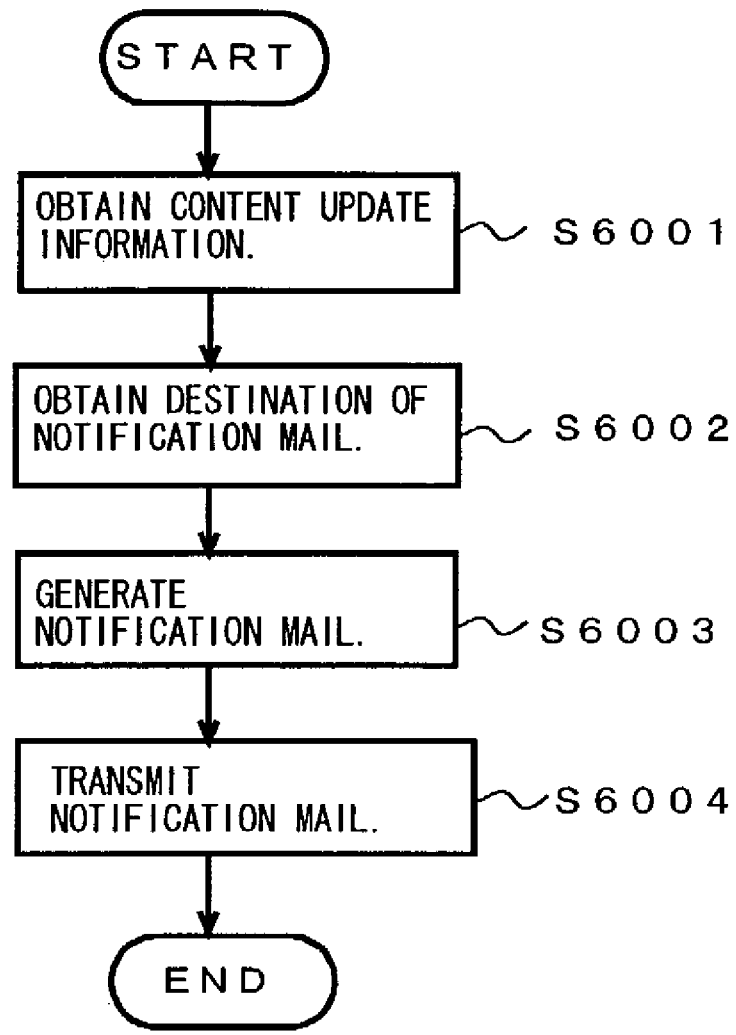
FIG. 60 is a flowchart of the processing from obtainment of content update information to transmission of an notification mail in the identification code information administration apparatus of the thirteenth embodiment.

FIG. 60 exemplifies the flowchart explaining the processing flow of the identification code information administration apparatus 5900 from obtainment of the content update information to transmission of the notification mail.

At step S6001, the content update information obtaining section 5902 obtains the content update information.

At step S6002, the notification mail generation section 5903 obtains the destination of notification mail based on the content update information.

At step S6003, the notification mail generation section 5903 generates the notification mail.

At step S6004, the notification mail is transmitted.

Figure 61:
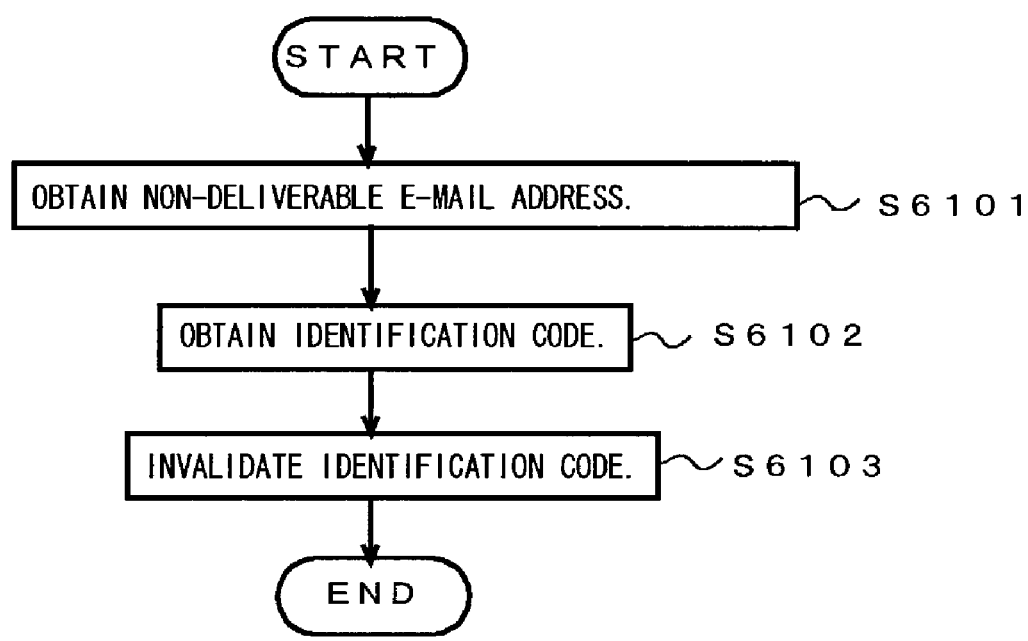
FIG. 61 is a flowchart of the processing from the point when the e-mail address, to which the non-delivery determination section 5905 has determined that transmission of the e-mail was non-deliverable, is detected to the point when the identification code comes to a state where it does not have authorization, in the identification code information administration apparatus of the thirteenth embodiment.

FIG. 61 exemplifies the flowchart explaining the processing flow of the identification code information administration apparatus 5900 from the point when non-delivery determination section 5905 detects the e-mail address, to which transmission of the e-mail is non-deliverable, to the point when the identification code comes to a state where it does not have particular authorization (for example, the state where the identification code is invalidated).

At step S6101, the identification code validity information changing section 5906 obtains the e-mail address to which transmission of the e-mail is non-deliverable.

At step S6102, the identification code associated with the e-mail address is obtained.

At step S6103, the validity information stored by the validity information storage section 5904 is changed to invalidate its identification code.

Figure 62:
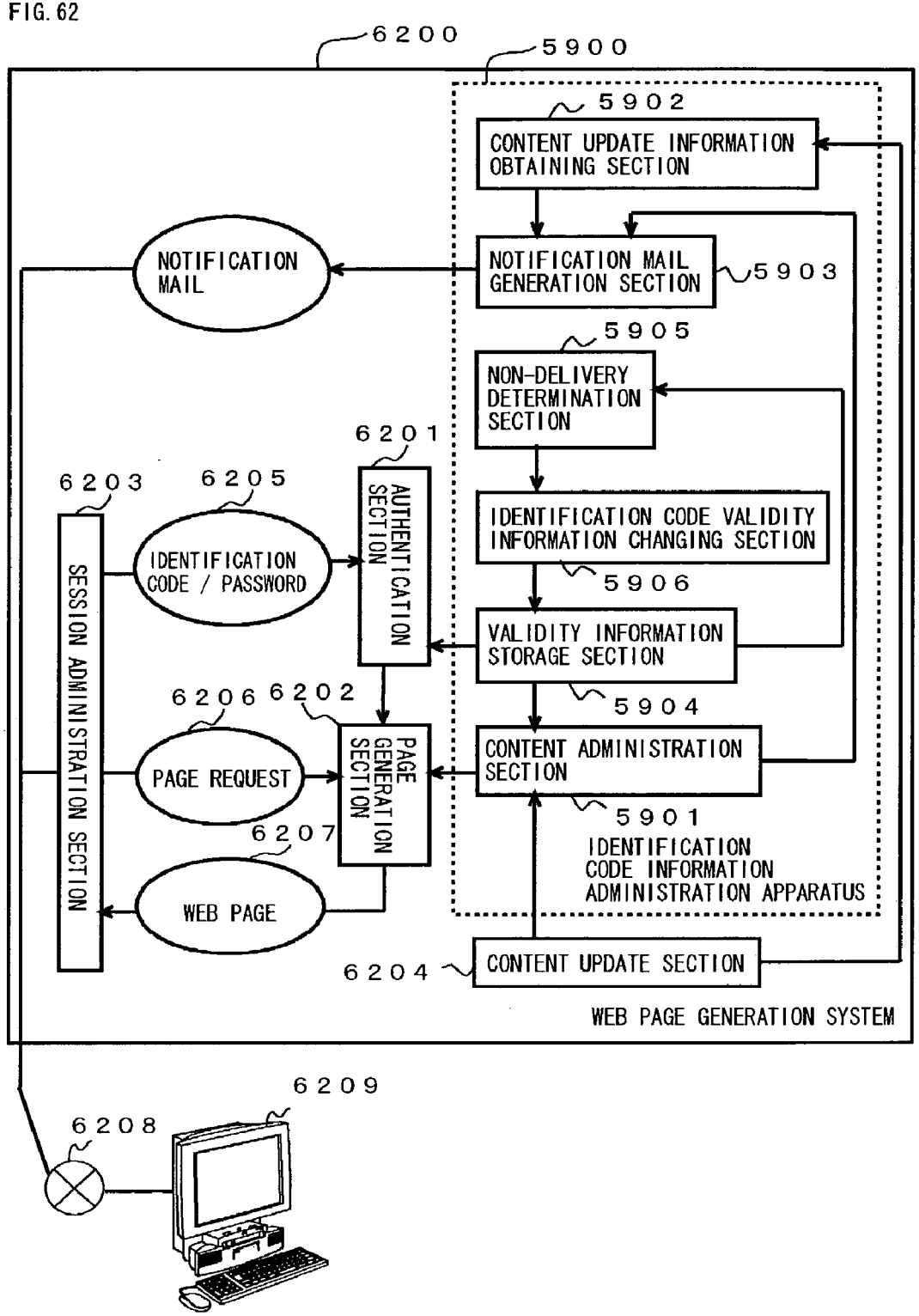
FIG. 62 is a functional block diagram of the WEB page generation system in which the identification code information administration apparatus of the thirteenth embodiment is incorporated.

FIG. 62 exemplifies the functional block diagram of the WEB page generation system in which the identification code information administration apparatus S900 of this is incorporated.

The WEB page generation system is connected to a user terminal 6209 via a communication network 6208 such as the Internet. The information transmitted from the user terminal 6209 to a WEB page generation system 6200 is further transmitted to a session administration section 6203.

The session administration section 6203 administers the communication status between the user terminal 6209 and the WEB page generation system 6200. For example, when the communication with the user terminal 6209 is in an authenticated state, the session administration section 6203 sends the identification code and a password 6205, which are transmitted from the user terminal 6209, to an authentication section 6201.

The authentication section 6201 performs authentication to the identification code and password. During the authentication, the section refers to the validity information stored by the validity information storage section 5904, and determines whether the identification code has particular authorization. Specifically, even if the identification code and password are authentic, authentication fails when the identification code does not have particular authorization. The result of authentication in the authentication section 6201 is sent to a page generation section 6202 together with the identification code to which authentication has been performed.

When a page request 6206 that is a request for browsing a WEB page is transmitted after the user terminal 6209 has transmitted the identification code and password, the page generation section 6202, based on the authentication result in the authentication section 6201 and the association between the content and identification code, which are administered by the content administration section 5901, generates a WEB page 6207 using the content associated with the authenticated identification code and sends it back.

Further, when a content administration section 6204 updates the content, the information showing the update is sent to the content administration section 5901 and the content update information obtaining section 5902. As a result, the notification mail generation section 5903 generates the notification mail to transmit it. Since generation of the notification mail is performed based on the association between the content and the identification code, the generated notification mail is transmitted to the user who can browse the updated content but is not transmitted to the user who cannot browse the updated content.

In the identification code information administration apparatus of this embodiment, the e-mail address to which transmission of the e-mail is non-deliverable is detected and it is possible not to transmit the notification mail to the e-mail address. Therefore, traffic increase due to wasteful transmission of e-mail can be restricted. Furthermore, the notification mail is prevented from being transmitted to a person who is no longer employed by a company, to whom the transmission of e-mail has been non-deliverable due to retirement, and the identification code given to such a person can be invalidated, so that it is possible to maintain confidentiality of information, which is intended to be disclosed only to the company.

Figure 63:
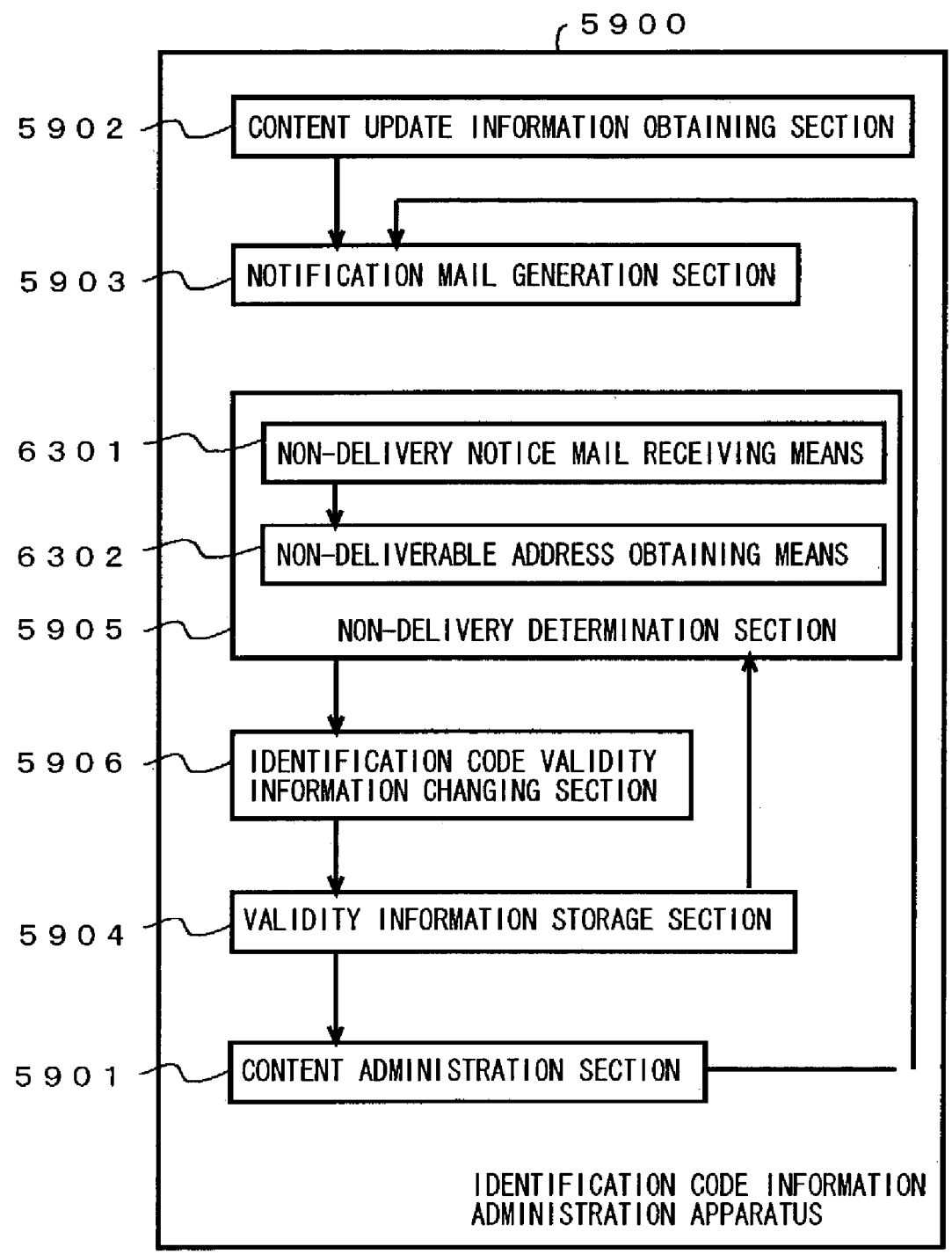
FIG. 63 is a functional block diagram of the identification code information administration apparatus of a fourteenth embodiment of the present invention.

FIG. 63 exemplifies the functional block diagram of the identification code information administration apparatus of the fourteenth embodiment.

The identification code information administration apparatus according to the fourteenth embodiment is configured such that the non-delivery determination section 5905 of the identification code information administration apparatus 5900 of the thirteenth embodiment further has non-delivery notice mail receiving means 6301 and non-deliverable address obtaining means 6302.

The 'non-delivery notice mail receiving means' and the 'non-deliverable address obtaining means' are the ones as described in the eighth embodiment.

Accordingly, the non-delivery notice mail receiving means 6301 receives an e-mail (that is, a non-delivery notice mail) showing that the e-mail that has been generated in the notification mail generation section 5903 and has been transmitted cannot be delivered to the e-mail address.

The non-deliverable address obtaining means 6302 obtains the e-mail address, to which transmission of e-mail is non-deliverable, from the e-mail received by the non-delivery notice mail receiving means 6301

Figure 64:
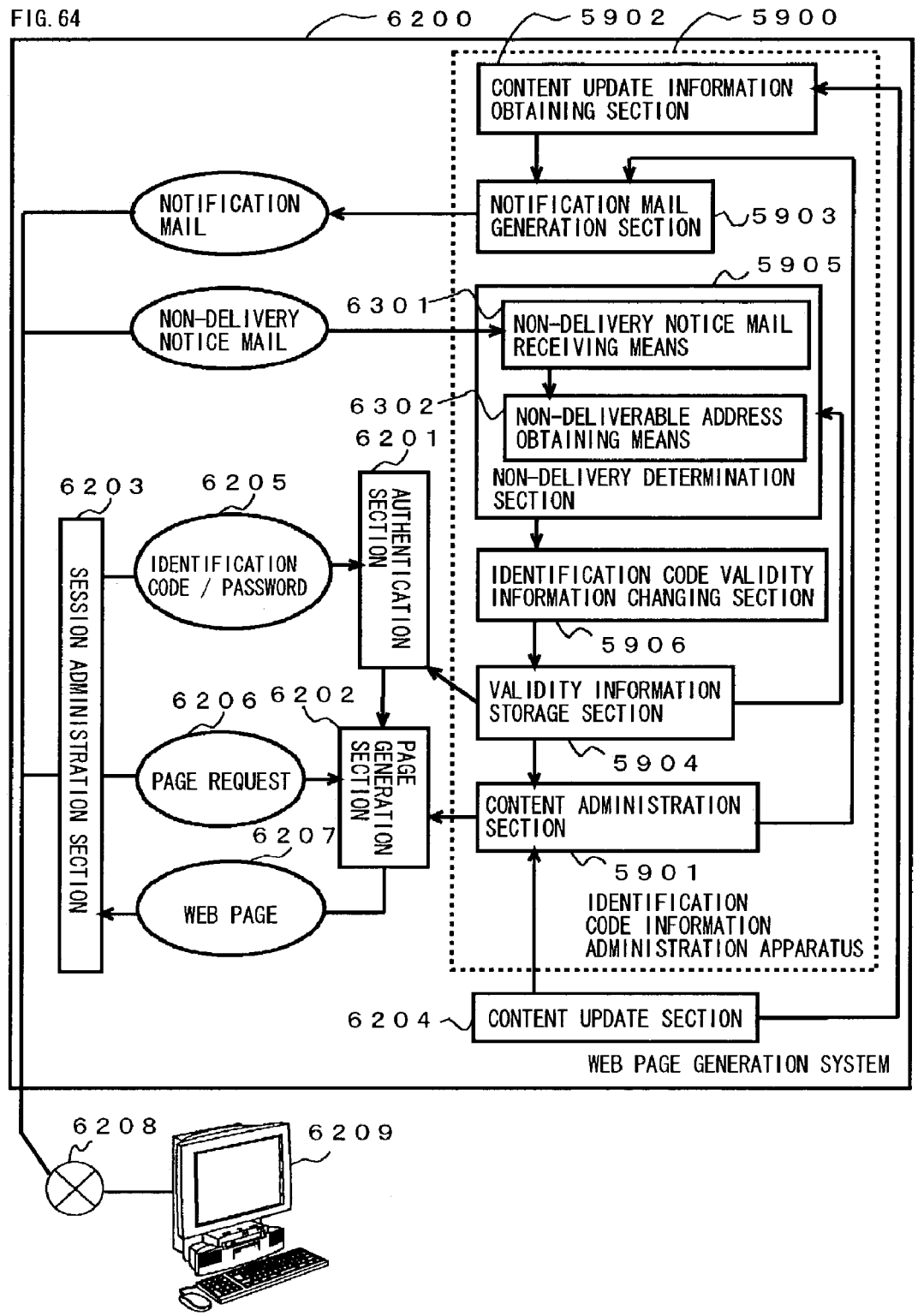
FIG. 64 is a functional block diagram of the WEB page generation system in which the identification code information administration apparatus of the fourteenth embodiment is incorporated.

FIG. 64 exemplifies the functional block diagram of the WEB page generation system into which the identification code information administration apparatus in the fourteenth embodiment is incorporated.

The difference between FIG. 64 and FIG. 62 described in the thirteenth embodiment is that the non-delivery notice mail receiving means 6301 of the non-delivery determination section 5905 receives the non-delivery notice mail.

Figure 65:
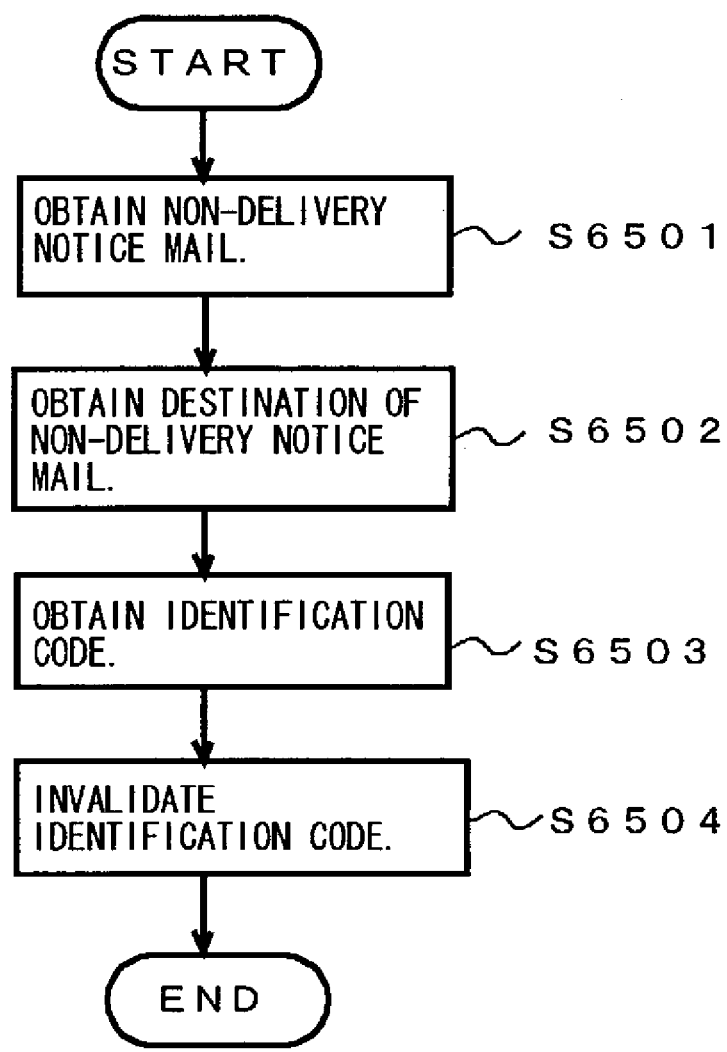
FIG. 65 is a flowchart of the processing from the point when the non-delivery notice e-mail is received to the point when the identification code is invalidated, in the identification code information administration apparatus of the fourteenth embodiment.

FIG. 65 exemplifies the flowchart explaining the processing flow from the point when the identification code information administration apparatus in this embodiment receives the non-delivery notice mail to the point when the apparatus invalidates the identification code.

At step S6501, the non-delivery notice mail receiving means 6301 receives the non-delivery notice mail.

At step S6502, the non-deliverable address obtaining means obtains the e-mail address that is the destination of the non-delivery notice mail.

At step S6503, the identification code associated with the e-mail address is obtained.

At step S6504, the validity information stored by the validity information storage section 5904 is changed to invalidate its identification code.

In the identification code information administration apparatus of this embodiment, the e-mail address to which transmission of the notification mail is non-deliverable is obtained and the identification code associated with the e-mail address is invalidated. Therefore, the identification code of a person, who is no longer employed by a company and to whom the transmission of e-mail has been non-deliverable due to retirement, for example, is invalidated, so that it is possible to maintain confidentiality of information, which is intended to be disclosed only to the company. In addition, transmission of wasteful notification mail is restricted and increased traffic can be prevented.

Figure 66:
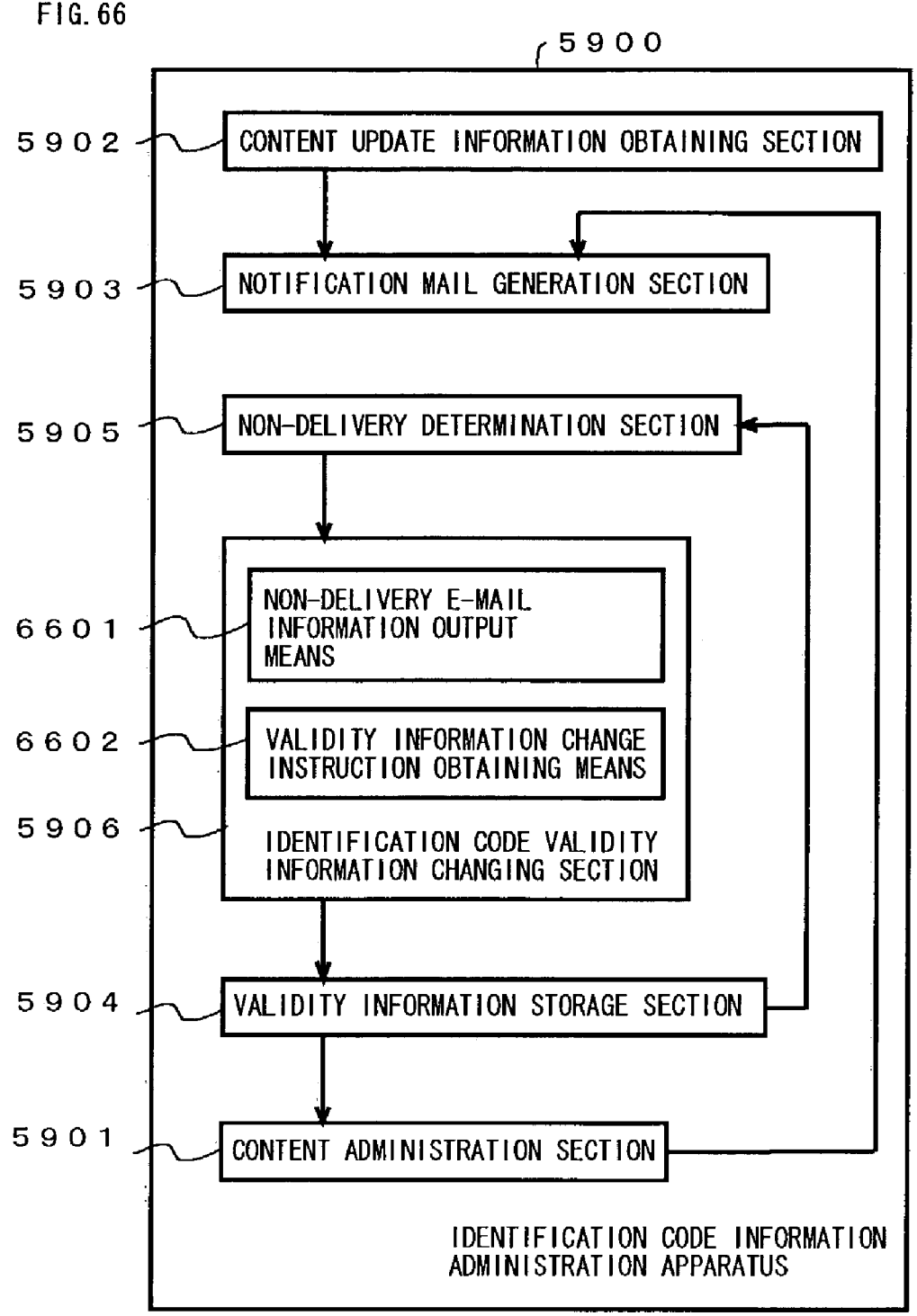
FIG. 66 is a functional block diagram of the identification code information administration apparatus of a fifteenth embodiment of the present invention.

FIG. 66 exemplifies the functional block diagram of the identification code information administration apparatus according to the fifteenth embodiment.

The identification code information administration apparatus according to the fifteenth embodiment is configured such that the identification code validity information changing section 5906 of the identification code information administration apparatus 5900 of the thirteenth embodiment further has non-delivery e-mail information output means 6601 and validity information change instruction obtaining means 6602.

The 'non-delivery notice mail information output means' and the 'validity information change instruction obtaining means' are described in the ninth embodiment.

Accordingly, in this embodiment, information regarding the e-mail address, which has been determined to be non-deliverable by the non-delivery determination section, is output, the instruction as to whether the identification code validity information is changed based on the output or not is obtained, and the identification code validity information is changed based on the instruction.

Figure 67:
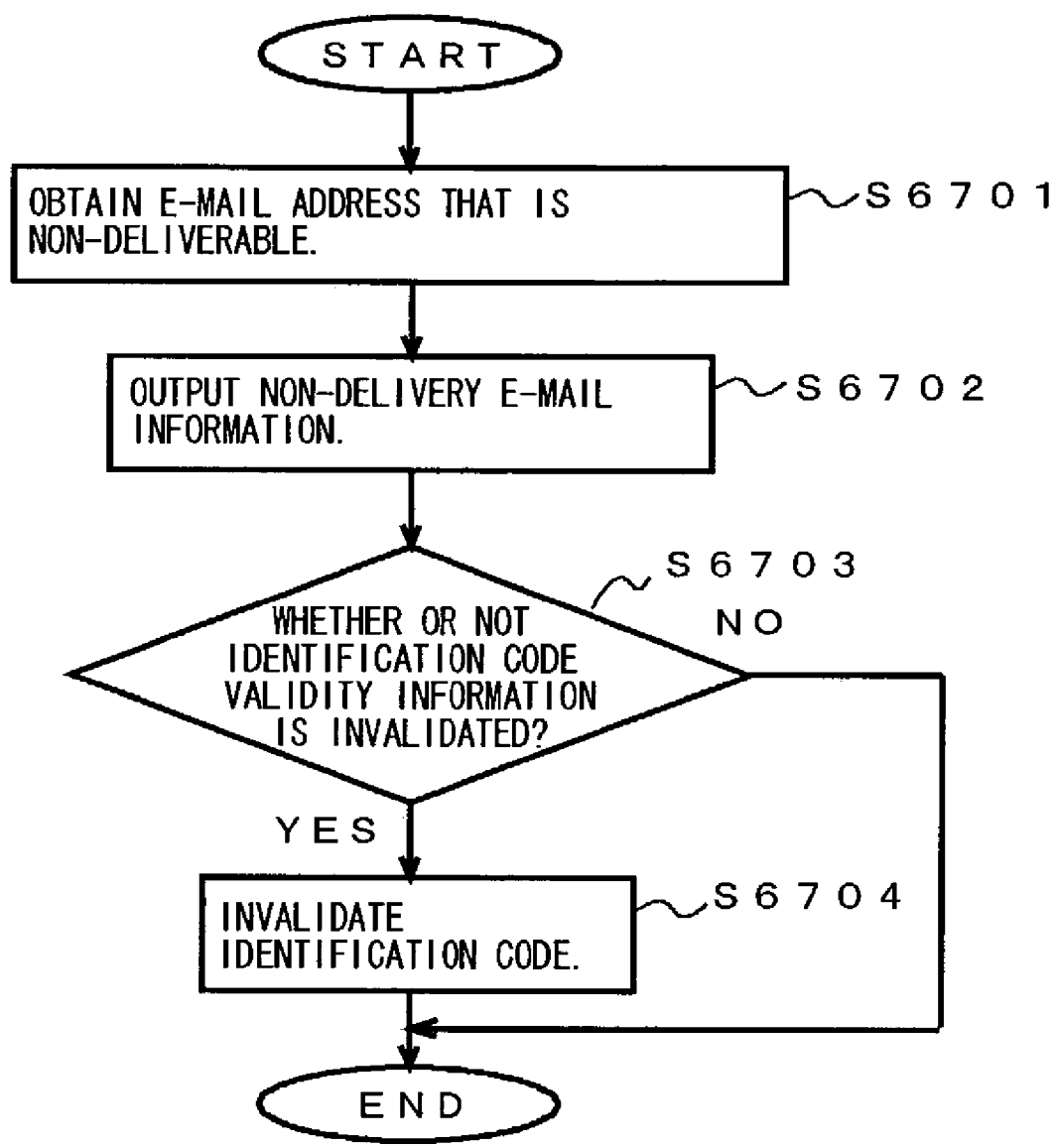
FIG. 67 is a flowchart of the processing from the point when the e-mail address, to which transmission has been determined to be non-deliverable, is obtained to the point when the identification code becomes invalid, in the identification code information administration apparatus of the fifteenth embodiment.

FIG. 67 exemplifies the flowchart explaining the processing flow of the identification code information administration apparatus from the point when the e-mail address determined to be non-deliverable is received to the point when the identification code is invalidated.

At step S6701, the identification code validity information changing section 5906 obtains the non-deliverable e-mail address.

At step S6702, the non-delivery e-mail information output means 6601 outputs the non-delivery e-mail information.

At step S6703, the validity information change instruction obtaining means 6602 obtains the instruction whether the identification code validity information is invalidated, and whether the identification code validity information is invalidated or not is determined.

If it is determined to invalidate the identification code validity information, the processing proceeds to step S6704 and the identification code validity information changing section 5906 invalidates the identification code.

Figure 68:
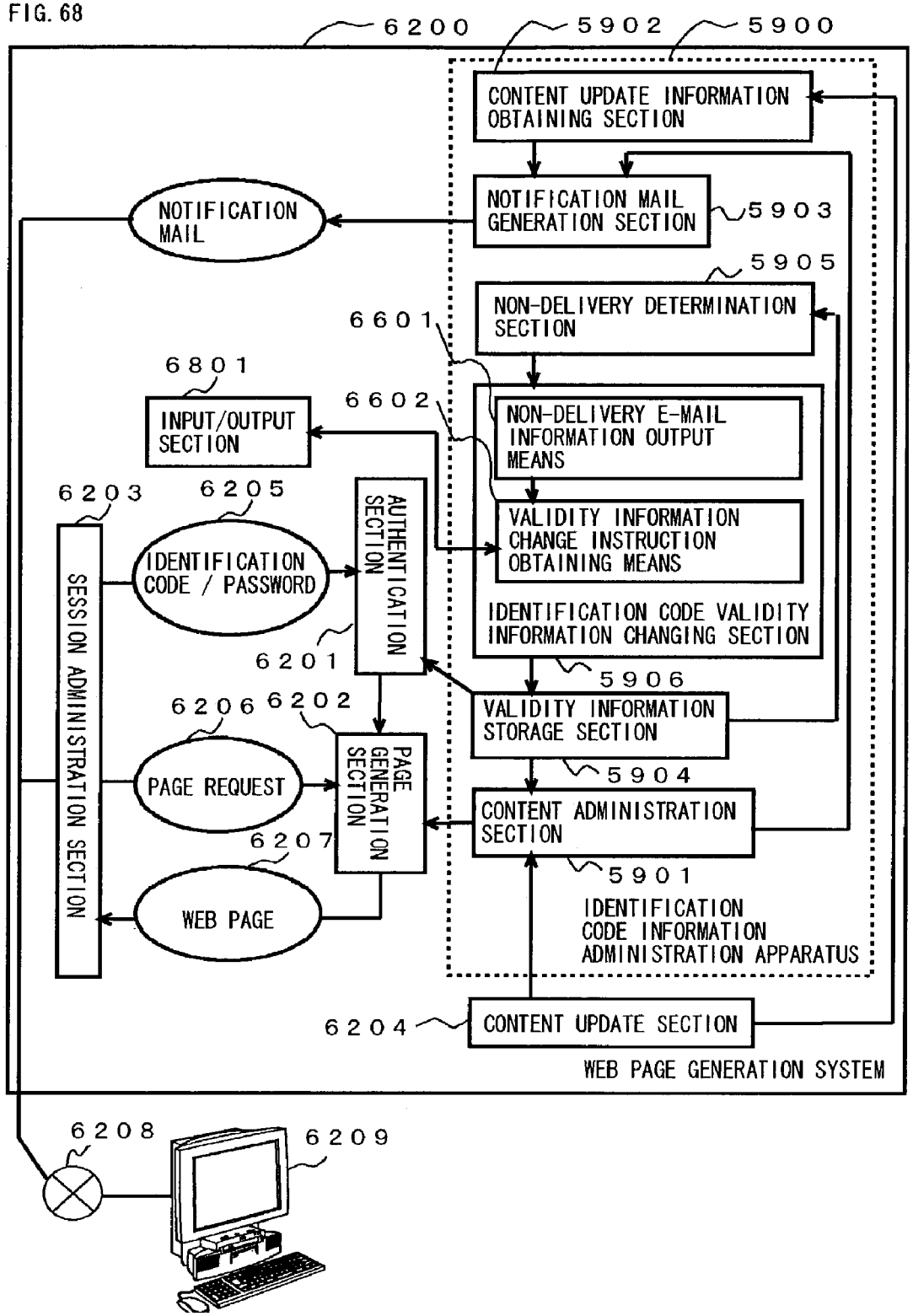
FIG. 68 is a functional block diagram of the WEB page generation system in which the identification code information administration apparatus of the fifteenth embodiment is incorporated.

FIG. 68 exemplifies the functional block diagram of the WEB page generation system into which the identification code information administration apparatus in the fifteenth embodiment is incorporated.

The difference between FIG. 68 and FIG. 62 described in the thirteenth embodiment is that, in FIG. 68, the identification code validity information changing section 5906 has the non-delivery e-mail information output means 6601 and the validity information change instruction obtaining means 6602. Further, they are different on the point that the WEB page generation system 6200 has an input/output section 6801.

The input/output section 6801 is a section for displaying the non-delivery e-mail information that the non-delivery e-mail information output means outputs, and obtaining the instruction whether the validity information is changed or not. For example, the input/output section 6801 displays the screen exemplified in FIG. 44 and enters information where the buttons (4401, 4402) are pushed.

According to the identification code information administration apparatus of the fifteenth embodiment, since the identification code validity information can be changed on confirming the cause why the transmission of e-mail has become non-deliverable, the identification code validity information will not be invalidated when the transmission of e-mail becomes non-deliverable due to a trouble in the server or the like. As a result, this embodiment has the following effect in addition to the effect cited in the thirteenth embodiment. It is possible to reduce a task that the receiver of the notification mail informs the administrator of the WEB page generation system or the like of the fact that the trouble of server or the like caused transmission non-delivery of the e-mail.

Figure 69:
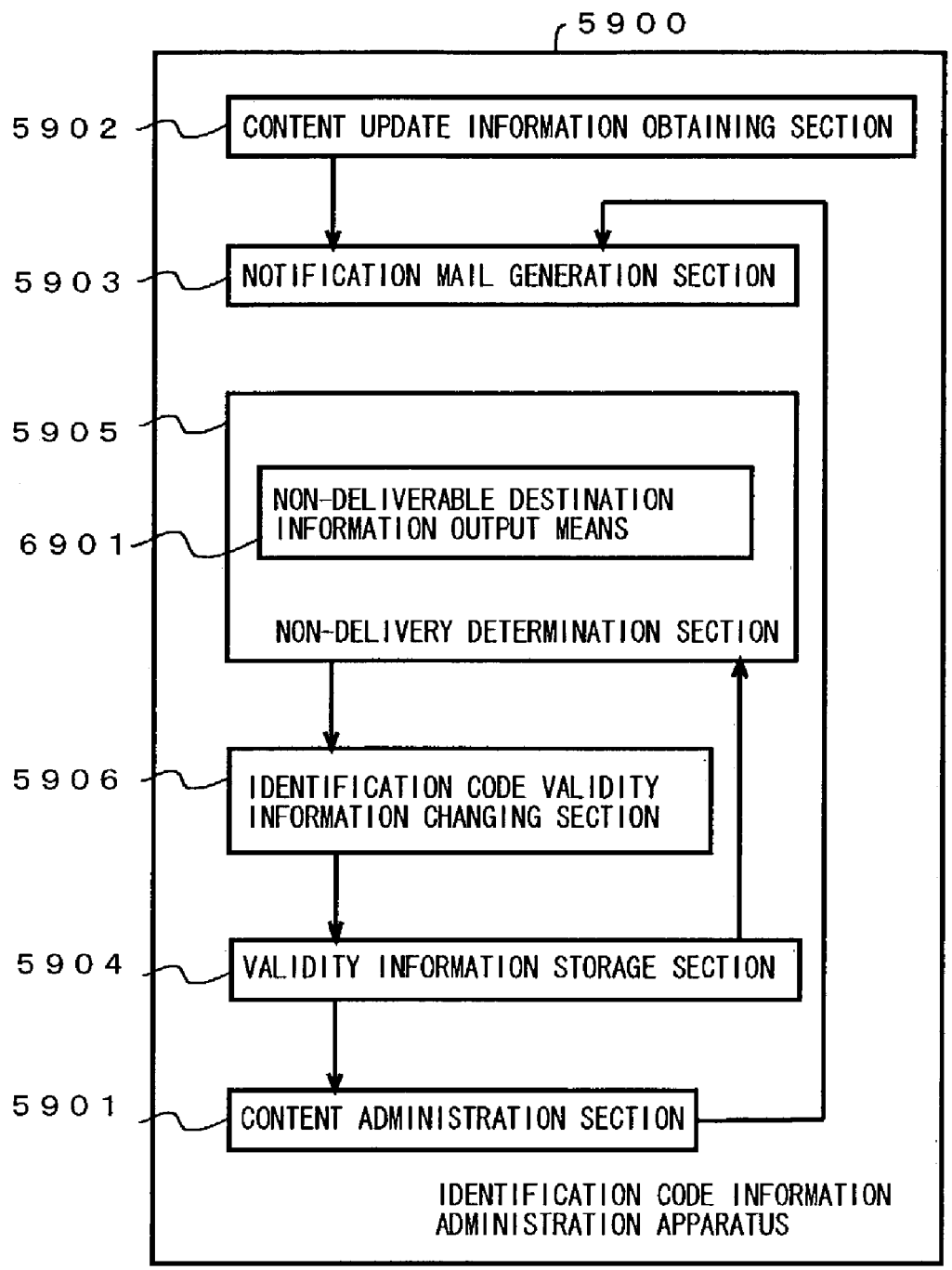
FIG. 69 is a functional block diagram of the identification code information administration apparatus of a sixteenth embodiment of the present invention.

FIG. 69 exemplifies the functional block diagram of the identification code information administration apparatus according to the sixteenth embodiment of the present invention.

The identification code information administration apparatus according to the sixteenth embodiment is configured such that the non-delivery determination section 5905 of the identification code information administration apparatus 5900 of the thirteenth embodiment further has non-deliverable destination information output means 6901.

The 'non-deliverable destination information output means' is the one described in the tenth embodiment.

Accordingly, in this embodiment, the information regarding the destination to which the e-mail has been determined to be non-deliverable is output.

Figure 70:
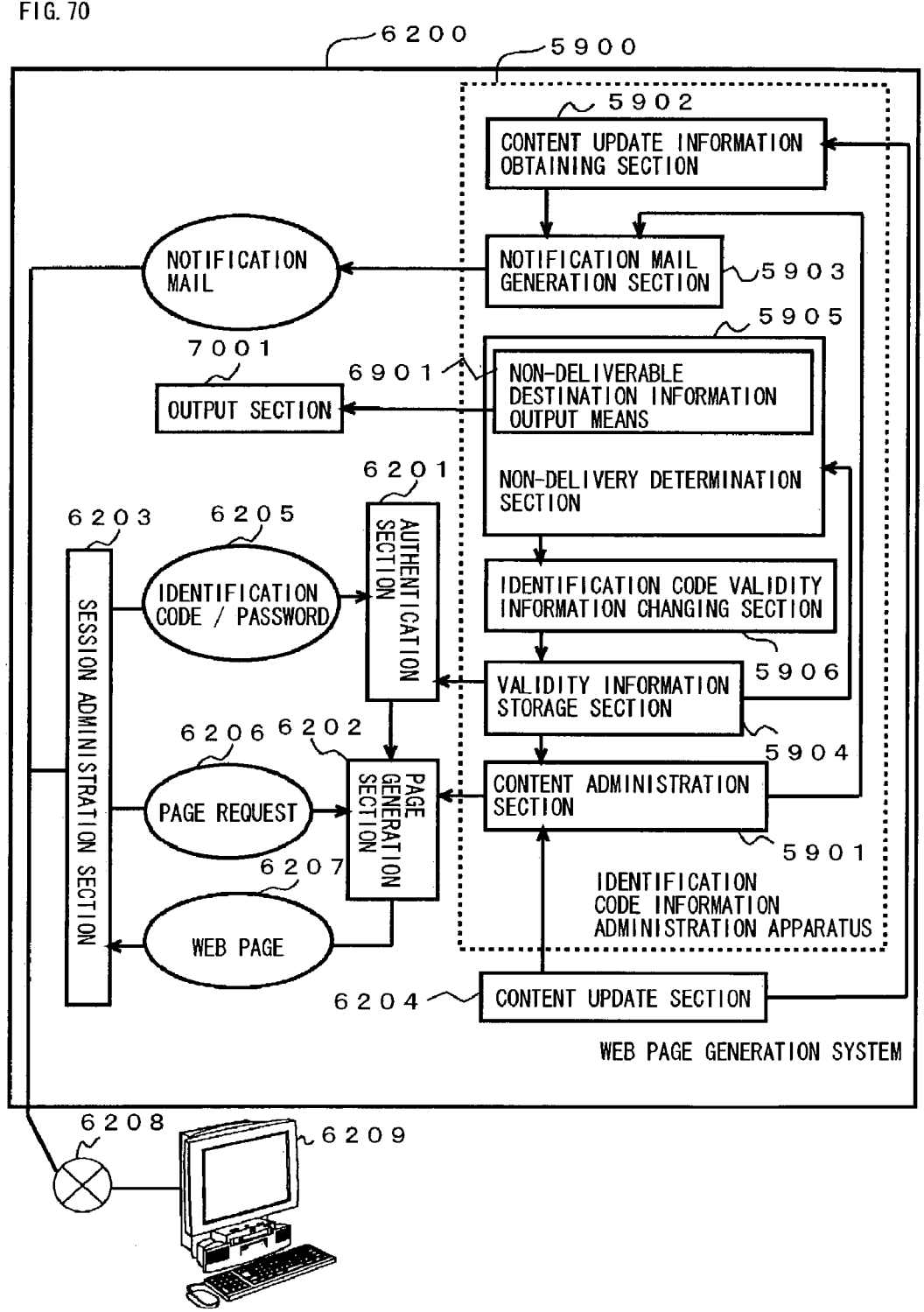
FIG. 70 is a functional block diagram of the WEB page generation system in which the identification code information administration apparatus of the sixteenth embodiment is incorporated.

FIG. 70 exemplifies the functional block diagram of the WEB page generation system into which the identification code information administration apparatus in the sixteenth embodiment is incorporated.

The difference between FIG. 70 and FIG. 62 described in the thirteenth embodiment is that, in FIG. 70, the non-delivery determination section 5905 has the non-deliverable destination information output means 6901 and an output section 7001 is provided for outputting non-deliverable destination information that the non-deliverable destination information output means 6901 has output.

According to the sixteenth embodiment, in addition to the effects of the thirteenth embodiment, it is possible to know which destination has been determined to be non-deliverable because the non-deliverable destination information is output. Therefore, the notification mail is not transmitted to the e-mail address to which the transmission of e-mail is non-deliverable, for example, and increased traffic by non-deliverable mail can be prevented.

Figure 71:
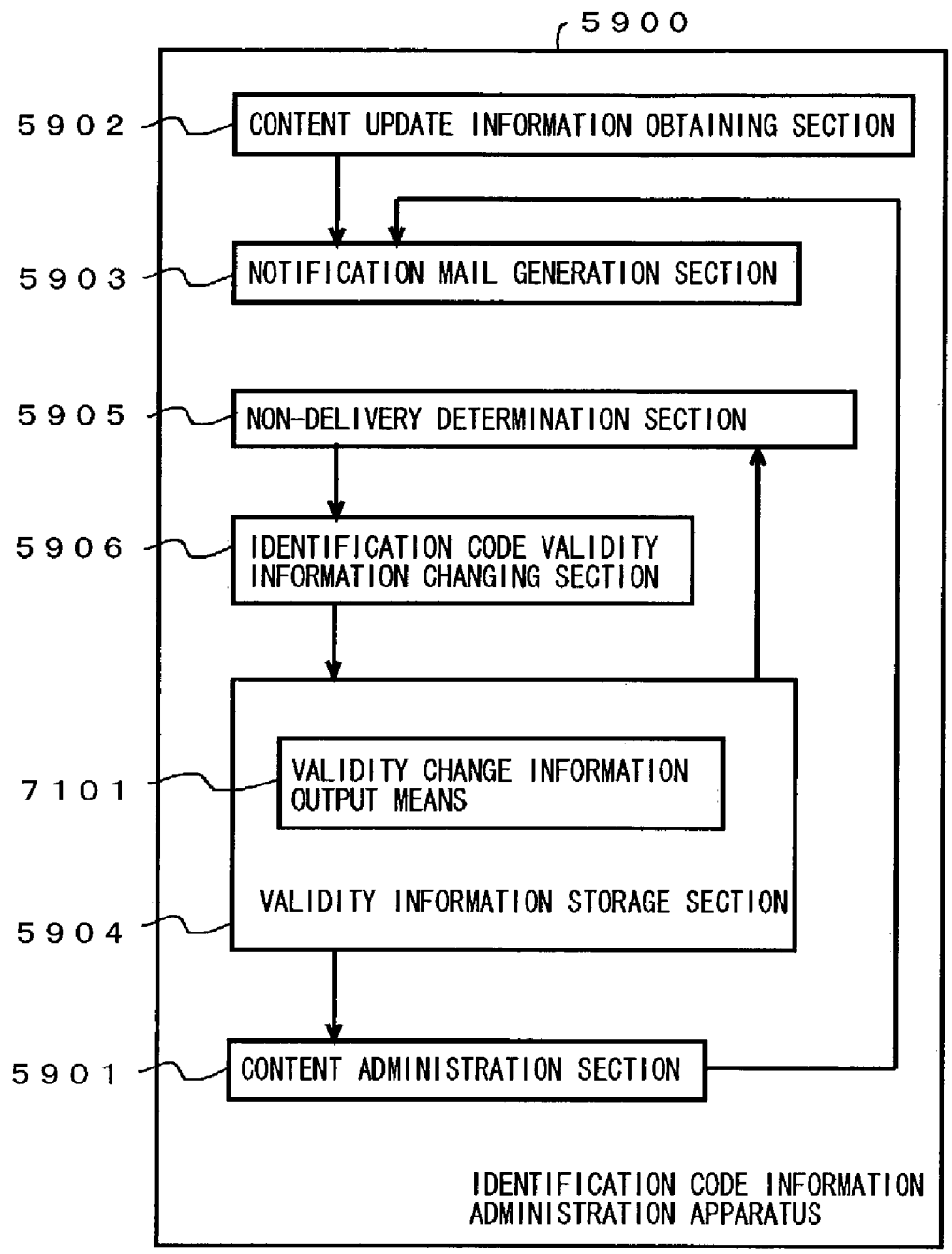
FIG. 71 is a functional block diagram of the identification code information administration apparatus of a seventeenth embodiment of the present invention.

FIG. 71 exemplifies the functional block diagram of the identification code information administration apparatus of the seventeenth embodiment of the present invention.

The identification code information administration apparatus according to the seventeenth embodiment is configured such that the validity information storage section 5904 of the identification code information administration apparatus 5900 of the thirteenth embodiment further has validity change information output means 7101.

The 'validity change information output means' is the one described in the eleventh embodiment.

Therefore, according to this embodiment, when the identification code validity information is changed, information about the change is output.

Figure 72:
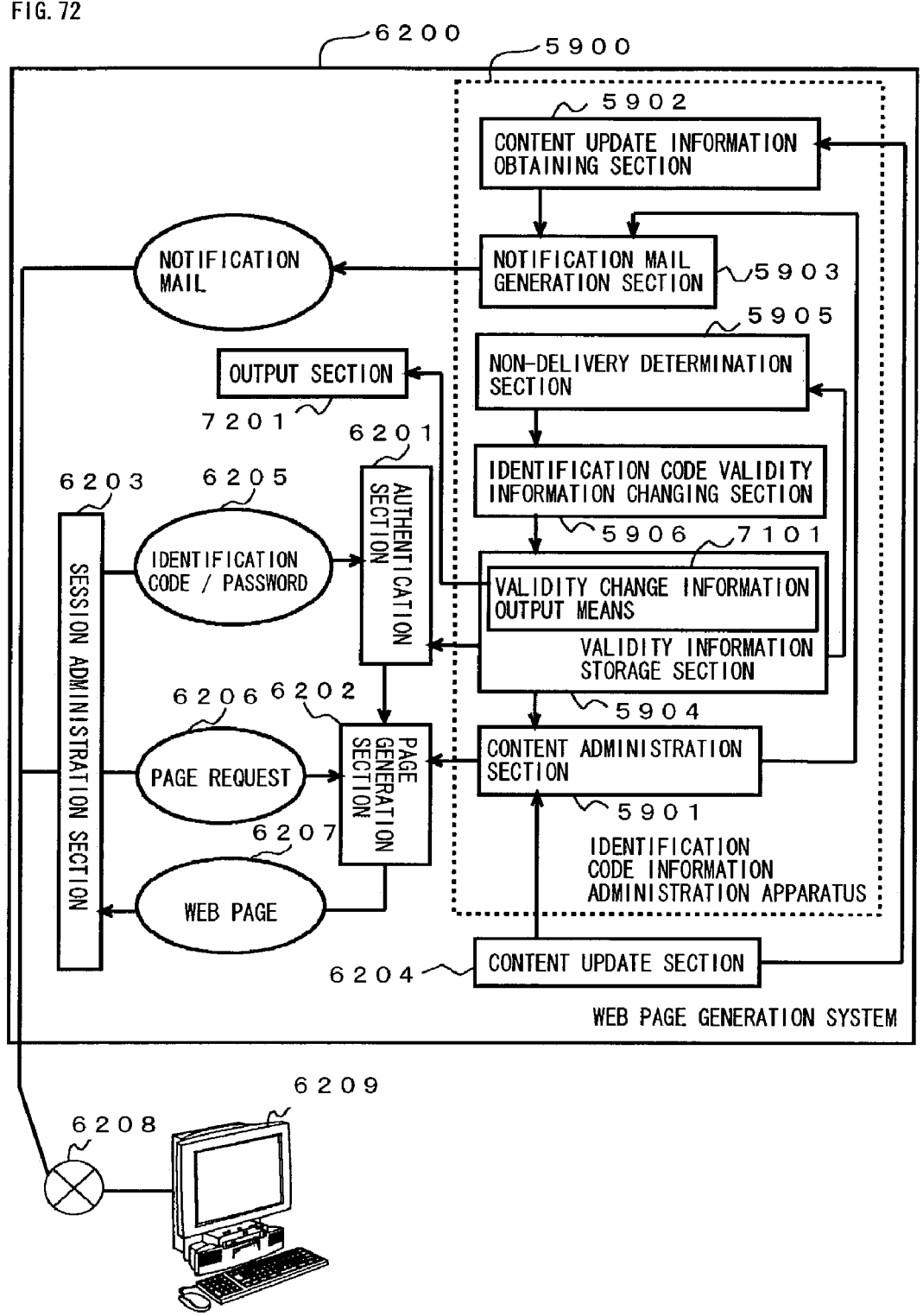
FIG. 72 is a functional block diagram of the WEB page generation system in which the identification code information administration apparatus of the seventeenth embodiment is incorporated.

FIG. 72 exemplifies the functional block diagram of the WEB page generation system into which the identification code information administration apparatus in the seventeenth embodiment is incorporated.

The difference between FIG. 72 and FIG. 62 described in the thirteenth embodiment is that, in FIG. 72, the validity information storage section 5904 has the validity change information output means 7101, and the WEB page generation system is provided with an output section 7201 for outputting validity information that the validity change information output means 7101 outputs.

According to the seventeenth embodiment, it is possible to know which identification code validity information associated with which identification code or which e-mail address has been changed because the validity change information is output. Thus, it becomes possible to which content browsing is restricted, for example, and the content that the user does not browse can be deleted. As a result, in addition to the effect of the thirteenth embodiment, a storage region for storing the contents can be effectively used.

Figure 73:
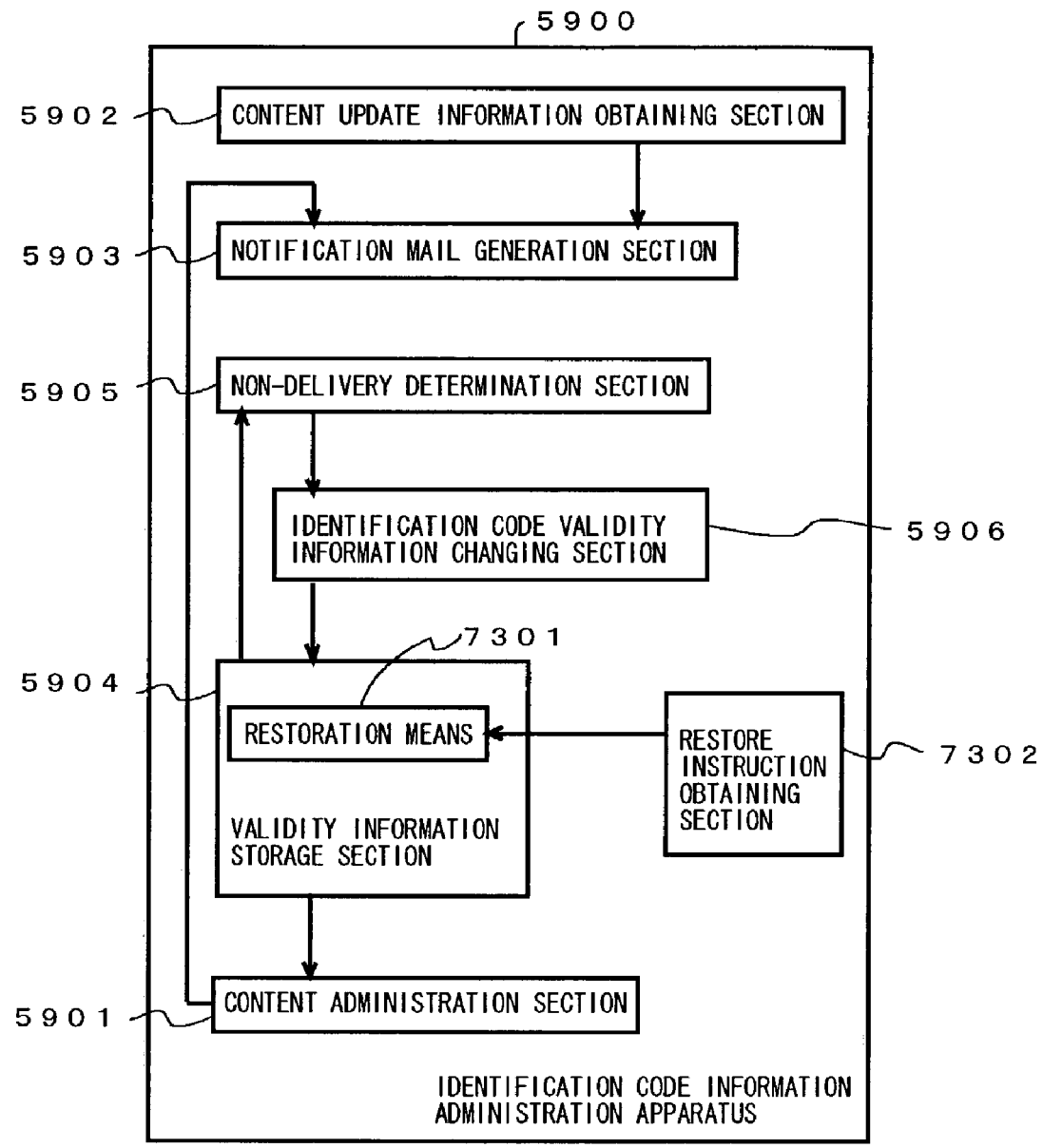
FIG. 73 is a functional block diagram of the identification code information administration apparatus of an eighteenth embodiment of the present invention.

FIG. 73 exemplifies the functional block diagram of the identification code information administration apparatus according to the eighteenth embodiment of the present invention.

The identification code information administration apparatus according to the eighteenth embodiment is configured such that the identification code information administration apparatus 5900 of the thirteenth embodiment further includes restore instruction obtaining section 7302, and the validity information storage section 5904 further has restoration means 7301.

The 'restore instruction obtaining means' 7302 and the 'restoration means' 7301 are described in the twelfth embodiment.

Therefore, in the eighteenth embodiment, even if the identification code validity information is changed, it can be restored to the state before the change.

Figure 74:
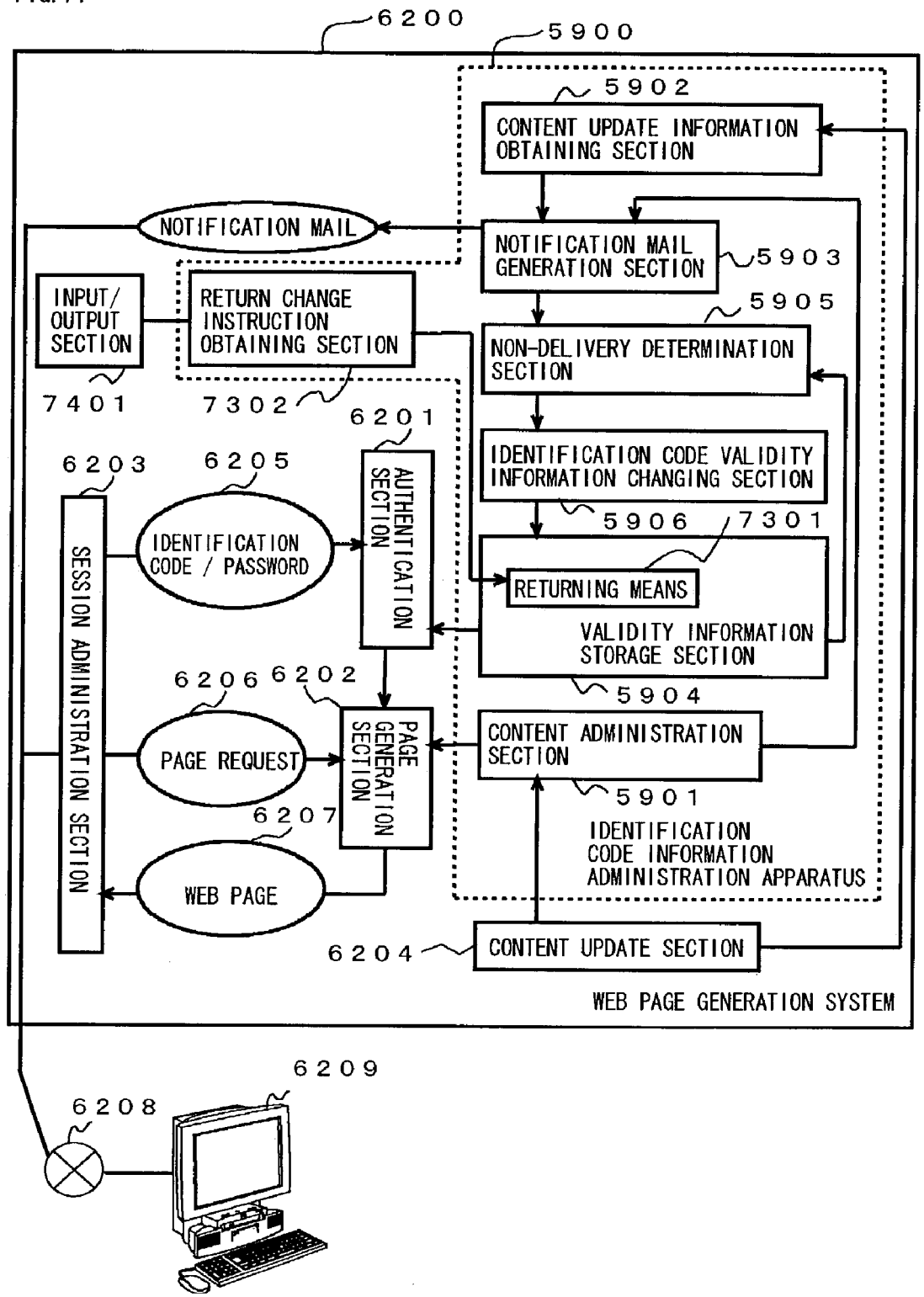
FIG. 74 is a functional block diagram of the WEB page generation system in which the identification code information administration apparatus of the eighteenth embodiment is incorporated.

FIG. 74 exemplifies the functional block diagram of the WEB page generation system into which the identification code information administration apparatus in this embodiment is incorporated.

The difference between FIG. 74 and FIG. 62 described in the thirteenth embodiment is that, in FIG. 74, the restore instruction obtaining means 7302 is provided for the identification code information administration apparatus 5900, and the validity storage section 5904 is provided with the restoration means 7301. Further, what is also different is that the WEB page generation system 6200 is provided with an input/output section 7401.

The input/output section 7401 is a section to display the image as shown in FIG. 49, for example, when the restore instruction obtaining section 7302 returns the identification code validity information. Further it is the section for entering information whether the buttons (4901, 4902) have been pushed or not.

According to the eighteenth embodiment, it is possible to restore the identification code validity information, which has been once invalidated, to valid. Thus, the identification code that has been invalidated for some reason, for example, can be validated, and it is possible to continue sales activity through providing contents.

The nineteenth embodiment of the present invention relates to the identification code information administration apparatus that is an apparatus where the information processing apparatus of the third embodiment and the identification code administration apparatus of the seventh embodiment or the like have been combined.

Figure 75:
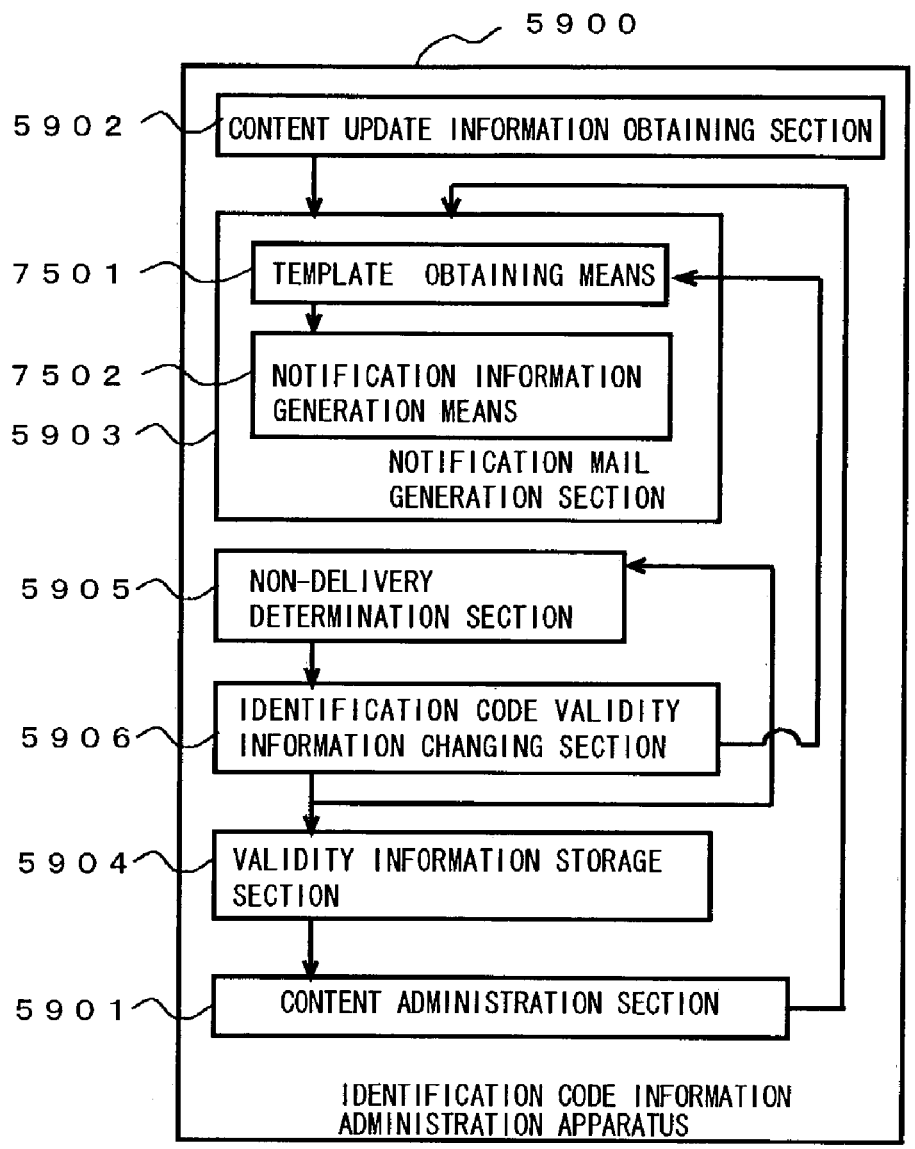
FIG. 75 is a functional block diagram of the identification code information administration apparatus of an nineteenth embodiment of the present invention.

FIG. 75 exemplifies the functional block diagram of the identification code information administration apparatus according to the nineteenth embodiment of the present invention.

The identification code information administration apparatus according to the nineteenth embodiment is configured such that the notification mail generation section 5903 of the identification code information administration apparatus 5900 of the thirteenth embodiment further has template obtaining means 7501 and notification information generation means 7502.

The 'template obtaining means' and the 'notification information generation means' are described in the second embodiment.

Note that, in this embodiment, the template obtaining means may be designed to obtain the template based on the browsing-permitted subject identification code associated with the updated content. Specifically, the templates corresponding to the browsing-permitted subject identification codes are prepared, and when the content is updated, the template obtaining means 7501 may be designed to obtain the template corresponding to the browsing-permitted subject identification code that is associated with the content.

Further, in the case where the template obtaining means is designed to obtain the template based on the browsing-permitted subject identification code associated with the updated content, when the identification code is invalidated by the identification code validity information changing section 5906, the template corresponding to the identification code may be invalidated. Particularly, when the template is invalidated, the template may be deleted.

Figure 76:
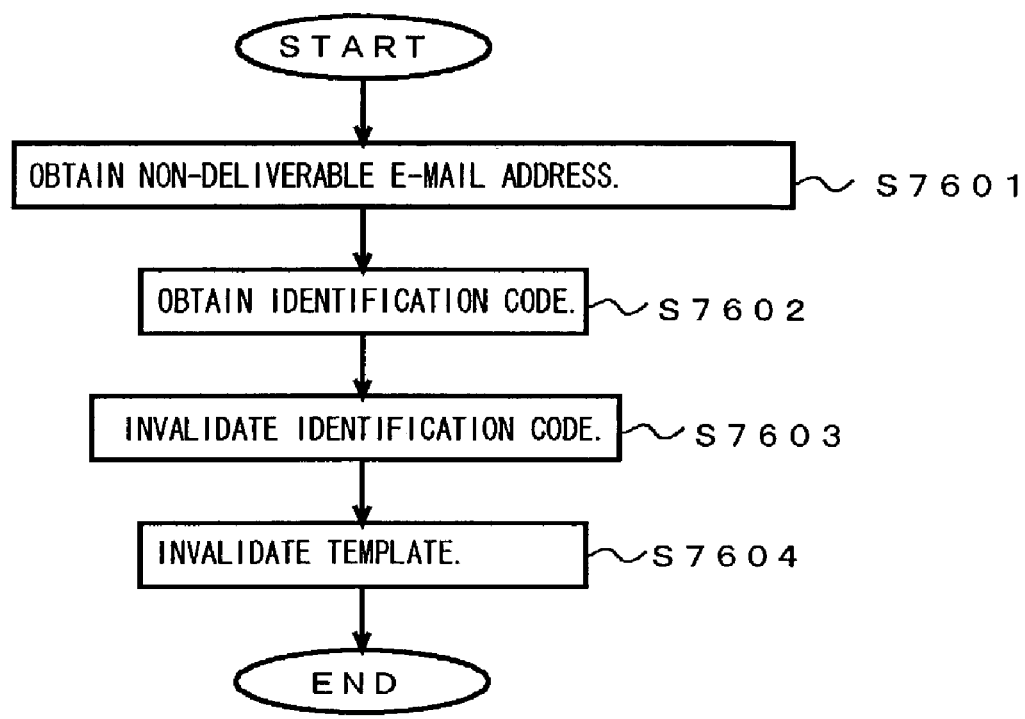
FIG. 76 is a flowchart of the processing from the point when the e-mail address, to which transmission of the electronic mail is non-deliverable, is obtained to the point when a template becomes invalid, in the identification code information administration apparatus of the nineteenth embodiment.

FIG. 76 exemplifies the flowchart explaining the process flow from the point when the e-mail address to which the transmission of e-mail is non-deliverable to the point when the template is invalidated.

At step S7601, the non-delivery determination section 5905 obtains the e-mail address to which the transmission of e-mail is non-deliverable.

At step S7602, the identification code validity information changing section 5906 obtains the identification code associated with the e-mail address.

At step S7602, the validity information stored in the validity information storage section 5904 is changed to invalidate its identification code.

At step S7603, the template corresponding to the browsing-permitted subject identification code is invalidated. For example, the template is deleted.

Figure 77:
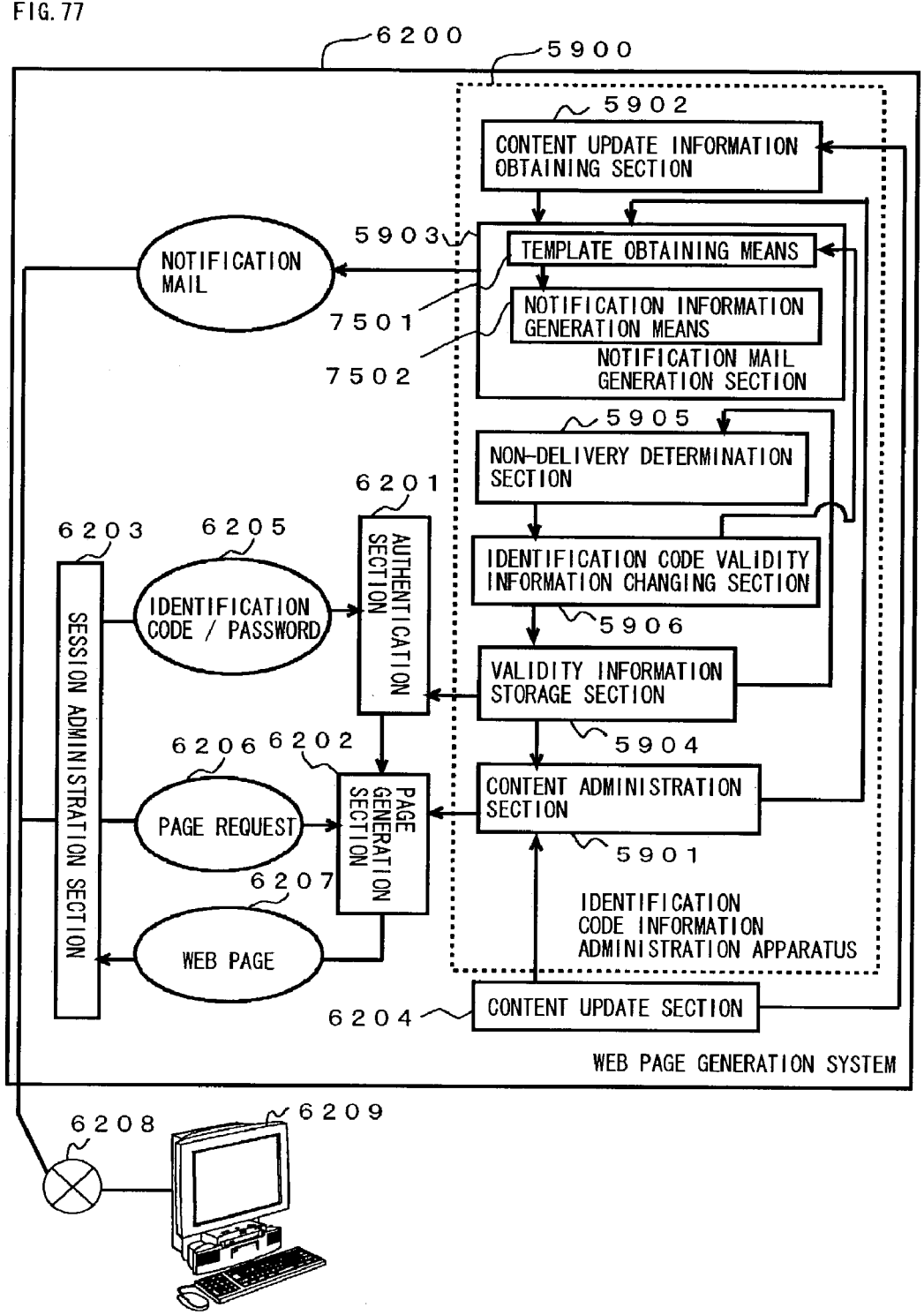
FIG. 77 is a functional block diagram of the WEB page generation system in which the identification code information administration apparatus of the nineteenth embodiment is incorporated.

FIG. 77 exemplifies the functional block diagram of the WEB page generation system into which the identification code information administration apparatus 5900 in the nineteenth embodiment is incorporated.

Figure 78:
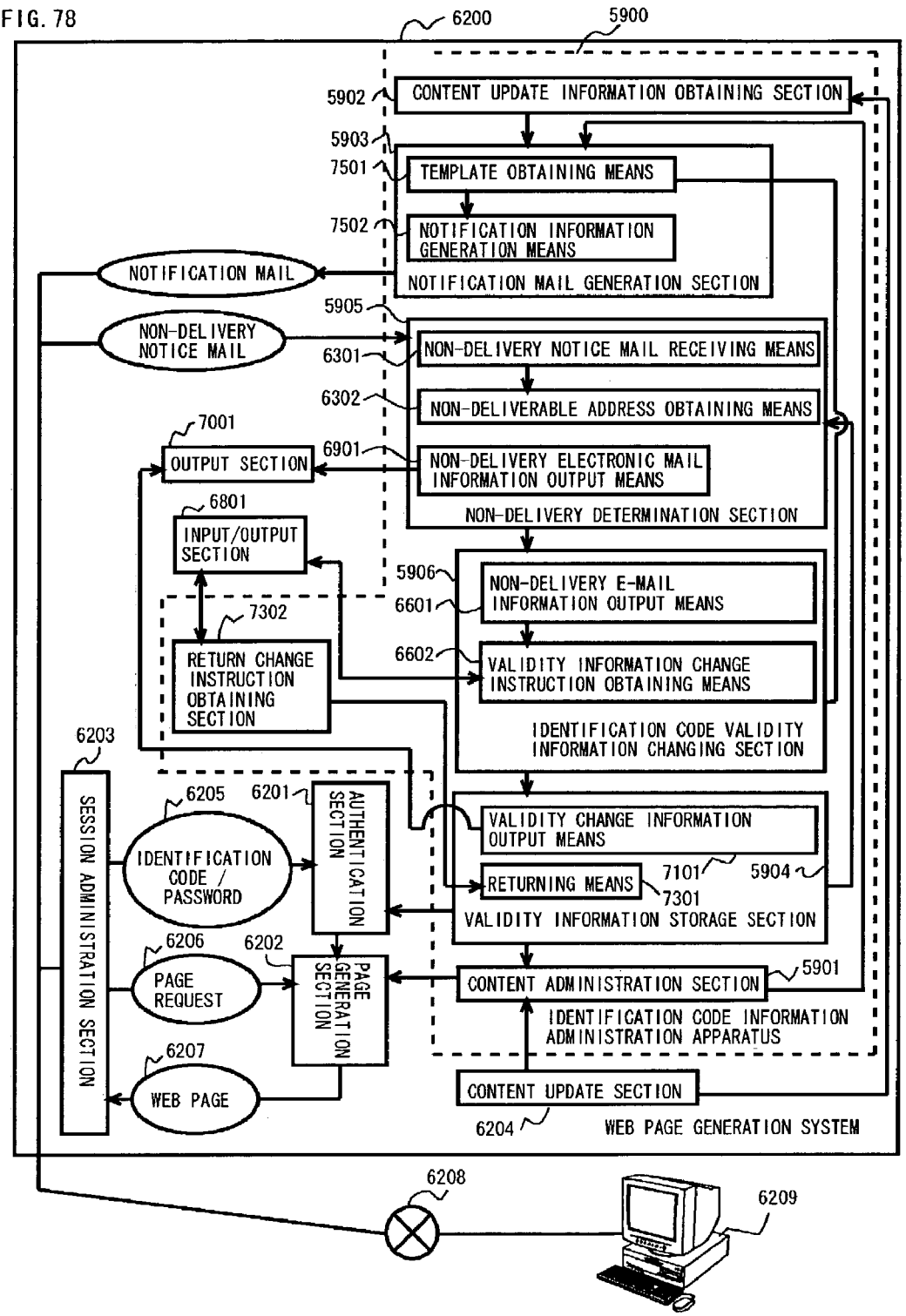
FIG. 78 is another functional block diagram of the WEB page generation system in which the identification code information administration apparatus of the nineteenth embodiment is incorporated.

FIG. 78 exemplifies the functional block diagram in the case where the identification code information administration apparatus 5900 incorporated into the WEB page generation system has: (1) the non-delivery notice mail receiving means 6301 and the non-deliverable address obtaining means 6302; (2) the non-delivery e-mail information output means 6601 and the validity information change instruction obtaining means 6602; (3) the non-deliverable destination information output means 6901; (4) the validity change information output means 7101; and the restore instruction obtaining section 7302 and the restoration means 7301. Each section/means of (1), (2), (3), (4) and (5) may simultaneously exist as exemplified in FIG. 78, or each section/means from (1) to (5) may exist individually.

According to this embodiment, it is possible to delete the template of the notification mail generated for the e-mail address to which the e-mail is non-deliverable. Therefore, the storage region for storing templates can be effectively utilized.

Figure 79:
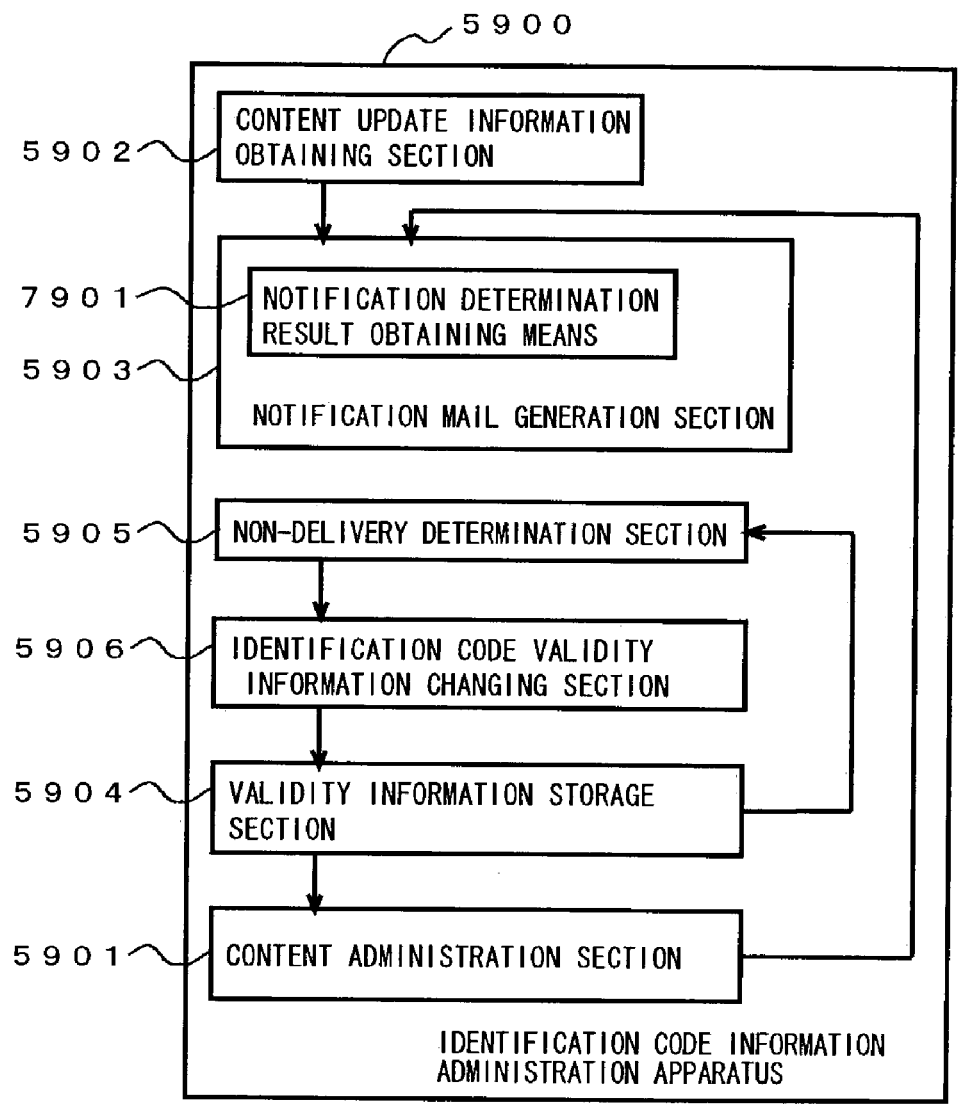
FIG. 79 is a functional block diagram of the identification code information administration apparatus of a twentieth embodiment of the present invention.

FIG. 79 exemplifies the functional block diagram of the identification code information administration apparatus of the twentieth embodiment of the present invention.

The identification code information administration apparatus according to the twentieth embodiment is configured such that the notification mail generation section 5903 of the identification code information administration apparatus 5900 of the thirteenth embodiment further has notification determination result obtaining means 7901.

The 'notification determination result obtaining means' is the one described in the third embodiment.

Therefore, in this embodiment, the determination result whether the notification mail is generated or not is obtained and whether the notification mail is generated or not is decided based on the determination result.

Figure 80:
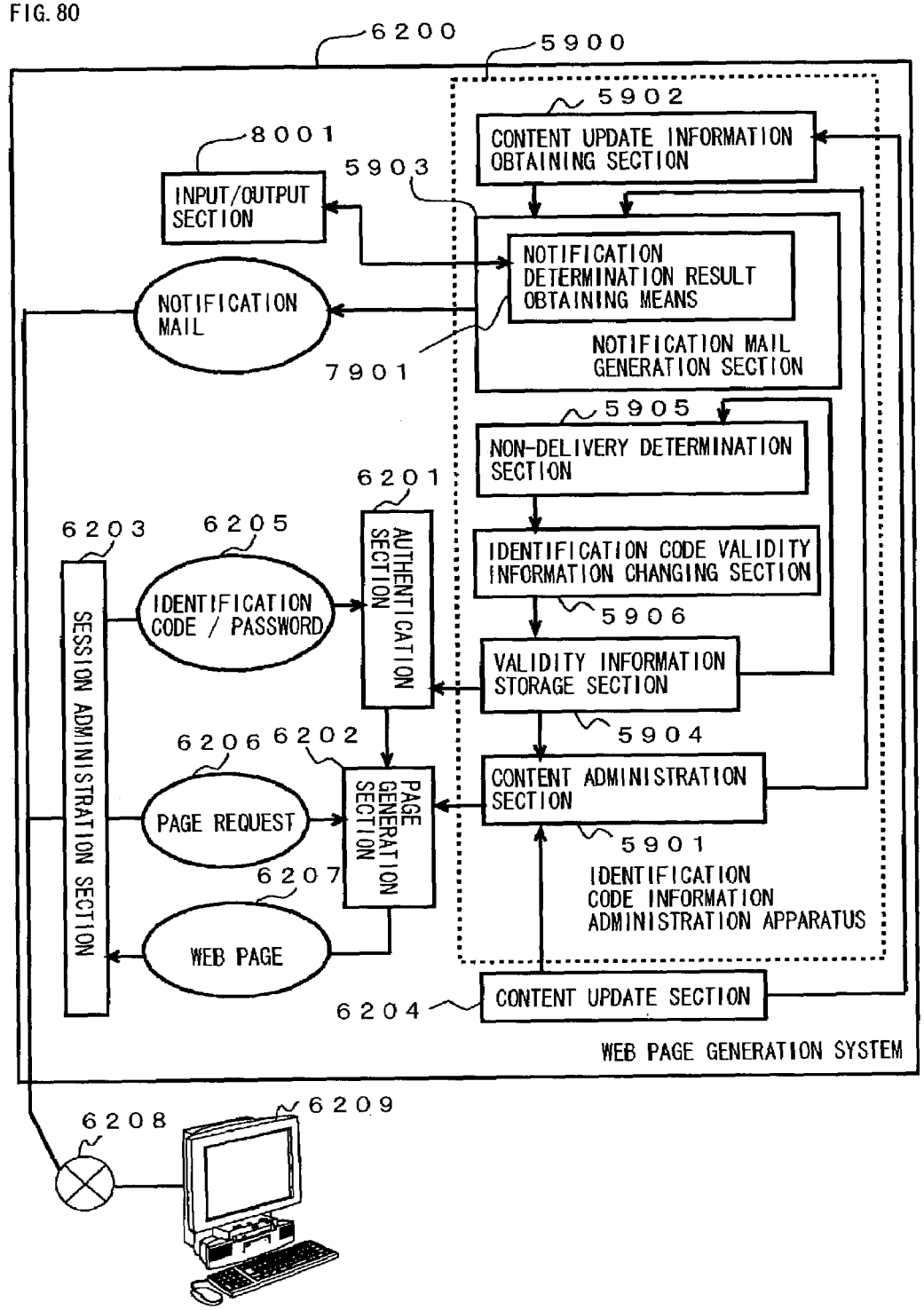
FIG. 80 is a functional block diagram of the WEB page generation system in which the identification code information administration apparatus of the twentieth embodiment is incorporated.

FIG. 80 exemplifies the functional block diagram of the WEB page generation system into which the identification code information administration apparatus in this embodiment is incorporated.

The difference between FIG. 80 and FIG. 63 described in the thirteenth embodiment is that the notification determination result obtaining means 7901 and an input/output section 8001 exist in FIG. 80. The input/output section 8001 displays the image exemplified in FIG. 13, for example, obtains input to the buttons (1301, 1302), and outputs the obtained result to the notification determination result obtaining means 7901.

According to the twentieth embodiment, when performing a determination whether or not the notification mail is generated or not, it is possible to examine whether the e-mail address to which the e-mail is transmitted is reachable, or whether the identification code associated with the e-mail is valid or not. Thus, occurrence of wasteful traffic due to transmission of notification mail to the e-mail address that becomes non-deliverable can be prevented.

Figure 81:
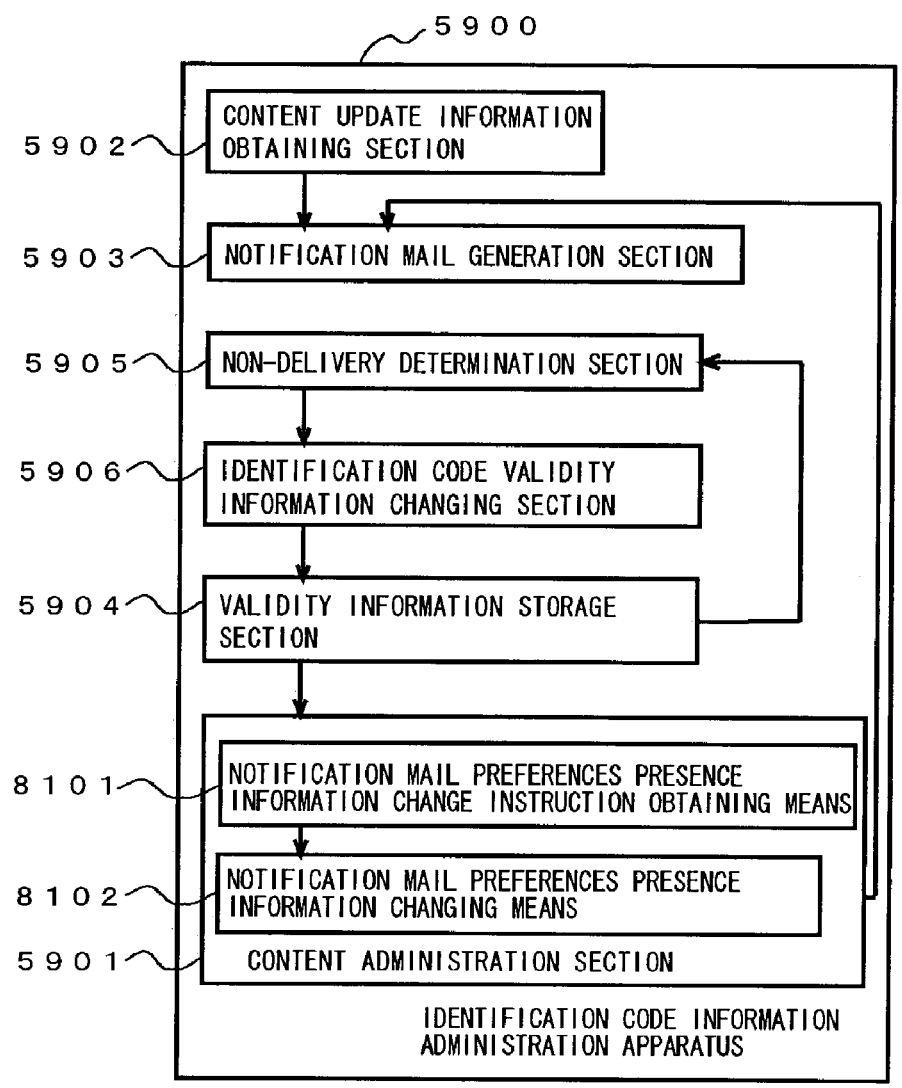
FIG. 81 is a functional block diagram of the identification code information administration apparatus of a twenty-first embodiment of the present invention.

FIG. 81 exemplifies the functional block diagram according to the twenty-first embodiment of the present invention.

The identification code information administration apparatus of the twenty-first embodiment is configured such that the content administration section 5901 of the identification code information administration apparatus 5900 of the thirteenth embodiment has notification mail preferences presence information change instruction obtaining means 8101 and notification mail preferences presence information changing means 8102.

The 'notification mail preferences presence information change instruction obtaining means' and the 'notification mail preferences presence information changing means' are described in the sixth embodiment.

Therefore, in the identification code information administration apparatus 5900 of this embodiment, a person who receives the notification mail administrates the notification mail wish presence information that is information for deciding whether he/she prefers to receive the notification mail, generation of notification mail is controlled based on the notification mail preferences presence information, and furthermore, it is possible to change the notification mail preferences presence information.

Figure 82:
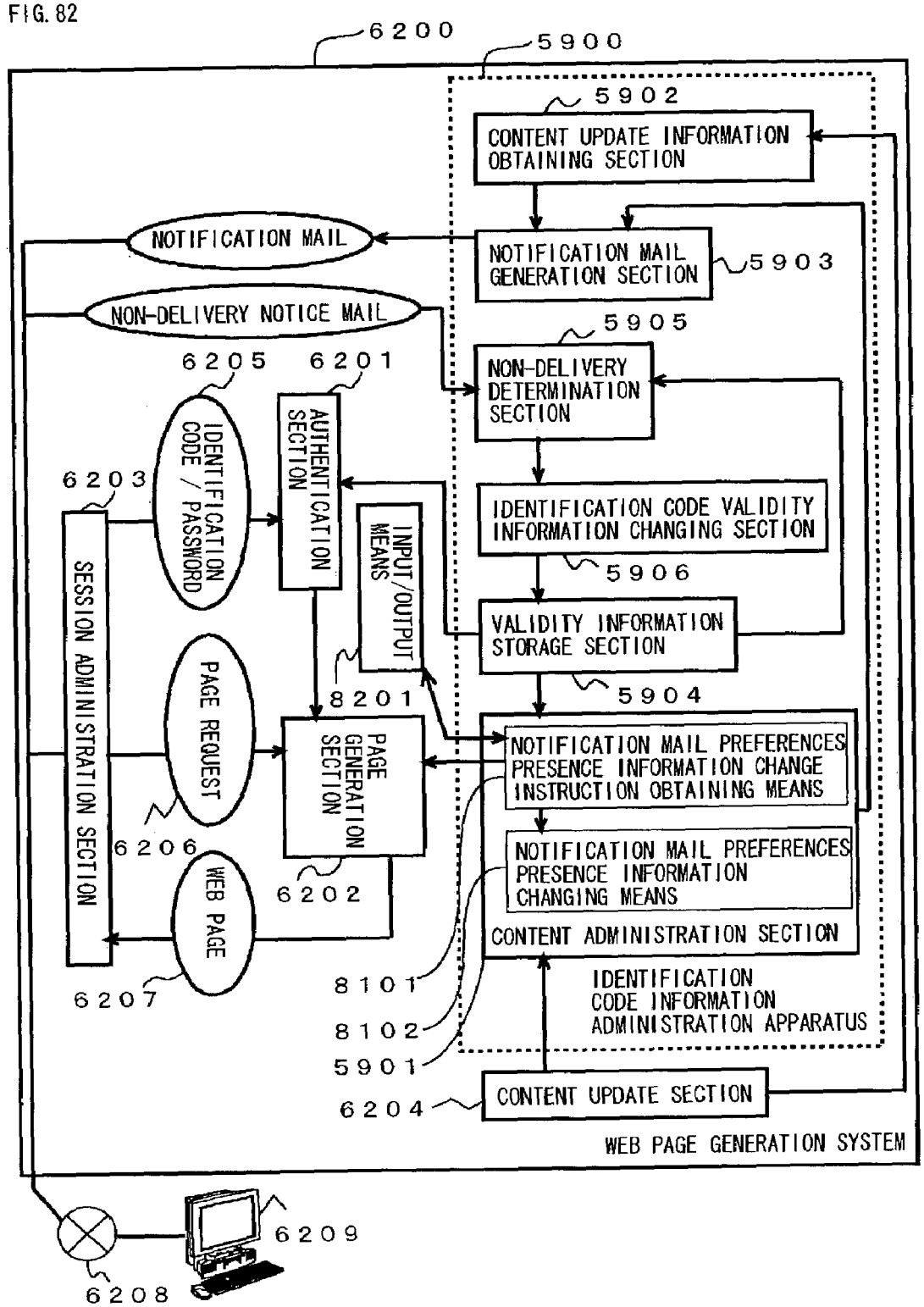
FIG. 82 is a functional block diagram of the WEB page generation system in which the identification code information administration apparatus of the twenty-first embodiment is incorporated.
Figure 8:
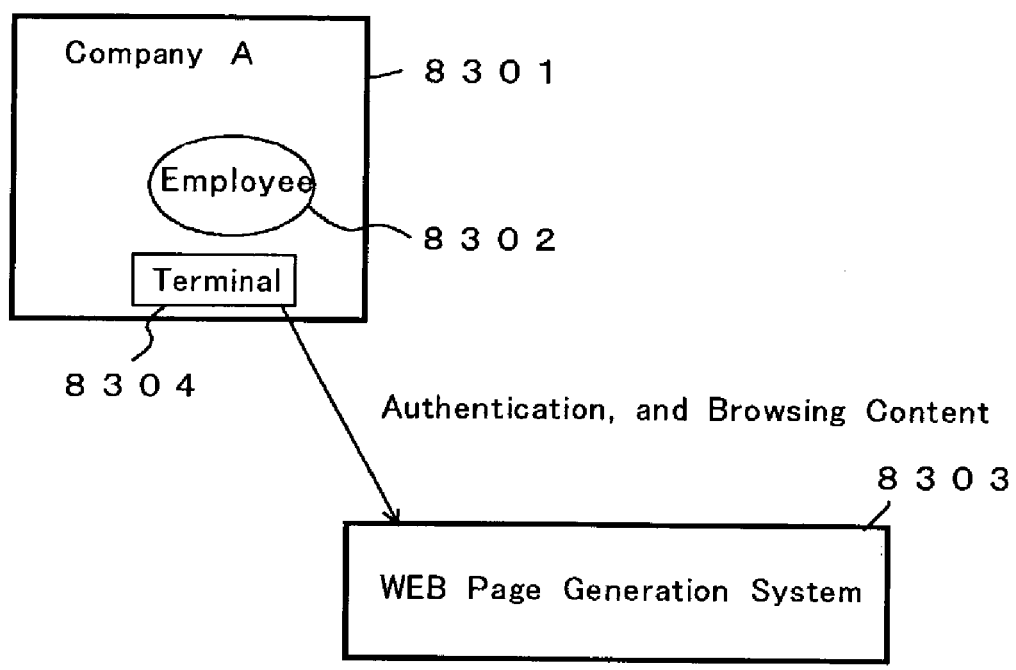

FIG. 82 exemplifies the functional block diagram of the WEB page generation system into which the identification code information administration apparatus in this embodiment is incorporated.

The difference between FIG. 82 and FIG. 62 described in the thirteenth embodiment is that, in FIG. 82, the content administration section 5901 has the notification mail preferences presence information change instruction obtaining means 8101 and the notification mail preferences presence information changing means 8102, and the WEB page generation system is provided with an input/output section 8201.

Further, the non-delivery determination section 5905 may be designed to detect the e-mail address to which the transmission of e-mail becomes non-deliverable by receiving the non-delivery notice mail as described in the fourteenth embodiment.

The input/output section 8201 displays the image of FIG. 20, for example, reads operation to the buttons (2001, 2002, 2003, 2004), and outputs the result that has been read out to the notification mail preferences presence information change instruction obtaining means 8101.

According to this embodiment, in the case of transmitting a notification mail having particular content to those who wish to receive the notification mail, the notification mail is not transmitted to a person to whom the notification mail has become non-deliverable, so that there will be less possibility of unauthorized disclosure of the particular content described in the notification mail.

According to the present invention, it is possible to generate a notification mail suitable for each user when the content has been updated.

Further, the notification mail is not necessarily generated every time when the content is updated, but the notification mail may not be generated depending on the update of content, and therefore, generation of the notification mail due to a minor content update can be prevented. In addition, the notification mail can be generated while sorting out the users.

Furthermore, it is possible to allow a particular user to browse particular content, and thereby preventing an unintended user from browsing the details of content.

Still further, when it is detected that the e-mail cannot reach a destination, the validity of identification code is changed, so that unauthorized disclosure of information for a particular customer can be prevented.

What is claimed is:

1. An identification code administration program for execution on a computer apparatus, comprising:
　　a content administration section, which administers a content;
　　an authentication section, which performs authentication of a user using both an identification code of the user browsing said content and a validity associated with said identification code,
　　a page generation section, which generates a web page in which said user can browse the administered content subject to a success of said authentication;
　　a validity information storage section, which stores identification code, a validity information associated with said identification code, and an e-mail address of the user identified by the identification code;
　　a non-delivery notice e-mail receiving section, which receives a non-delivery notice e-mail notifying a non-delivery of an e-mail sent to the e-mail address of the user identified by the identification code;
　　a non-delivery address obtaining section, which obtains a non-delivery e-mail address from the received non-delivery notice e-mail; and
　　an identification code validity information changing section, which changes the validity of the identification code stored by said validity information storage section to invalid and stores said identification code by associating said identification code with the e-mail address obtained by said non-delivery address obtaining section; wherein said authentication section determines that the authentication according identification code stored by said validity information storage section has failed, wherein the identification code is correlated with the validity information that has been changed to invalid;

a content transmission section, wherein said failed authentication prevents the transmission of the content to the user.

2. The identification code administration program according to claim 1, wherein a content administered by said content administration section is information determined according to the identification code.

3. The identification code administration program according to any one of claim 1 or 2, wherein said identification code validity information changing section, comprises:

an output means for non-delivery e-mail information, which outputs non-delivery e-mail information relating to an e-mail address obtained by said non-delivery address obtaining section; and an obtaining means for change instruction of validity information, which obtains a change instruction as to whether or not a validity of an identification code correlated with the e-mail address of the non-delivery e-mail information is changed; and changes the validity to be invalid, in cases where the change instruction obtained by said obtaining means for change instruction of validity information instructs that the validity of said identification code is to be changed.

4. The identification code administration program according to any one of claim 1 or 2, wherein said non-delivery address obtaining section outputs non-delivery address information, which is information relating to an address determined to be non-deliverable.

5. The identification code administration program according to claim 4, further comprising:

an obtaining section of restore instruction information, which obtains restore instruction information instructing a restore of a validity of an identification code changed to be invalid by said identification code validity information changing section to be valid; wherein aid identification code validity information changing section comprises:

a restore means, which changes the validity of the identification code from invalid to valid according to the restore instruction information obtained by said obtaining section of restore instruction information.

6. The identification code administration program according to any one of claim 1 or 2, wherein said validity information storage section comprises:

an output means for validity change information, which outputs validity change information, which is information relating to a change of validity of said identification code.

* * * * *